US006954904B2

(12) United States Patent
White

(10) Patent No.: US 6,954,904 B2
(45) Date of Patent: Oct. 11, 2005

(54) CREATING A GRAPHICAL PROGRAM TO CONFIGURE ONE OR MORE SWITCH DEVICES

(75) Inventor: Jason White, Austin, TX (US)

(73) Assignee: National Instruments Corporation, Austin, TX (US)

(*) Notice: Subject to any disclaimer, the term of this patent is extended or adjusted under 35 U.S.C. 154(b) by 553 days.

(21) Appl. No.: 10/113,850

(22) Filed: Mar. 29, 2002

(65) Prior Publication Data

US 2003/0046657 A1 Mar. 6, 2003

Related U.S. Application Data

(60) Provisional application No. 60/312,547, filed on Aug. 15, 2001.

(51) Int. Cl.[7] .......................... G06F 3/00; G06F 13/14; G09G 5/00
(52) U.S. Cl. ...................... 715/763; 715/771; 715/762; 715/967; 715/970; 345/522
(58) Field of Search ................................ 715/700, 771, 715/762–764, 772, 810, 826, 846, 853, 967, 970; 345/501, 520, 522

(56) References Cited

U.S. PATENT DOCUMENTS

| 5,101,150 | A |   | 3/1992  | Sullivan et al. |
|-----------|---|---|---------|-----------------|
| 5,124,636 | A |   | 6/1992  | Pincus et al. |
| 5,124,638 | A |   | 6/1992  | Winroth |
| 5,408,603 | A | * | 4/1995  | Van de Lavoir et al. ... 715/763 |
| 5,481,741 | A |   | 1/1996  | McKaskle et al. |
| 5,801,942 | A |   | 9/1998  | Nixon et al. |
| 5,828,851 | A |   | 10/1998 | Nixon et al. |
| 5,838,563 | A |   | 11/1998 | Dove et al. |
| 5,850,537 | A |   | 12/1998 | Selvidge et al. |
| 5,861,882 | A |   | 1/1999  | Sprenger et al. |
| 5,896,141 | A | * | 4/1999  | Blaho et al. ................. 345/541 |
| 6,078,320 | A |   | 6/2000  | Dove et al. |
| 6,112,264 | A | * | 8/2000  | Beasley et al. ............... 710/38 |
| 6,425,121 | B1 | * | 7/2002 | Phillips ...................... 717/109 |
| 6,437,805 | B1 | * | 8/2002 | Sojoodi et al. ............. 715/763 |
| 6,622,272 | B1 |   | 9/2003  | Haverkamp et al. |
| 6,785,540 | B1 |   | 8/2004  | Wichelman |
| 2003/0004670 | A1 | * | 1/2003 | Schmit et al. .............. 702/123 |
| 2004/0107286 | A1 |   | 6/2004 | Larson et al. |

OTHER PUBLICATIONS

Yukihito Maejima et al, "A Graphical Programming Environment for Switching Software", Dec. 2–5, 1991, IEEE, vol. 2, p. 807–811.*

"GenRad's Compass and LabView—Test Programming No Longer an Exercise in Programming Skill and Dexterity," National Instruments, User Solution, 1995 (2 pages).

(Continued)

*Primary Examiner*—X. L. Bautista
(74) *Attorney, Agent, or Firm*—Meyertons Hood Kivlin Kowert & Goetzel, P.C.; Jeffrey C. Hood

(57) ABSTRACT

A system and method for creating a graphical program operable to configure one or more switch devices. A first node may be displayed in the graphical program, wherein the first node is operable to use route information to control or configure one or more of switch devices in a switching system. The first node may be configured with route information. For example, the route information may comprise information specifying one or more routes previously configured and stored. Also, the route information may comprise information specifying two endpoints of a route, as in the case of run-time auto-routing, or may comprise information explicitly specifying a complete route. The first node may be operable to perform various types of operations to control or configure the one or more switch devices, such as a connect operation to connect specified routes.

38 Claims, 42 Drawing Sheets

OTHER PUBLICATIONS

GenRad, "Process and Functional Solutions," GenRad–EMS–Functional–VXIscan, http://www.genrad.com/ems/functional/vxiscan.html Aug. 1, 2000.

"Non–Geneva System Configuration," Guide to ENCOMPASS, Jul. 1997.

http://www.teradyne.com/functional/versa/switchmanager.html.

National Instruments "The Measurement and Automation Catalog 2001" ©2000, pp. 426–454.

Laura Johnson, "Understanding Test Executives" www.Test and Measurement.com, Oct. 16, 2000, 9 pages.

Teradyne, GR SwitchManager, Powerful Signal Switching & Routing Software for the GENEVA and GR Versa Functional Test Systems, 2002, 2 pages.

Teradyne, GENEVA Functional Test Solution, Teradyne's VXI–Based Test and Measurement System, 2002, 4 pages.

* cited by examiner

Legend:
Switch device
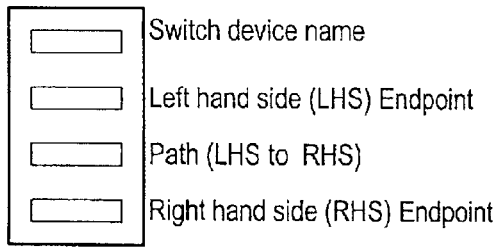
Switch device name
Left hand side (LHS) Endpoint
Path (LHS to RHS)
Right hand side (RHS) Endpoint
Value is either unknown, or there are options
Value is known, not optional
State 1:
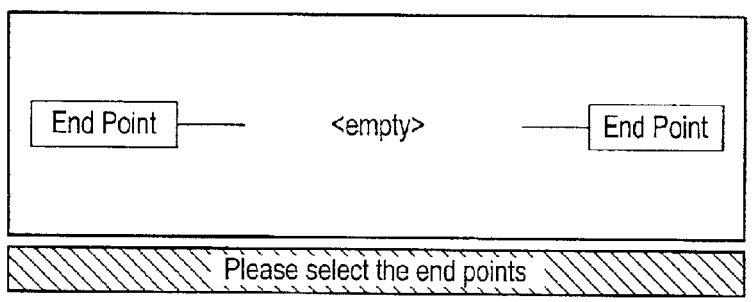
*FIG. 11A*
State 2(a):
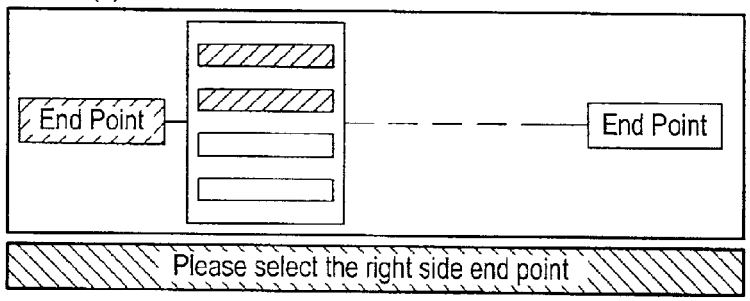
*FIG. 11B*
State 2(b):
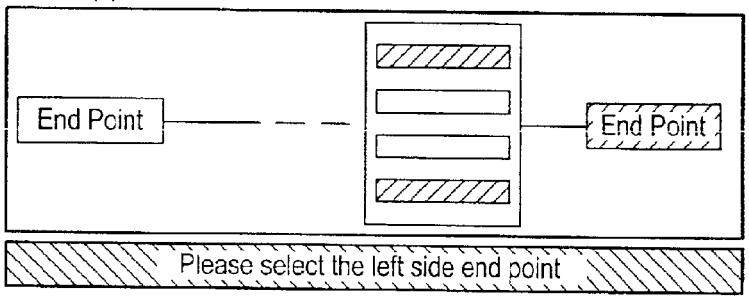
*FIG. 11C*

State 3(a):

State 3(b):

State 3(c):

State 3(d):

State 4(a):

State 4(b):

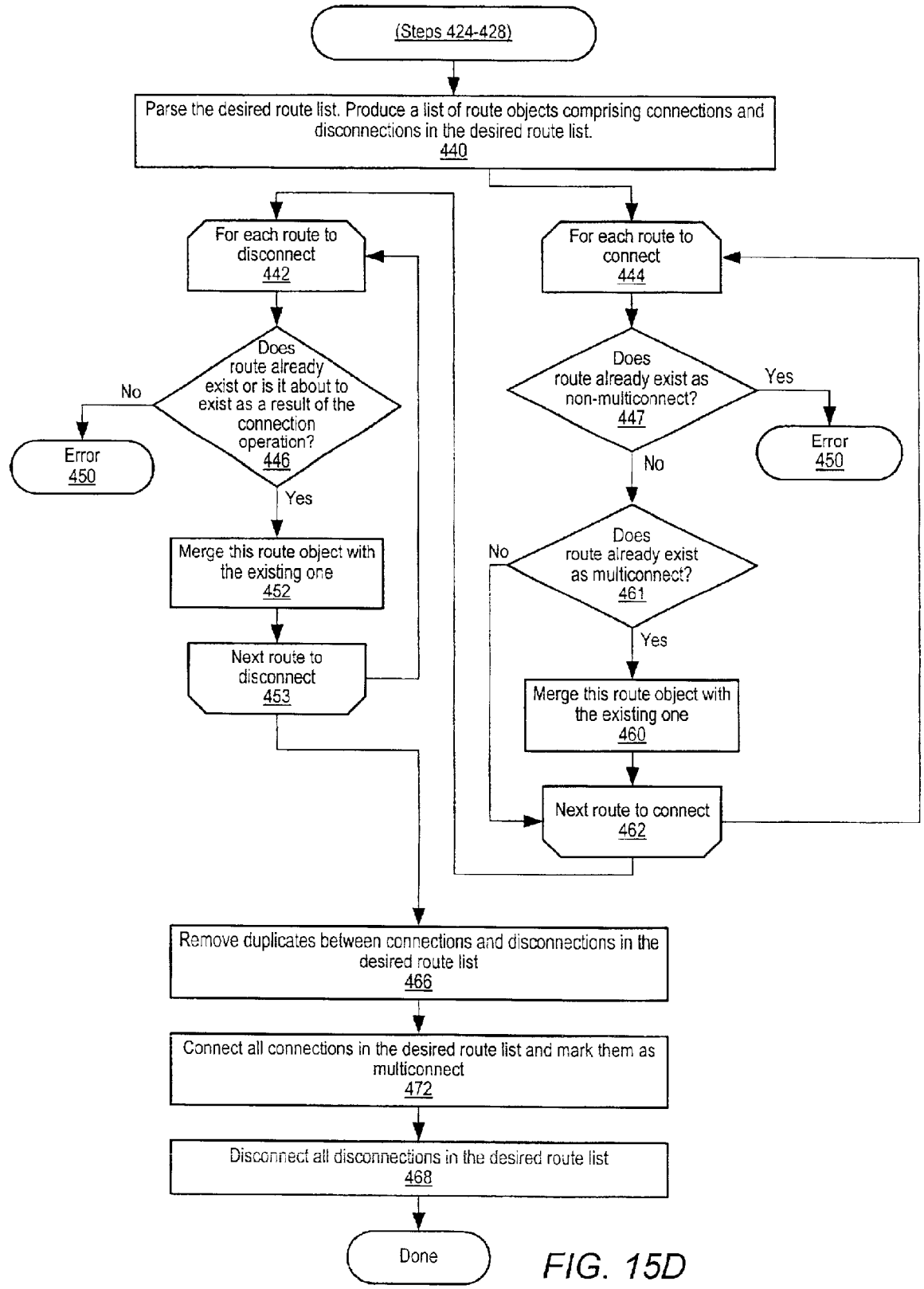

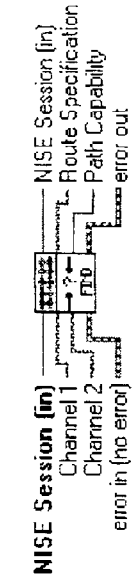

NISE Session (in) ———— NISE Session (out)
error in (no error) ———— error out niSE_CloseSession.vi

*FIG. 30A*

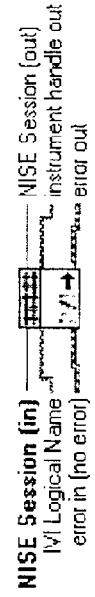

NISE Session (in) ———— NISE Session (out)
Connection Specification
Multiconnect Mode ———— error out
error in (no error)

niSE_Connect.vi

*FIG. 30B*

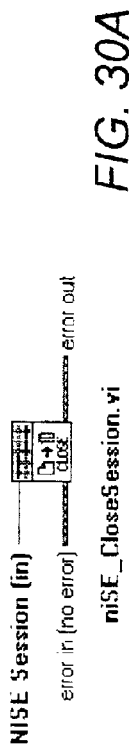

Multiconnect Mode
NISE Session (in) ———— NISE Session (out)
Connection Specification
Disconnection Specification ———— error out
error in (no error)
Operation Order
Wait For Debounce Between O...

niSE_ConnectAndDisconnect.vi

*FIG. 30C*

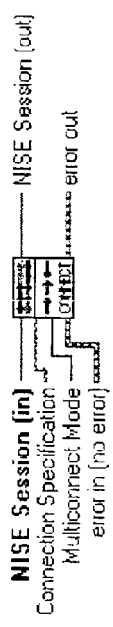

NISE Session (in) ———— NISE Session (out)
Disconnection Specification ———— error out
error in (no error)

niSE_Disconnect.vi

*FIG. 30D*

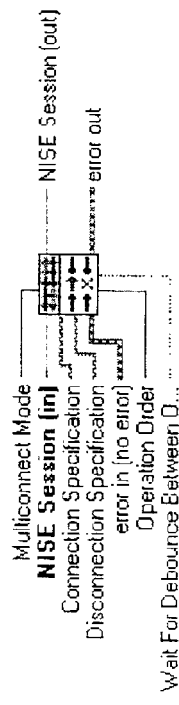

NISE Session (in) ———— NISE Session (out)
Disconnection Specification ———— error out
error in (no error)

niSE_Disconnect.vi

*FIG. 30E*

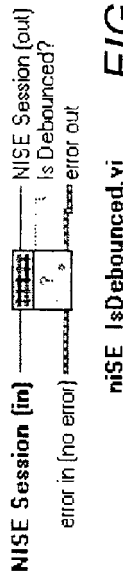

NISE Session (in) ———— NISE Session (in)
Channel 1 ———— Route Specification
Channel 2 ———— Path Capability
error in (no error) ———— error out niSE_FindRoute.vi

*FIG. 30F*

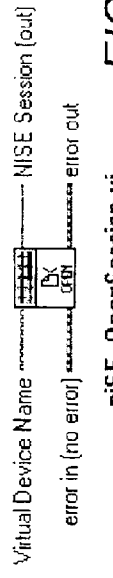

NISE Session (in) ———— NISE Session (out)
IVI Logical Name ———— instrument handle out
error in (no error) ———— error out niSE_GetIviDeviceSession.vi

*FIG. 30G*

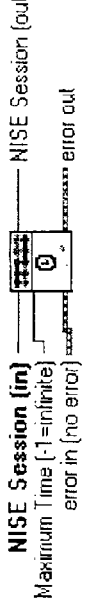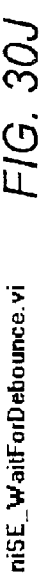

NISE Session (in) ———— NISE Session (out)
———— Is Debounced?
error in (no error) ———— error out niSE_IsDebounced.vi

*FIG. 30H*

NISE Session (out)
Virtual Device Name ———— error out
error in (no error)

niSE_OpenSession.vi

*FIG. 30I*

NISE Session (in) ———— NISE Session (out)
Maximum Time (-1=infinite)
error in (no error) ———— error out niSE_WaitForDebounce.vi

*FIG. 30J*

CREATING A GRAPHICAL PROGRAM TO CONFIGURE ONE OR MORE SWITCH DEVICES

PRIORITY CLAIM

This application claims benefit of priority of U.S. provisional application Ser. No. 60/312,547 titled "Switch Executive" filed Aug. 15, 2001, whose inventors were Srdan Zirojevic, Jason White, Scott Rust, and Jucao Liang.

FIELD OF THE INVENTION

The present invention relates to the fields of graphical programming and computer-based test systems, and more particularly to a system and method for creating a graphical program operable to configure one or more switch devices, wherein the one or more switch devices are used to connect test instruments to test points on a unit under test.

DESCRIPTION OF THE RELATED ART

A switch is a device used to open and close a circuit. Switch devices are an integral part of many test, measurement, and data acquisition systems because they are used to connect multiple test points to multiple instruments, e.g., to provide stimulus to or to acquire data from a unit under test. Switches are used in a variety of computer-based measurement, automation, and data acquisition applications ranging from thermocouple measurements to cellular telephone testing. Switches come in a variety of types and sizes to meet a wide range of computer-based measurement and automation needs. Switches can be differentiated by their mechanical characteristics and function topology.

The simplest switch is the single-pole single-throw (SPST). Single-pole means the switch has only one source wire. Single-throw means the switch can make a connection in only one position. An SPST switch is used to complete a circuit; a very common use of an SPST switch is for turning power on and off. A second type is the single-pole double-throw (SPDT) switch. An SPDT switch has a single source (single-pole) and two (double-throw) switch positions. An SPDT switch may rest in a normally closed (NC) position. The second possible position is normally open (NO). The SPDT switch routes or selects two signals, such as switching between battery power and main-line power.

A third switch type is the double-pole, double-throw (DPDT). For a DPDT switch, the two levers are "linked" and move together. Both poles are always in the same position. A DPDT switch is basically formed by two SPDT switches always operating at the same time. In addition to the pole and throw terms, switches are classified by form. Form A refers to a single-throw switch that is normally open. If it has one pole (SPST) 80 it is called a "1 Form A" switch. In contrast, Form B refers to a normally closed SPST switch. Form C refers to a single-pole, double-throw switch (also known as a transfer switch). The SPDT switch 82 has a single pole and thus is a "1 Form C" switch. The switch with two poles is a "2 Form C" switch (DPDT) 84.
FIG. 1A FIG. 1A shows three examples of a General-Purpose (GP) switch, which comprises multiple, independent, isolated relays. GP switches can connect one input to one output. They are usually used to turn on or off devices such as motors, fans, and lights. GP switches can be used to switch high voltage or high current signals, and they are usually built with Form A or Form C switches.
FIG. 1B FIG. 1B illustrates an exemplary Multiplexer (Mux), which typically connects one instrument to several devices or units under test, or several instruments to one device or unit under test. A typical mux configuration is a 2-wire switch used with differential signals. A 1-wire switch routes single-ended signals. A 4-wire switch is used when measuring low resistance or RTDs. Muxes are often used to connect a digital multimeter (DMM), or a scope to a plurality of measurement points, or a signal source to a plurality of points needing excitation. Multiplexers can switch high voltages (250 V and over) and high currents (2 A and over) with large power capacities (up to 200 W and over). FET multiplexers have high contact resistance and switch low current signals between ±110 V with bandwidths of 1 to 2 MHz. Radio frequency, or RF, multiplexers can switch GHz bandwidth signals.
FIG. 1C FIG. 1C illustrates two exemplary matrix switches, which can connect to any output, singly or in combination. Oscilloscopes, DMMs, arbitrary function generators, and power supplies can be connected to various test points on a unit under test (UUT). The main benefit of matrix switches is simplified wiring; the overall test system can easily and dynamically change the internal connection path, without any external manual intervention.

The two most common types of electrical switches are mechanical relays and solid-state switches. Mechanical relays, also known as electromechanical relays, make a characteristic clicking sound. They can be one of three types—armature, dry reed, and mercury-wetted reed. Mechanical relays are often used in high-voltage applications, or low level resistance or voltage measurements. On the other hand, FET switches have no moving parts and use transistor technology to switch the signals. They are used in low-voltage (±10 V) applications where it is important to have very little switch delay—having no mechanical parts, FET switches are very fast and may have a longer life. FET switches typically have impedance in the range of 10 Ohm to several kOhm.

Many test, measurement, and data acquisition systems utilize switch devices to switch between different data sources and data sinks, e.g., between different sensors and instruments. In these systems many times it is necessary to create a switch configuration or one or more configured routes to configure the one or more switch devices. A configured route may configure the switch device(s) to connect particular signal sources/signal sinks of instruments and/or computer systems to particular signal sources/signal sinks (test points) of a unit under test. The configured route may route signals through several switch devices, such as multiplexers or matrices, in order to create a complete path from a source channel to a destination channel. Routes may be configured and stored for later use from a program. For example, a program may request the switch devices to connect one or more previously created routes.

Many modern software applications, including applications that utilize switch devices, are developed using a type of programming known as graphical programming. Traditionally, high level text-based programming languages have been used by programmers in writing application programs. Many different high level programming languages exist, including BASIC, C, Java, FORTRAN, Pascal, COBOL, ADA, APL, etc. Programs written in these high level programming languages are translated to the machine language level by translators known as compilers or interpreters. The high level programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

Examples of fields in which computer systems are employed to interact with physical systems are the fields of instrumentation, process control, industrial automation, and simulation. Computer measurement and control of devices such as instruments or industrial automation hardware has become increasingly desirable in view of the increasing complexity and variety of instruments and devices available for use. However, due to the wide variety of possible testing and control situations and environments, and also the wide array of instruments or devices available, it is often necessary for a user to develop a custom program to control a desired system.

As discussed above, computer programs used to control such systems traditionally had to be written in text-based programming languages such as, for example, assembly language, C, FORTRAN, BASIC, etc. Traditional users of these systems, however, often were not highly trained in programming techniques and, in addition, text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered a higher and more intuitive way in which to interact with a computer. A graphically based programming environment can be represented at a level above text-based high level programming languages such as C, Basic, Java, etc.

The method disclosed in Kodosky et al allows a user to construct a diagram using a block diagram editor. The block diagram may include a plurality of interconnected icons such that the diagram created graphically displays a procedure or method for accomplishing a certain result, such as manipulating one or more input variables and/or producing one or more output variables. The diagram may have one or more of data flow, control flow and/or execution flow representations. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

Therefore, Kodosky et al teaches a graphical programming environment wherein a user places or manipulates icons and interconnects or "wires up" the icons in a block diagram using a block diagram editor to create a graphical "program." A graphical program for performing an instrumentation, measurement or automation function, such as measuring a Unit Under Test (UUT) or device, controlling or modeling instruments, controlling or measuring a system or process, or for modeling or simulating devices, may be referred to as a virtual instrument (VI). Thus, a user can create a computer program solely by using a graphically based programming environment. This graphically based programming environment may be used for creating virtual instrumentation systems, modeling processes, control, simulation, and numerical analysis, as well as for any type of general programming.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program or VI, and may include other icons which represent devices being controlled. The front panel may be comprised in a single window of user interface elements, or may comprise a plurality of individual windows each having one or more user interface elements, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel may comprise front panel objects, e.g., the GUI, embedded in the block diagram.

During creation of the block diagram portion of the graphical program, the user may select various function nodes or icons that accomplish his desired result and connect the function nodes together. For example, the function nodes may be connected in one or more of a data flow, control flow, and/or execution flow format. The function nodes may also be connected in a "signal flow" format, which is a subset of data flow. The function nodes may be connected between the terminals of the various user interface elements, e.g., between the respective controls and indicators. Thus the user may create or assemble a graphical program, referred to as a block diagram, graphically representing the desired process. The assembled graphical program may be represented in the memory of the computer system as data structures and/or program instructions. The assembled graphical program, i.e., these data structures, may then be compiled or interpreted to produce machine language that accomplishes the desired method or process as shown in the block diagram.

Input data to a graphical program may be received from any of various sources, such as from a device, unit under test, a process being measured or controlled, another computer program, or from a file. Also, a user may input data to a graphical program or virtual instrument using a graphical user interface, e.g., a front panel as described above. The input data may propagate through the data flow block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the front panel may be used merely to view the input and output, or just the output, and the input may not be interactively manipulable by the user during program execution.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, image processing/machine vision applications, and motion control, among others.

It would be desirable to provide a system and method for easily and efficiently creating a graphical program operable to configure one or more switch devices.

SUMMARY OF THE INVENTION

One embodiment of the present invention comprises a system and method for creating a graphical program operable to configure one or more switch devices. A first node may be displayed in the graphical program, wherein the first node is operable to use route information to control or configure one or more of switch devices in a switching system. For example, the graphical programming development environment may provide various nodes for inclusion in the block diagram of a graphical program. Thus, a user may display the first node in the graphical program's block diagram, e.g., by selecting the first node from a palette or menu or otherwise providing user input requesting inclusion of the first node in the graphical program.

The first node may be configured with route information, e.g., in response to user input. For example, in one embodiment, configuring the first node with route information may comprise connecting one or more inputs to one or more input terminals of the first node, wherein the input(s) comprises the route information. In another embodiment, configuring the first node with route information may comprise configuring one or more properties of the node, e.g., using a dialog box or property panel. In various embodiments, the route information may comprise any of various types of information. For example, the route information may comprise information specifying one or more routes previously configured and stored using a visual route editor, such as the names of one or more routes or route groups. Also, the route information may comprise information specifying two endpoints of a route, as in the case of run-time auto-routing, or may comprise information explicitly specifying a complete route, as in the case of manual routing.

The first node may be operable to perform any of various types of operations to control or configure the one or more switch devices. For example, the first node may be operable to perform a connect operation to connect specified routes, i.e., to cause the switch devices to make connections according to the routes. As another example, the first node may be operable to perform a disconnect operation to disconnect specified routes. As another example, the first node may be operable to perform a connect/disconnect operation to disconnect a first group of routes and connect a second group of routes, e.g., using the optimized connect/disconnect algorithm described above.

The first node may be connected to one or more other nodes in the graphical program, e.g., in a data flow and/or control flow format. The graphical program may then be executed, and the first node may execute during execution of the graphical program to control or configure the one or more switch devices, such as described above.

BRIEF DESCRIPTION OF THE DRAWINGS

FIG. 11A is a diagram illustrating an empty state in the visual design-time assisted routing, according to one embodiment of the invention;

FIG. 11B is a diagram illustrating selecting a first endpoint in the visual design-time assisted routing, according to one embodiment of the invention;

FIG. 11C is a diagram illustrating selecting the right hand side endpoint in visual design-time assisted routing, according to one embodiment of the invention;

FIG. 15D is a flowchart of a connect before disconnect, multiconnect route case for software intervention method in hardware state changes to improve relay lifetime and reduction in execution time, according to one embodiment of the invention;

FIG. 30A illustrates one embodiment of an exemplary LabVIEW graphical program node to close a session, according to one embodiment of the invention;

FIG. 30B illustrates one embodiment of an exemplary LabVIEW graphical program node to connect the routes specified by the connection specification, according to one embodiment of the invention;

FIG. 30C illustrates one embodiment of an exemplary LabVIEW graphical program node to connect routes and disconnect routes, according to one embodiment of the invention;

FIG. 30D illustrates one embodiment of an exemplary LabVIEW graphical program node to disconnect specified routes, according to one embodiment of the invention;

FIG. 30E illustrates one embodiment of an exemplary LabVIEW graphical program node to disconnect all routes, according to one embodiment of the invention;

FIG. 30F illustrates one embodiment of an exemplary LabVIEW graphical program node to find a route between user specified channels, according to one embodiment of the invention;

FIG. 30G illustrates one embodiment of an exemplary LabVIEW graphical program node to retrieve switch device session for a switch device, according to one embodiment of the invention;

FIG. 30H illustrates one embodiment of an exemplary LabVIEW graphical program node to check if a switching system is debounced or not, according to one embodiment of the invention;

FIG. 30I illustrates one embodiment of an exemplary LabVIEW graphical program node to open a session to a specified Switch Executive Virtual Device, according to one embodiment of the invention;

FIG. 30J illustrates one embodiment of an exemplary LabVIEW graphical program node to wait for all of the switches in the Switch Executive virtual device to debounce, according to one embodiment of the invention;

DETAILED DESCRIPTION OF THE PREFERRED EMBODIMENTS

Incorporation by Reference

U.S. patent application Ser. No. 09/745,023 titled "System and Method for Programmatically Generating a Graphical Program in Response to Program Information," filed Dec. 20, 2000, is hereby incorporated by reference as though fully and completely set forth herein.

Figure 2:
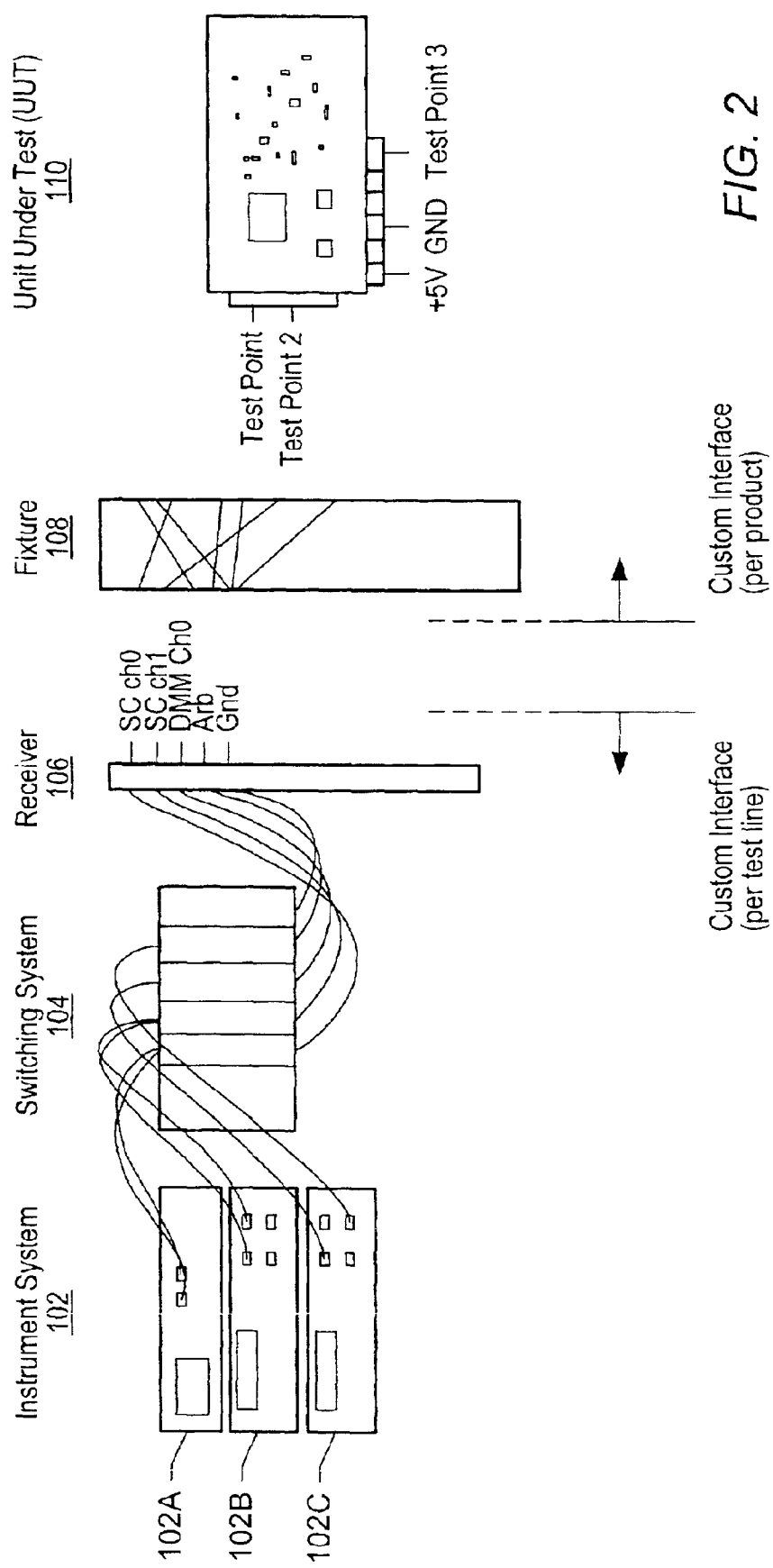
FIG. 2 illustrates a typical automated test system, according to one embodiment of the invention.

FIG. 2—Exemplary Measurement Embodiment

FIG. 2 is a block diagram illustrating an instrumentation or a test and measurement system according to one embodiment of the invention. A system and method are described below for creating routes for various test and measurement or instrumentation systems, and various other types of systems, which use a switching system 104. As shown, FIG. 2 includes an instrument system 102 comprising one or more instruments 102A, 102B and 102C, which may couple through a switching system 104 to a receiver 106. The receiver 106 may in turn couple to a fixture 108, which then connects to a plurality of test points on a device under test (DUT) 110, also referred to as a unit under test (UUT).

The instrument system 102 may comprise any of various kinds of instruments, including oscilloscopes, multimeters, computer-based instruments, signal generation devices and various other types of instruments or measurement devices, as well as power supplies, among others. The instrument(s) 102A, 102B, 102C may have various form factors. For example, the instrument(s) 102 may comprise a computer coupled to a GPIB instrument over a GPIB or IEEE 488 bus. Alternatively, the instrument system 102 may comprise a PXI chassis including a PXI controller and one or more PXI instruments, a computer system coupled to a PXI chassis which includes one or more PXI instruments, a computer system which includes a computer-based instrument card, such as an oscilloscope or multimeter card, such as those available from National Instruments Corporation, a VXI chassis including one or more VXI instruments, a system including a data acquisition card, or a traditional standalone instrument such as those available from Agilent, Tektronix, Keithley and others. The instrument system 102 may also comprise an image acquisition or machine vision system, such as a computer system including a video capture or image processing board, or a motion control device. Further, the instrument(s) 102 may comprise various types of industrial automation, control devices, or other devices, such as a programmable logic device (PLD), programmable logic controller (PLC), a distributed I/O system such as FieldPoint available from National Instruments Corporation, or other type of device. In general, the instrument system or measurement system 102 may comprise any of various kinds of devices operable to acquire or generate signals.

The switching system 104 may comprise one or more switch devices. As noted above, a switch device may comprise switches of various types including general-purpose switches, multiplexers and matrix switches among others. In a typical configuration, the switching system 104 may comprise a rack or chassis adapted to receive one or more switch cards. One example of a switching system is the SCXI (Signal Conditioning extensions for Instrumentation) System available from National Instruments Corporation. An SCXI chassis may contain one or more switch devices as well as other types of signal conditioning cards such as for isolation filtering etc. The switching system 104 may comprise switch devices from various different vendors as well. As discussed below with reference to FIG. 4, the computer system 101 may be operable to configure one or more switch devices, possibly from different vendors, as a single virtual switch device 105, thus simplifying operation of the switching system 104 to the user.

As shown, the various switch devices in the switching system 104 couple to the instrument through various wires or cables. Another common switching system configuration is a rack-mounted system wherein the switch devices are arranged vertically with various wires or cables connecting the switch devices together.

The various switch devices in the switching system 104 may also include one or more hardwire connections. A hardwire connection may be a connection made using a physical wire segment between a first channel on a first switch device and a second channel on a second switch device. This facilitates use of the multiple switch devices as a single virtual switch device 105. For example, the user may utilize a visual route editor to create a route utilizing channels of both the first switch device and the second switch device, wherein a hardwire connection connects the first switch device to the second switch device. A common example of a hardwire would be an analog bus that allows for the chassis to provide interconnects between modules.

The receiver 106 may couple to the various switch devices in the switching system 104 through various wires or cables as shown. The receiver 106 may couple to the fixture 108. The fixture 108 may separate out all the signal lines and couple the signal lines to the device under test. As shown, the receiver 106 may provide a custom interface for each signal line. The fixture 108 may provide a custom interface on a per product basis. The receiver 106 and the fixture 108 may simplify the task of creating and dismantling measurement and test systems coupled to various devices or units under test 110.

The device under test (DUT) 110, also called a unit under test (UUT) 110, may be one of any of various devices that are desired to be tested. In one embodiment, one or more various types of sensors may be coupled to the device under test 110 to transduce a physical phenomena generated by the DUT into electrical signals for providing through the fixture 108 and receiver 106 and through the switching system 104 to the instrument system 102. Examples of various sensors or transducers include thermisters, temperature sensors, pressure sensors, microphones, RTDs, strain gauges, etc. The DUT 110 may be operable to generate signals to the instrument system 102, i.e., may generate phenomena that are transduced into signals for receipt by the instrument system 102. Also, the instrument system 102 may include an arbitrary waveform generator or other signal generation capability to stimulate or control the device under test. Thus, the switching system 104 may act as a conduit for two-way communication between the instrument system 102 and the DUT 110.

Figure 3:
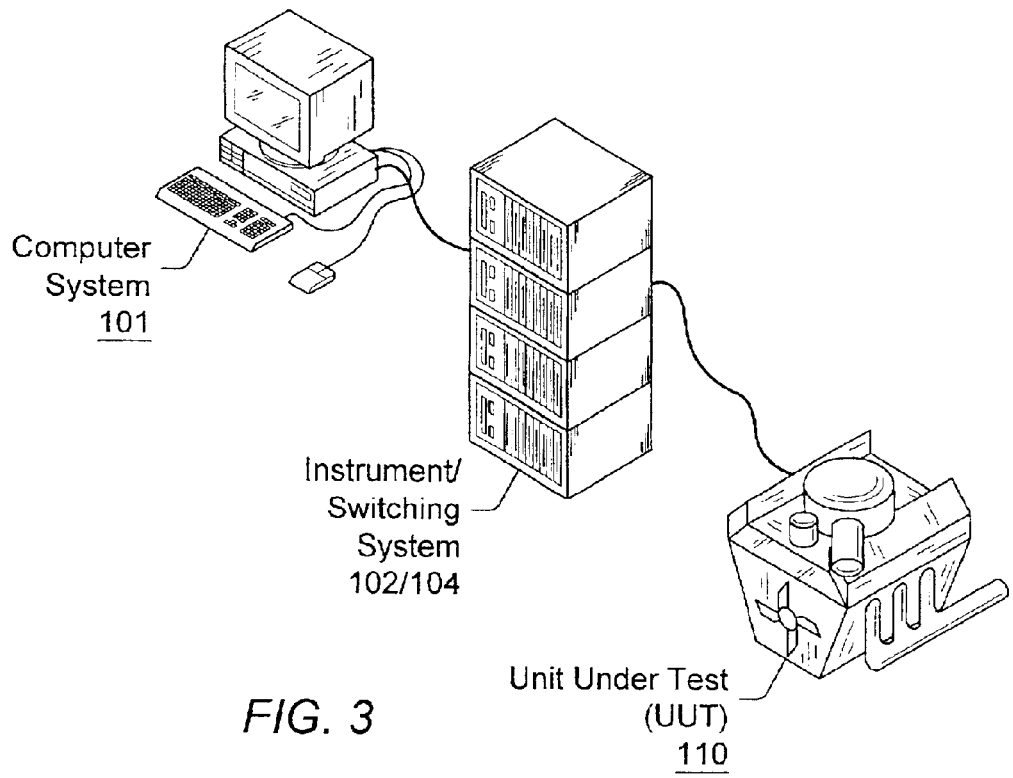
FIG. 3 illustrates a typical PC-based automated test system, according to one embodiment of the invention.

FIG. 3—Exemplary Computer Based Automated Test System

FIG. 3 illustrates an exemplary embodiment of a computer-based automated test system comprising a computer system 101 coupled to an instrument system 102. The instrument system 102 is coupled to the switching system 104, which in turn couples to the UUT 110. The instrument system 102 and the switching system 104 are shown together in FIG. 3 and are referred to below as the instrument/switching system 102/104. As shown, the computer 101 may comprise a separate computer system, which may couple to the instrument/switching system 102/104. The instrument/switching system 104 may comprise various chassis, such as various PXI and/or SCXI chassis. One or more measurement devices or instruments 102A, 102B, 102C may be comprised in the computer 101 or in the instrument system 102.

The computer system 101 may include a memory, which stores a switch executive software program according to one embodiment of the invention. During execution, the switch executive software program may query the various switch devices contained in the switching system 104 and use information obtained from these switch devices to aid in creating route configurations. Further, the computer system 101 may store various switch instrument drivers 210, 212, 214, which include information regarding the various switch devices that they control. In one embodiment, one or more of the switch devices may be IVI-compliant switch devices, and various IVI switch instrument drivers 210 comprised in the computer system may be operable to publish information regarding capabilities of the IVI-compliant switch devices that they control.

In another embodiment, the computer system 101 may be implemented as a card comprised in one of the chassis of the instrument/switching system 102/104. For example, the rack shown in FIG. 3 may include one or more PXI chassis and one or more SCXI chassis. The computer system may optionally be implemented as a PXI card contained in a PXI chassis of the rack. A monitor or display device, as well as various I/O devices such as a mouse or keyboard, may connect to the card in order to provide a user interface to aid the user in using the computer system. The operation of the switch executive software program is discussed in greater detail below.

Figure 4:
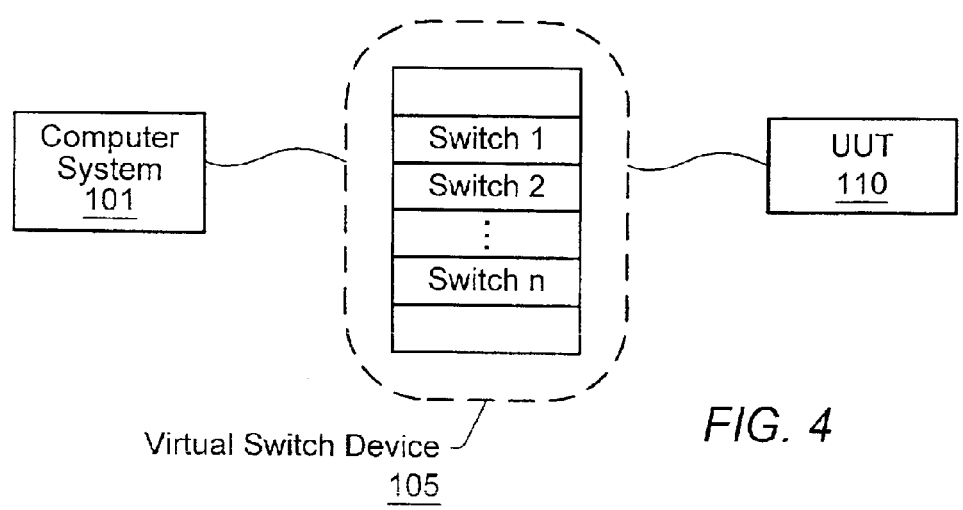
FIG. 4 illustrates an abstraction of a virtual switch device, according to one embodiment of the invention.

FIG. 4—Virtual Switch Device

FIG. 4 is a block diagram, which illustrates the computer system 101, which maintains a virtual switch device 105. The virtual switch device 105 may comprise a software entity or a software object which represents one or more of the switch devices contained in the switching system 104. The term "virtual switch device" may also refer to one or more hardware switch devices that operate as a single virtual switch. The user may select one or more of the physical switch devices for inclusion in the virtual switch device 105. In the example shown in FIG. 4, the virtual switch device 105 encompasses software for n switch devices, referred to as switch 1, switch 2, . . . switch n. The switch devices in the virtual switch device 105 software object may couple to the UUT 110.

Figure 5:
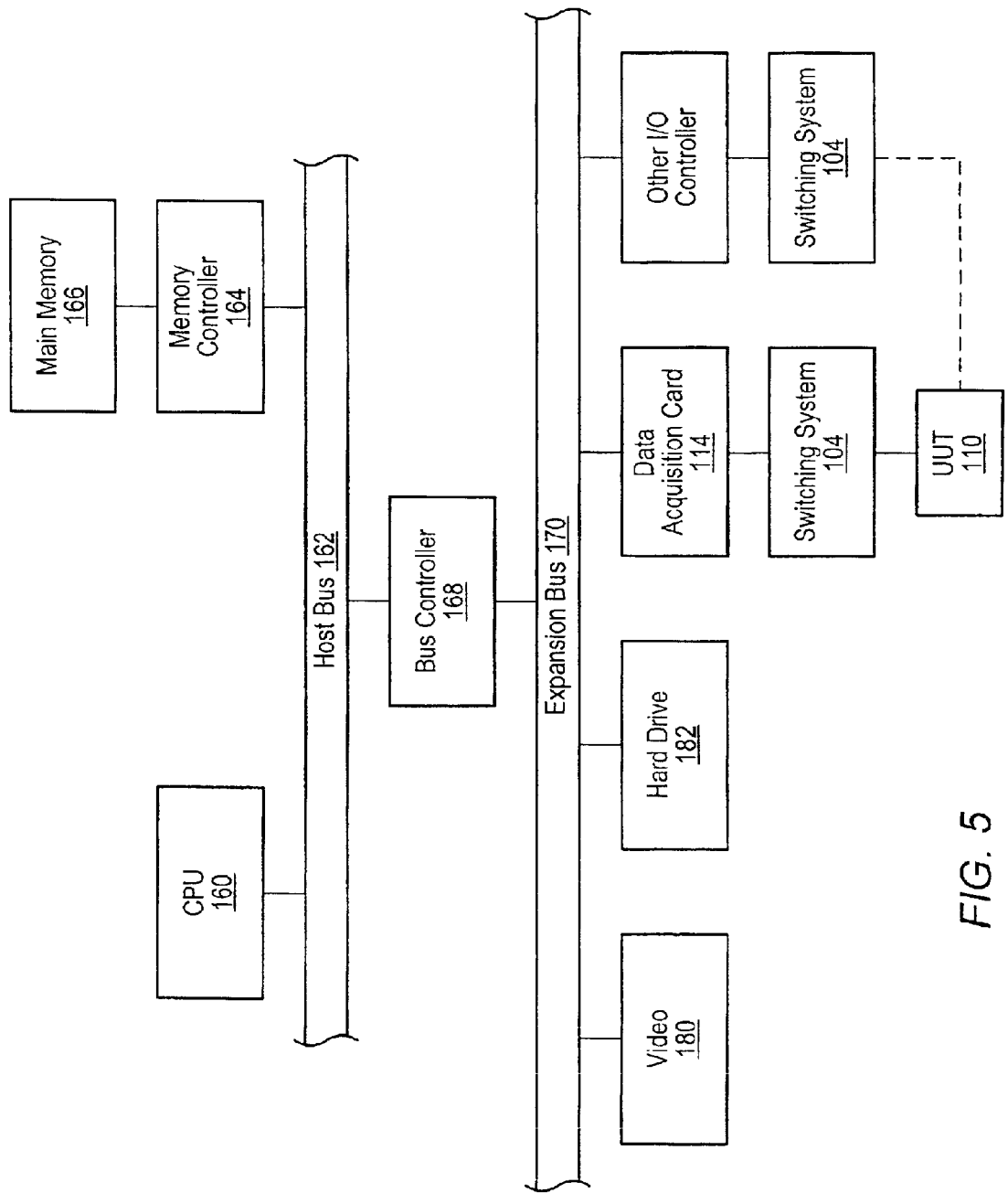
FIG. 5 is a block diagram of a computer system, according to one embodiment of the invention.

FIG. 5—Computer System Block Diagram

FIG. 5 is a block diagram representing one embodiment of the computer system 101 illustrated in FIGS. 3 and 4. It is noted that any type of computer system configuration or architecture can be used as desired, and FIG. 5 illustrates a representative PC embodiment. It is also noted that the computer system may be a general purpose computer system, a computer implemented on a VXI card installed in a VXI chassis, a computer implemented on a PXI card installed in a PXI chassis, or other types of embodiments. Elements of a computer not necessary to understand the present description have been omitted for simplicity.

The computer may include at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 may be coupled to the host bus 162 by means of memory controller 164. The main memory 166 may store the switch executive software program operable to generate configured routes and/or configure switch devices as described herein. The main memory 166 may also store switch instrument drivers for communicating with switch devices. The main memory 166 may further store an application program that uses route created using the switch executive software program. The main memory 166 may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as a data acquisition board 114. The computer system 101 further comprises a video display subsystem 180 and a hard drive 182 coupled to the expansion bus 170.

In the embodiment shown in FIG. 5, the instrument system 102 includes a data acquisition (DAQ) card 114. The DAQ card 114 may couple to a switching system chassis, such as an SCXI chassis 104, which comprises one or more switch devices. These one or more switch devices may in turn couple to a UUT 110. As noted above, various other embodiments are contemplated, such as a PXI system which includes a PXI instrument card in one or more PXI switch devices, a VXI system which includes a VXI system instrument card in one or more VXI switch devices, and other form factors including distributed I/O systems such as FieldPoint available from National Instruments.

Figure 6:
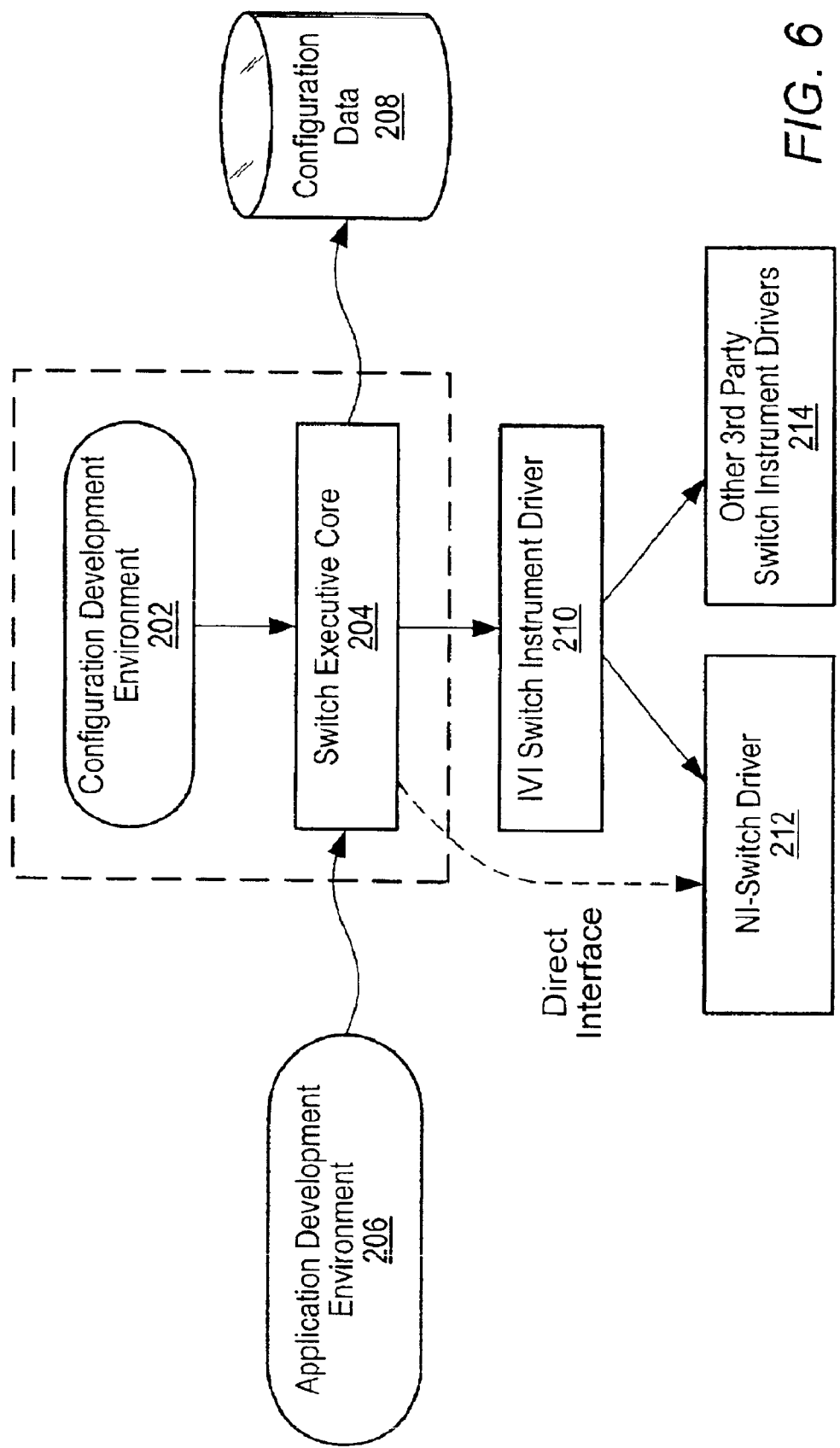
FIG. 6 is a block diagram of a switch executive software system, according to one embodiment of the invention.

FIG. 6—Exemplary Block Diagram of a Switch Executive Software System

FIG. 6 illustrates an exemplary software architecture of various software programs present on or used by the computer system 101 during creation of configured routes. As shown, the software architecture may comprise a configuration development environment 202 which interfaces with a switch executive core 204. An application development environment (ADE) 206 may interface with the switch executive core 204. The switch executive core 204 may be operable to generate configuration data 208, comprising configured routes (also referred to herein simply as "routes"). The ADE 206 may be utilized to create application programs that use the configured routes, such as test and measurement programs that use the routes to connect to a unit under test.

In one embodiment, the switch executive core 204 may interface with one or more switch instrument drivers, such as an IVI switch device driver 210. The IVI switch device driver 210 may in turn interface with various vendor-specific switch instrument drivers such as NI-Switch 212 available from National Instruments Corporation and/or various other third-party switch drivers 214. In another embodiment, the switch executive core 204 may interface directly to a specific switch device driver, such as the NI-Switch device driver 212.

The configuration development environment 202 may provide a graphical user interface of the switch executive program, which may be used by a user in creating configured routes. According to one embodiment of the invention, the configuration development environment 202 implements a visual route editor or graphical route editor that provides a graphical user interface enabling a user to graphically or visually create and/or edit routes. The visual route editor may allow for interactive route editing including modification of route endpoints, insertion and removal of devices and hard wires into a route, and may provide an intuitive graphical response as to the validity of routes being created. In one embodiment, the configuration development environment may also provide other design-time assisted routing to further simplify the creation of route configurations by a user, as explained in FIGS. 10, 11A–11I, and FIGS. 25, 26A–26E.

In some prior art systems, creating routes between different channels in a switching system requires intimate knowledge of all of the channels and switch devices being used. In systems where the channel count is quite large (in many cases on the order of $10^3$), this can be a very laborious task with many options. In many cases, there are multiple potential ways to complete a route, but a very large number of paths may make the completion of routes very difficult and time consuming.

The switch executive core 204 may use an algorithm that allows users to partially specify sections of the problem, i.e., partially specify sections of the route. If the switch executive core 204 can find a solution fitting the partial specification, the switch executive core may return the solution. If the switch executive core cannot find a full solution, the switch executive core may present a partial solution, along with options of steps to take next. The switch executive core 204 may also present solutions comprising a valid solution along with other potential solutions.

During the process of graphically creating a route, the route may be constantly validated. This powerful feature may advantageously allow user to create custom routes, with the creation being validated during the process.

The switch executive core 204 provides a "core", "engine", or logic of the switch executive software program for facilitating the various features described above. As shown, an application development environment (ADE) 206 may be used to interface with the switch executive core 204 through a defined application programming interface (API). Example ADEs include TestStand, LabVIEW, Measurement Studio, Visual C++ and others. The API presented by the switch executive core 204 may be used by any of various application programs, including those from National Instruments Corporation and other vendors.

Software interfaces to instruments are called instrument drivers. Instrument drivers are generally designed to provide high-level function calls that abstract the details of programming an instrument for specific actions. The Interchangable Virtual Instrument (IVI) standard, is one example of a standard programming interface for instrument drivers. The IVI specification defines architecture for IVI systems that incorporate productivity features. These features include instrument interchangeability, instrument simulation, and system performance. The IVI drivers include a plurality of driver classes, one for each type of an instrument, comprising DMMs, oscilloscopes, DC power supplies, arbitrary waveform or function generators, switch devices, and other instruments.

The IVI switch device driver 210, shown in FIG. 6, is one example of a switch device driver. An example of an IVI switch device driver is an NI-Switch device driver 212. Block 214 refers to various other switch instrument drivers 210 provided by third-party switch device vendors. It is noted that the switch device driver software architecture of elements 210, 212 and 214 may be specific to the IVI implementation of class drivers and specific drivers. In an alternate embodiment, the switch executive core 204 may interface to a single switch device driver layer wherein one or more switch instrument drivers may be present at this layer to interface with one or more switch devices.

In one embodiment, the switch executive core 204 may be operable to query one or more of the switch instrument drivers 210, 214, 212 to obtain information regarding the respective switch device controlled. For example, in the embodiment shown in FIG. 6, the switch executive core 204 is operable to query the switch device driver 210, 212, 214 to obtain detailed capability information on the respective switch device that the driver controls.

The switch device driver 210, 212, 214 may determine the capability of establishing a route between any two channels on a single device. A switch device driver for a particular switch device may have no knowledge, however, of other switch devices and interconnects in the system. The switch executive core 204 provides the capability of finding a configured route between any two channels in a switching system, whether or not the channels reside on the same device. As described below, the switch executive core 204 may use an algorithm for limiting the solution space and finding valid routes efficiently.

In one embodiment, the switch executive core 204 may not maintain any topology information for the switch devices it controls. Also, the switch executive core 204 may not require that the computer system executing the switch executive core 204 be physically connected to the switch devices to create routes. The switch executive core 204 may use the ability of the switch instrument drivers 210, 212, 214 to create configured routes in a simulation mode. Using multiple simulation sessions, the switch executive core 204 may create different hardware state configurations without actually controlling any hardware.

The configuration data 208 may comprise configured routes created by the user in response to using the switch executive software. The configured routes may define one or more routes and/or route groups used for controlling a switching system 104 which may comprise multiple switch devices. The configured routes may be used in application development environments such as LabVIEW or Measurement Studio to control a switching system 104 during an instrumentation or a measurement application. For example, the user may create an application using an ADE, wherein the application utilizes an API of the switch executive core 204 to request the switch executive core 204 to configure the switch devices according to one or more of the stored configured routes.

Figure 7:
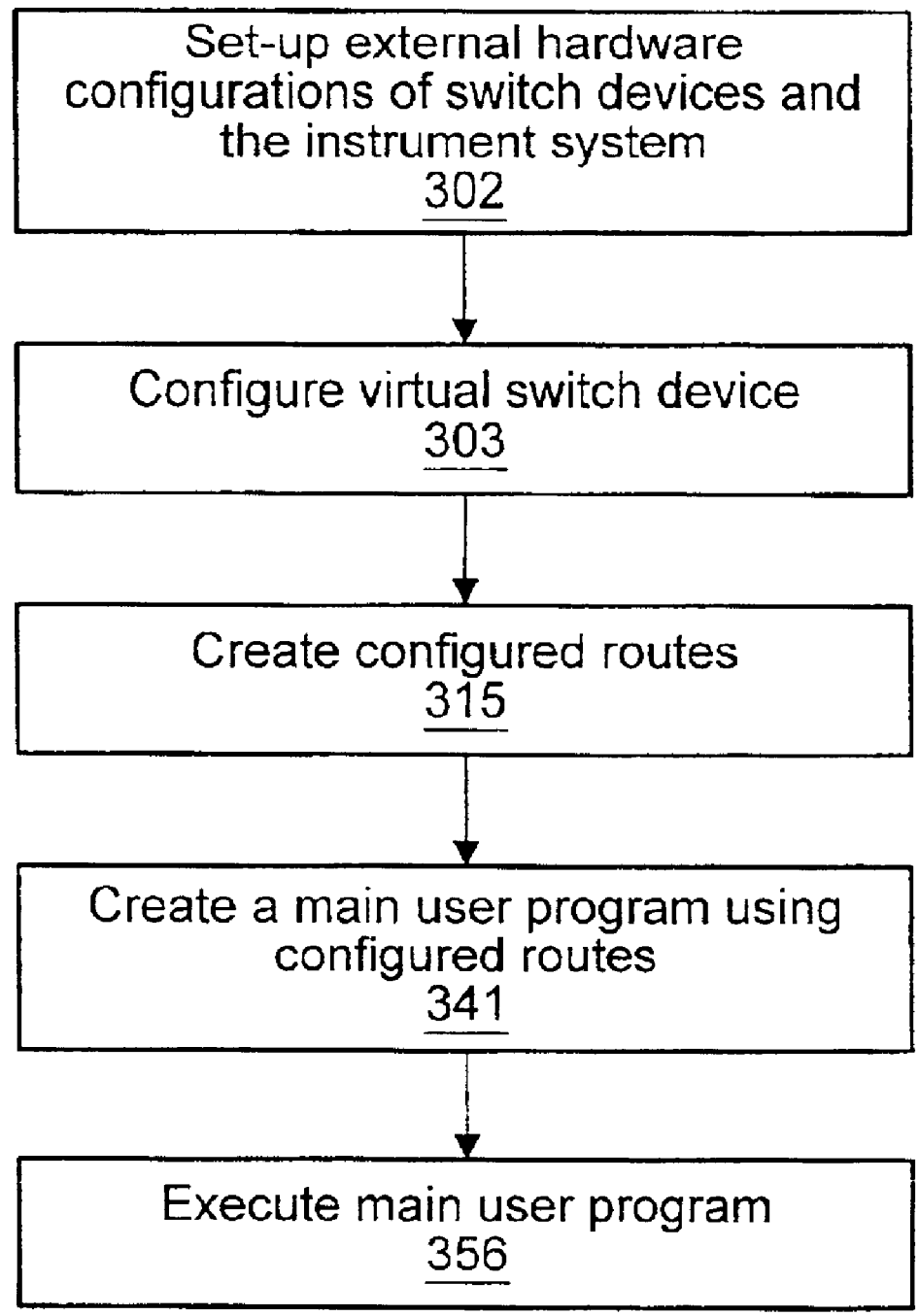
FIG. 7 is a flowchart illustrating a high-level execution of the switch executive software system, according to one embodiment of the invention.

FIG. 7—Flowchart Diagram of Execution of a Switch Executive Software System

FIG. 7 is a high level flowchart diagram illustrating one embodiment of a method for creating and using configured routes. Various of the steps in FIG. 7 are described in greater detail in the figures that follow.

In step 302 the user may set up the hardware configurations for the switching system 104 and the instrument system 102, such as described below with reference to FIG. 8.

In step 303 the user may configure the virtual switch device 105, including specifying various switch devices of the switching system 104 for inclusion in the virtual switch device 105.

In step 315 the user may create configured routes utilizing one or more devices in the virtual switch device 105, such as described with reference to FIG. 8 and FIG. 36. Step 315 may comprise the user utilizing a visual route editor to graphically or visually create the routes.

In step 341 the user may create a program using configured routes, such as a text-based program or a graphical program such as described with reference to FIGS. 28 through FIG. 35.

In step 356 the user may execute the program using configured routes in order to control switch devices in the virtual switch device 105 and the instrument system 102.

It is noted that the flowchart of FIG. 7 is exemplary only. Further, various steps in the flowchart of FIG. 7 may occur concurrently or in different order than that shown, or may not be performed, as desired. Also, various additional steps may be performed as desired.

Figure 8:
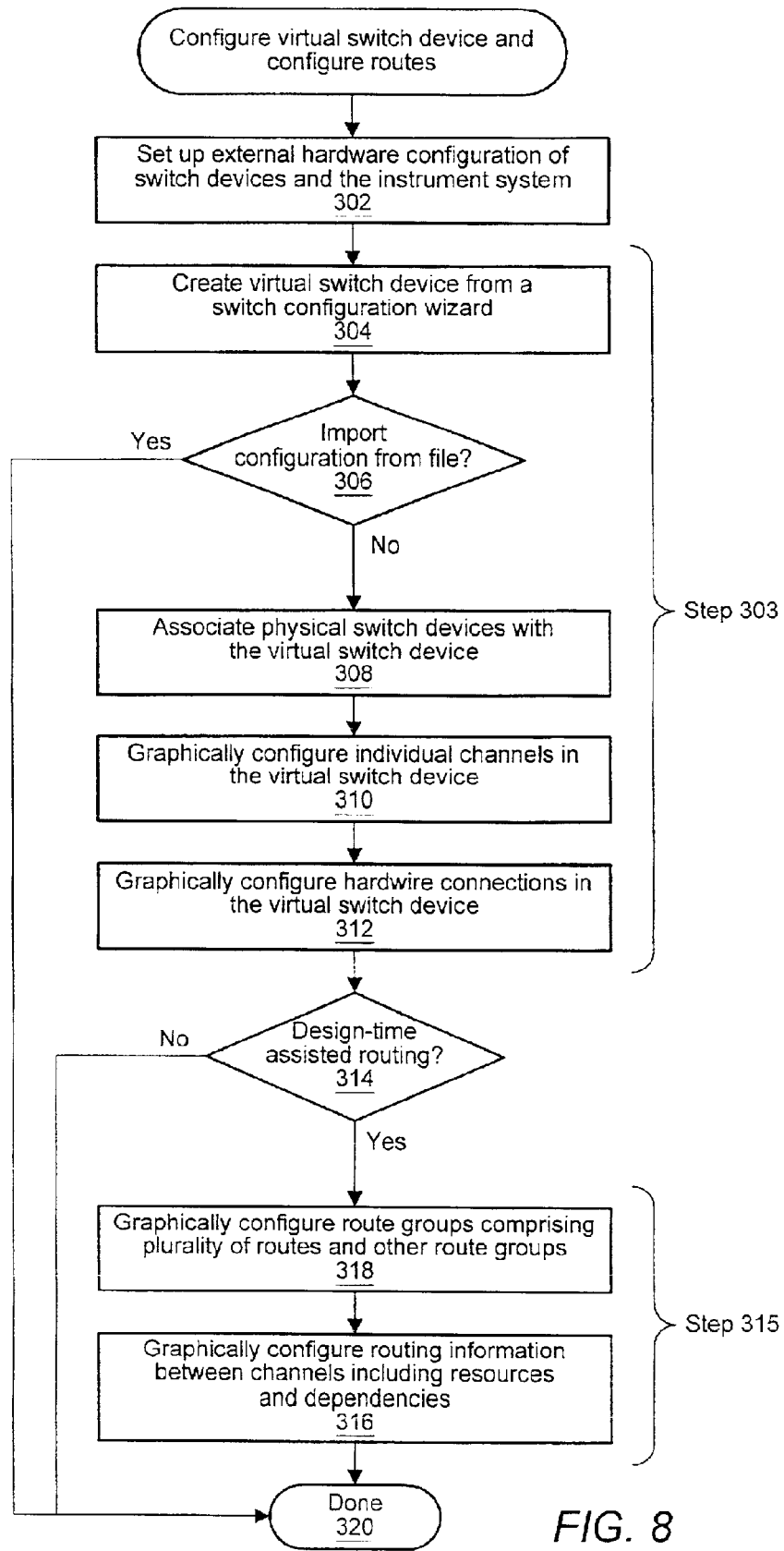
FIG. 8 is a flowchart illustrating configuring a virtual switch device and graphically configuring routes, according to one embodiment of the invention.

FIG. 8—Flowchart Diagram of Configuration of a Virtual Switch Device

FIG. 8 is a flowchart diagram illustrating a configuration of a virtual switch device 105, according to one embodiment of the invention. The flowchart of FIG. 8 illustrates steps 303 and 315 of FIG. 7 in greater detail. In the flowchart of FIG. 8, it is presumed that the user has a computer system 101 executing the switch executive software, which may interface with a switching system 104 that comprises one or more switch devices. It is further presumed that the computer system 101 may store one or more switch instrument drivers 210, 212, 214 for controlling the switch devices.

As shown, in step 302 the user may set up the hardware configuration of the switching system 104 and instrument system 102. Setting up the instrument system 102 may comprise coupling one or more instruments, e.g., 102A, 102B, 102C, to a computer system 101, e.g., as a card comprised in the computer system 101 or in a separate chassis or a separate standalone instrument. The instrument(s) may also be connected to the switching system 104. Setting up the switching system 104 may comprise installing one or more switch devices in the switching system 104.

In step 304 the switch executive core 204 may create a virtual switch device 105, such as described above with reference to FIG. 4, using a switch configuration wizard. The switch executive core 204 may be operable to display a switch configuration wizard, i.e., one or more GUI dialogs or windows for receiving user input regarding the virtual switch device 105. The switch executive core 204 may create and/or modify the virtual switch device 105 in response to user input to the wizard.

In step 306 the user may have various options on how to configure the newly created virtual switch device 105, including importing a virtual switch device 105 configuration that has been previously created from a file, or the user may manually associate external switch devices to create a new virtual switch device 105.

In step 308 the user may manually associate switch devices with the virtual switch device 105. The switch devices may be coupled to the computer system 101 and to the UUT 110. For example, the method may operate to display a list of switch devices coupled to the computer system 101. Graphical user input specifying the desired switch devices to associate with the virtual switch device 105 may then be received. The switch executive core 204 may query various switch instrument drivers 210, 212, 214 to determine the type and capabilities of each of the respective switch devices comprised in the switching system 104. For those switch devices that are not automatically detected, the user may manually input or select respective switch devices present in the switching system 104. The switch configuration wizard graphical user interface may show the user the various switch devices present in the switching system 104. In one embodiment, the user may graphically select one or more of the switch devices together to create a virtual switch device 105. For example, if five switch devices are present in the switching system 104, the user may select one or more of these switch devices to configure the virtual switch device 105.

In step 310 the user may graphically configure individual channels in the virtual switch device 105. The user may have an option to enter alias names in lieu of default channel names provided by the computer, as well as comments to help the user associate the named channel with the actual operation of that channel. The user also may see different attributes and/or resources for the given channel such as bandwidth of the channel, impedance of the channel, speed, current and other parameters. The user also may have a choice of channel type selection comprising a normal channel, a configuration channel or a source channel. Channel types may be defined by switch instrument drivers 210, 212, 214 or they may be user configured. In the visual route editor, the switch executive core 204 may use a normal channel as a configuration channel automatically if there is not already a user defined configuration channel for use.

A source channel is a channel that is being denoted as used by a signal source. The switch executive core 204 may not allow the user to connect two source channels together, either directly or indirectly, serving as a software protection mechanism that may prevent channels from being connected that may cause a hardware problem.

A configuration channel is essentially a channel that the user does not plan on directly connecting to any signals. The configuration channel may be reserved for use by the switch executive core 204 for use in route paths between other channels. A row may be marked as a configuration channel to connect two columns in a matrix.

A normal channel is a channel that is not a configuration channel or a source channel. The switch executive core 204 may use normal channels as endpoints in a route.

The switch executive core 204 may also provide a way to define and use hardwired connections between channels. In step 312 the user may graphically configure hardwire connections or use previously configured hardwires on the physical switch devices that connect the various switch devices together in the switching system 104. In step 312 the user may graphically configure or enter information into the computer system 101 regarding the various hardwire connections that are present between the various switch devices in the switching system 104. In another embodiment, the switch executive core may detect connections between channels and automatically create hardwires.

In step 314 if the user is performing design-time assisted routing, then operation may proceed to step 316. If the user desires not to perform design-time assisted routing, which means that run-time or manual routing may be performed, then operation may proceed directly to step 320 (done). Design-time assisted routing may comprise the user creating routes with the aid of the visual route editor described herein. For example, the routes may be pre-configured and later used in a program. In run-time routing, the route(s) may not be pre-configured, and a route between two channels may be dynamically determined at run-time of a program. In manual routing, the user may specify an explicit route between two channels, e.g., may provide information identifying each of the switches or channels through which the route passes.

If the user is performing design-time assisted routing in step 314, then in step 316 the user may graphically configure routing information between channels including various resources and dependencies. The operation of step 316 is described in greater detail in the flowcharts of FIG. 10, and FIGS. 11A–11I.

For design-time assisted routing, the switch executive core 204 may use a visual route editor to create routes. The visual route editor may allow for interactive route editing, including modification of route endpoints, insertion and removal of devices and hardwires into a path, and may provide graphical response as to the validity of the route. In other embodiments, the visual route editor may allow for fully interactive editing of the displayed route. This represents a major improvement over text/list schemes without graphical feedback.

In addition to allowing the specification of endpoints and route paths, the switch executive core 204 also may allow users to specify desired signal characteristics. This ensures that the switches used in the routing path can carry a signal matching the user's desired signal characteristics. Switch devices are available in a variety of types and are made for different purposes. By utilizing desired signal characteristics, the switch executive core 204 can pick channels on switches that meet these characteristics. The switch executive core 204 also may allow users to specify any other routes that they expect to coexist with the selected route. This allows the switch executive core 204 to avoid using any route elements that would create a resource conflict. In other embodiments, additional criteria may be used to find appropriate routes.

In one embodiment, instead of trying to keep track of hardware topologies for all of the switch devices, the switch executive core 204 may use the switch instrument drivers directly 210, 212, 214, thus eliminating the need for performing maintenance work on the topology files for the switch devices. The switch executive core 204 may query the switch instrument drivers 210, 212, 214 to determine switch system 104 routing information, then defer to the switch instrument drivers 210, 212, 214 to handle intra-device routing.

After the user has graphically configured routing information between channels, in step 318 the user may optionally configure route groups, where a route group comprises a plurality of routes.

It is noted that the flowchart of FIG. 8 is exemplary only. Further, various steps in the flowchart of FIG. 8 may occur concurrently or in different order than that shown, or may not be performed, as desired. Also, various additional steps may be performed as desired.

Figure 9:
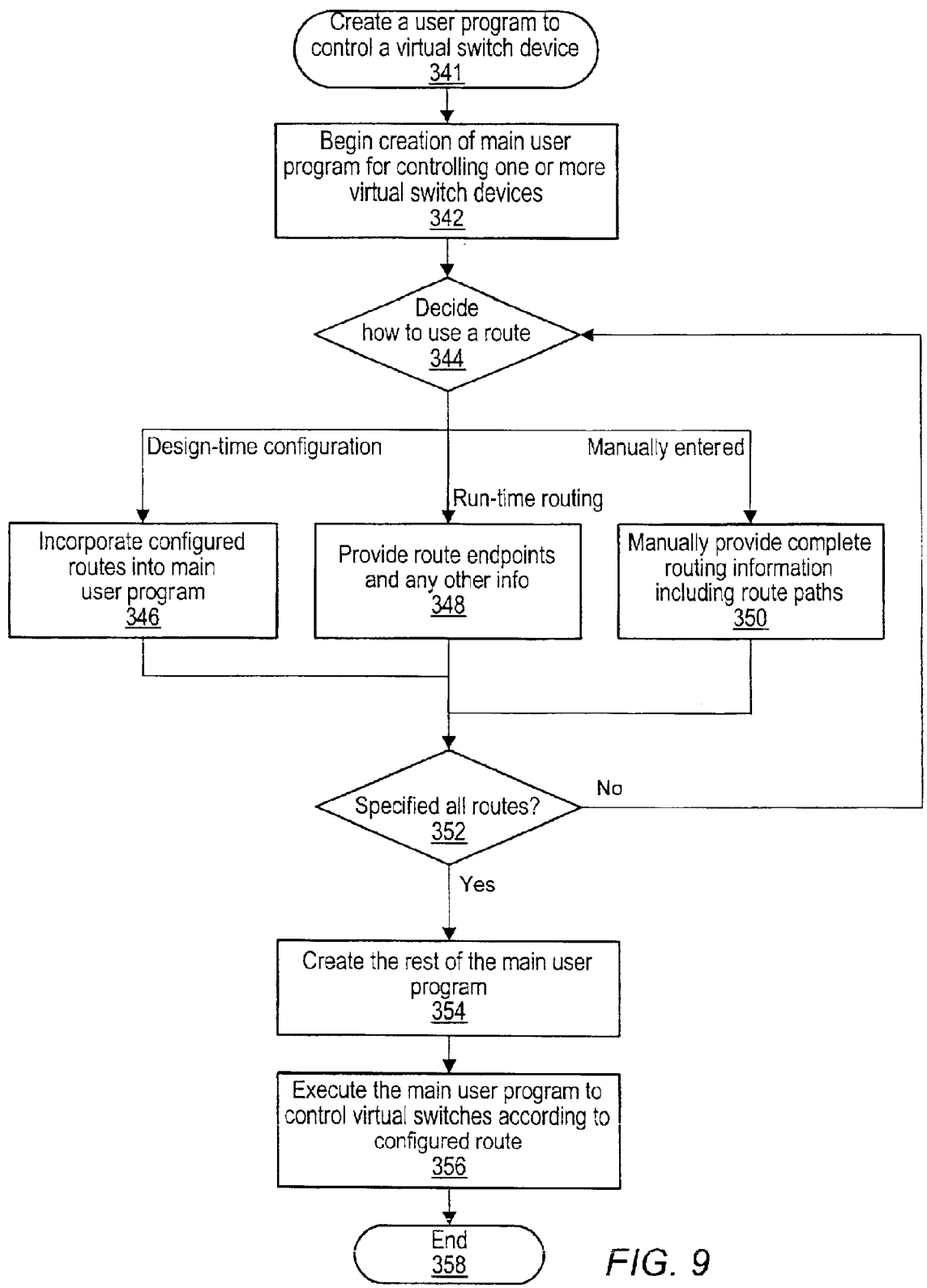
FIG. 9 is a flowchart of a method for creating a user program with route configurations, and executing the program according to one embodiment of the invention.

FIG. 9—User Program Execution with Switch Routing Information

FIG. 9 is a flowchart diagram illustrating one embodiment of a method for creating a user program that uses one or more routes to control or configure one or more switch devices. The flowchart of FIG. 9 illustrates step 341 of FIG. 7 in greater detail. It is noted that various steps of FIG. 9 may be performed in different orders or may be combined.

In step 342 the user may begin creating an application program for controlling one or more virtual switch devices 105. The application program may be a test or measurement program, an instrumentation program, an industrial automation program, or any other type of program which requires the use of switch devices. The program may be created using any of various programming environments or languages, or combination of environments and languages. In one embodiment, the program may be a text-based program, e.g., a program written in a text-based programming language such as C, C++, Visual Basic, Java, or another text-based programming language. In another embodiment the program may be a graphical program, e.g., a program comprising a plurality of interconnected nodes that visually indicate functionality of the program. For example, in one embodiment, the user may create a graphical program using the LabVIEW graphical programming development environment.

In step 344 the user may decide how to incorporate the routing functionality in the application program. For example, the user may: 1) use routes that were previously configured using the visual route editor; 2) use run-time routing techniques; and/or 3) use manual routing techniques.

For example, step 346 illustrates the use of a configured route previously created using design-time assisted routing such as described with respect to FIG. 7. Step 346 may involve configuring the program to use an API provided by the switch executive core 204. For example, if the program is a text-based program, the user may include one or more function or method calls of the API, e.g., which pass the configured routes as parameters, e.g., to programmatically to configure the various switch devices. As another example, if the program is a graphical program, the user may include one or more graphical nodes in the program which receive the configured routes, e.g., as input wires, and use the configured routes e.g., to programmatically to configure the various switch devices. As discussed further below, using a configured route in a graphical program may comprise connecting an icon representing the configured route to a switch node in the graphical program. The creation of a graphical program that uses one or more configured routes is described below with respect to FIGS. 28–35.

As shown in step 348, the user may also or may alternatively use run-time auto-routing to cause the switch executive core to dynamically determine one or more routes. For example, the user may enter two route endpoints, and then the run-time auto-routing algorithm may find a route between the two route endpoints, such as described below with reference to FIG. 13. In one embodiment, the switch executive core may dynamically determine the route when the program is executed. In another embodiment, the switch executive core may dynamically determine the route at edit-time of the program. For example, in response to the user providing the two route endpoints to a node in a graphical program, the switch executive core may be invoked to try to determine a route between the two endpoints. This may useful, for example, if there is no valid route between the two endpoints, so that the user may receive feedback informing him of the problem before the program is actually executed.

As shown in step 350, the user may also or may alternatively enter one or more routes manually, e.g., via a text-based or string-based format. The desired route list may be provided, comprising channels on one or more switch devices, or desired routes comprising complete route paths between the channels, and source and destination endpoints.

In one embodiment, the program may combine the various techniques of steps 346, 348, and 350. For example, a first portion of the program may use a pre-configured route to configure the switch devices, and a second portion of the program may use a route dynamically determined at runtime to configure the switch devices.

In each of steps 346, 348 and 350, the user may specify a connect/disconnect function between various routes in the application program. As discussed further below, when the switch executive core 204 executes to configure the desired routes, the switch executive core 204 may operate to intelligently manage connects and disconnects to accomplish optimized changes in routes that may reduce or eliminate unnecessary connects and disconnects of the switch devices. The software intervention in hardware state may improve relay lifetime and reduce execution time, and is discussed in greater detail with respect to the flowchart of FIG. 14 and FIGS. 15A through 15D.

As shown in step 352, after the portions of the program using routes have been specified, then operation may proceed to step 354. In step 354 the user may create the rest of the application program. For example, creating the rest of the program may comprise including functionality in the program to perform a test and measurement or instrumentation application, e.g., where data is sent to or received from a data sink/source accessible through the switch devices configured by the routing described above. It is noted that in various embodiments, the steps of FIG. 9 may be performed in various orders, may be performed multiple times, or may be interleaved. Thus, the user may create the program in any desired manner or order.

When the application program is complete, the program may be executed, as shown in step 356. During execution, the application program may control or configure the one or more virtual switch devices 105 according to the routes specified in any one or more of steps 346, 348 or 350.

It is noted that the flowchart of FIG. 9 is exemplary only. Further, various steps in the flowchart of FIG. 9 may occur concurrently or in different order than that shown, or may not be performed, as desired. Also, various additional steps may be performed as desired.

FIG. 10

Figure 10:
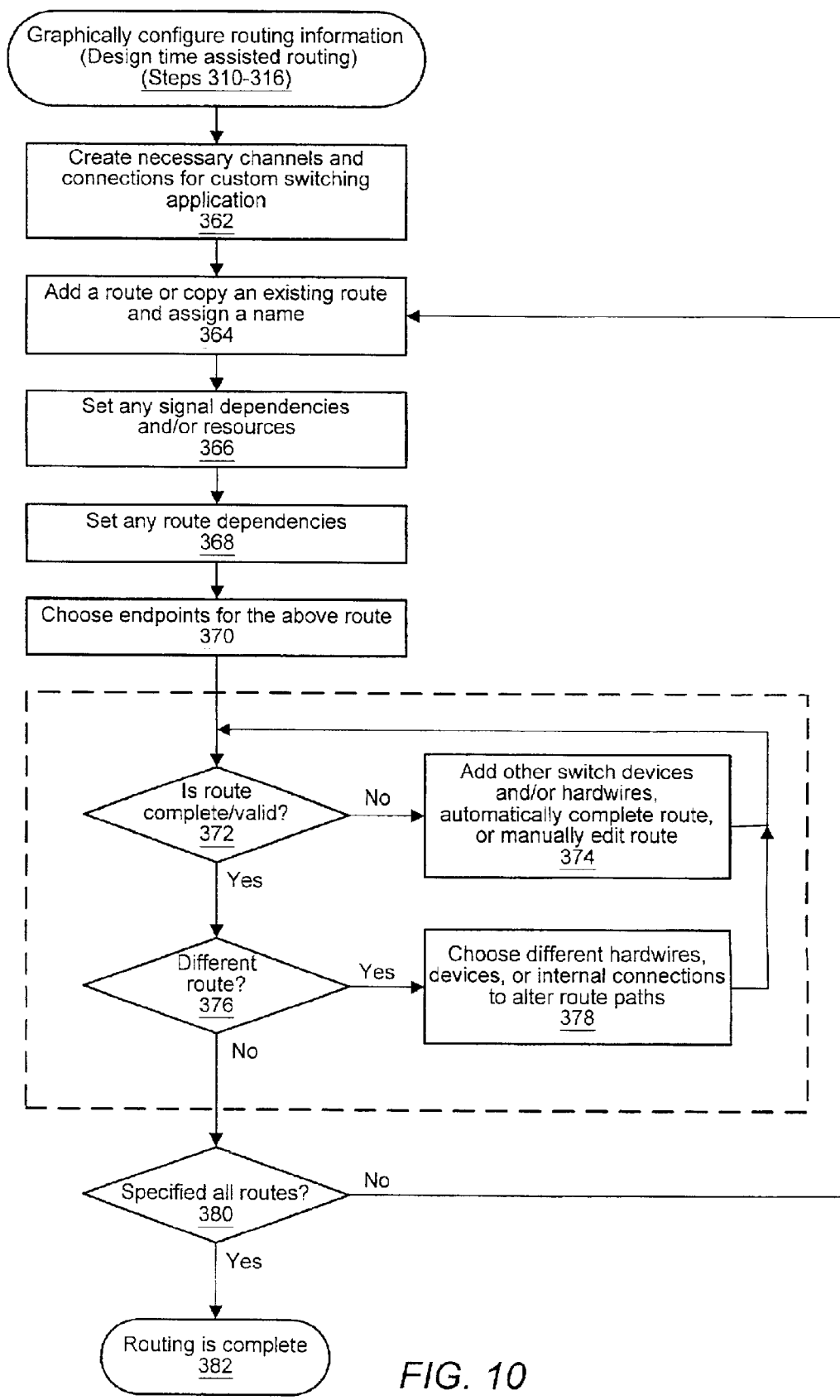
FIG. 10 is a flowchart illustrating visual design-time assisted routing, according to one embodiment of the invention.

FIG. 10 is a flowchart diagram which illustrates one embodiment of operation of steps 310–316 of FIG. 8, including visual design-time assisted routing, or graphical routing configuration between channels. Route paths may include internal connections between channels on the same switch device, as well as external connections using a hardwire between channels on different switch devices. The route may connect a left hand side endpoint and a right hand side endpoint. The endpoints may be connected through one or more switch devices, and may involve a plurality of channels of one or more types. The designation of one of the endpoints as a left hand side endpoint and the other as a right hand side endpoint may be arbitrary and may signify the graphical representation of the route in the visual route editor, as shown in FIGS. 11A–11I.

In step 362 the user may create necessary channels and connections for a switching application. This may include graphically configuring individual channels in the virtual switch device 105 (Step 310), as well as graphically configuring hardwire connections in the virtual switch device 105 (Step 312). The user may also have one or more chances to configure more devices, channels, and/or hardwires in steps 372 and 376.

In step 364 the user may add a first route or copy an existing route. When the user first adds the first route, the first route may be "empty", and the user may then provide input to complete the first route as described below. The user may assign the first route an alias name. The alias name may be utilized by the user for convenience. For example, the alias name "Oscilloscope CH0" may be more descriptive than "C5", an exemplary default name.

In step 366 the user may define desired signal characteristics and/or resources for the first route. Desired signal characteristics comprise parameters such as voltage, current, resistance, and speed requirements. For example, if a user selects a current requirement of 5 Amps (A), the visual route editor may filter channels so that only channels on switch devices capable of carrying a 5 A current are displayed for selection for inclusion in the route. In other words, desired signal characteristics help filter out unsuitable channels. Signal resources comprise other route requirements comprising dependencies on specific channels.

In step 368 the user may set route requirements, e.g., may specify that use of certain hardwires is required. Certain hardwires may need to be reserved for use with specific routes or route groups.

In step 370, the user may graphically choose two endpoints for the first route. For example, FIGS. 11A–11I illustrate an exemplary graphical user interface enabling the user to graphically choose the endpoints. The two endpoints may exist on a same switch device, or they may exist on two separate switching devices on the same virtual switch device 105. One of the endpoints may be coupled to an instrument 102A/102B/102C for the purpose of acquiring data or generating a signal. The other endpoint may be coupled to the UUT 110 for the purpose of acquiring data and/or stimulating the device under test. The user may use alias names for the endpoints for ease of configuration.

In step 372, the switch executive core 204 may decide if the first route is complete and/or valid. The algorithm for steps 372 through 378 is illustrated in FIGS. 11A through 11I. If the switch executive core 204 decides that the route is not complete, in step 374 the user has a choice to add other switch devices and/or hardwires to the first route, automatically complete the first route using the switch executive, or manually edit the first route. After executing step 374 the switch executive core 204 may perform step 372 again to determine if the modified first route is complete. In one embodiment, the user may allow the switch executive core to perform a more complete routing algorithm in an attempt to automatically complete the first route.

In step 376 the user may wish to select a different route or modify the first route even if the first route information is complete and correct. If the user decides to choose a different route or modify the first route, the user may choose different hardwires, devices, or internal connections that may alter the route path. If the user chooses a different route or modifies the first route in this manner, the switch executive core 204 may execute step 372 again to examine if the route is complete.

In step 380, the user may want to add more configured routes, as shown by the arrow to step 364. If all of the routes have been configured (step 382), then the visual design-time assisted routing is complete for the virtual switch. The user now may proceed to create and execute a user program that utilizes the configured routes, as described above.

It is noted that the flowchart of FIG. 10 is exemplary only. Further, various steps in the flowchart of FIG. 10 may occur concurrently or in different order than that shown, or may not be performed, as desired. Also, various additional steps may be performed as desired.

Creating a route in a graphical manner may comprise displaying various icons representing hardware elements in the route and displaying wires connecting the icons to indicate that the route passes through the respective hardware elements. For example, user input may be received to the graphical user interface of the visual route editor specifying a first endpoint of the route, wherein the first endpoint comprises a channel of a first switch device. In response, a first icon representing the first switch device may be displayed. User input may then be received to the graphical user interface of the visual route editor specifying a second endpoint of the route, wherein the second endpoint comprises a channel of a second switch device. In response, a second icon representing the second switch device may be displayed. The first icon and the second icon may visually indicate that the route passes from the first channel of the first switch device to the second channel of the second switch device.

One or more icons may be displayed between the first icon representing the first switch device and the second icon representing the second switch device. The visual route editor may interface with the switch executive core to automatically determine one or more additional elements that complete the route from the first endpoint to the second endpoint and may display icons representing the one or more additional elements to indicate the completed route.

As one example, a hardwire connection between the first switch device and the second switch device may be determined. A hardwire connection icon may be displayed between the first icon and the second icon. A first wire may be displayed to connect the first icon to the hardwire connection icon, and a second wire may be displayed to connect the hardwire connection icon to the second icon. The first and second wires may visually indicate that the route passes through the first switch device, the hardwire connection, and the second switch device.

The visual route editor/switch executive core may also determine that a second hardwire connection also exists between the first switch device and the second switch device. In this case, the user may be able to provide input to the graphical user interface to request to use the second hardwire connection instead of the first hardwire connection. In response, the hardwire connection icon may be re-displayed to visually indicate that the route passes through the second hardwire connection. For example, in one embodiment, the user may be able to interact with the hardwire connection icon itself to request to use a different hardwire connection, e.g., by choosing a different hardwire connection from a displayed list of available hardwire connections between the first switch device and the second switch device.

If there is no hardwire connection between the first switch device and the second switch device, the visual route editor may visually indicate that the route from the first channel of the first switch device to the second channel of the second switch device is incomplete. In this case, the user may specify a third switch device to insert in the route between the first switch device and the second switch device. In response, a third icon representing the third switch device may be displayed. If a first hardwire connection exists between the first switch device and the third switch device, and a second hardwire connection exists between the third switch device and the second switch device, then the route may be completed. For example, a first hardwire connection icon and associated wires may be displayed to visually indicate that the route passes from the first switch device through the first hardwire connection to the third switch device. A second hardwire connection icon and associated wires may be displayed to visually indicate that the route passes from the third switch device through the second hardwire connection to the second switch device.

In various embodiments, the icons representing hardware elements in the route may have any of various appearances and may display various types of information. In one embodiment described herein, an icon representing a switch device may display information specifying:

a name of the respective switch device a left hand side endpoint for the respective switch device, wherein the left hand side endpoint comprises a first channel of the respective switch device right hand side endpoint for the respective switch device, wherein the right hand side endpoint comprises a second channel of the respective switch device an internal path from the left hand side endpoint to the right hand side endpoint The internal path may include the first channel of the respective switch device, zero or more additional channels of the respective switch device, and the second channel of the respective switch device. The internal path may specify a path within the respective switch device from the first channel to the second channel. Thus, while the route as a whole may comprise a path passing through multiple switch devices, for each respective switch device in the route, there may be an internal path of channels within the respective switch device through which the route passes. In some cases, the internal path may simply comprise a connection from the left hand side endpoint channel to the right hand side endpoint channel. In other cases, the internal path may pass through one or more additional channels within the respective switch device.

When the user specifies a first (overall) endpoint for the route, the first endpoint may be displayed as the left hand side endpoint within a first switch device. Similarly, when the user specifies a second (overall) endpoint for the route, the second endpoint may be displayed as the right hand side endpoint within a second switch device. The internal paths for each of the switch devices in the route, together with the hardwire connections connecting the switch devices may specify the complete list of connections in the route.

The visual route editor may interface with the switch executive core to automatically determine various aspects of the route, such as the particular switch devices to include in the route, the particular internal paths to use, etc., and may display icons representing the route configuration. The user may interact with the displayed icons to alter the route as desired.

Figure 11D:
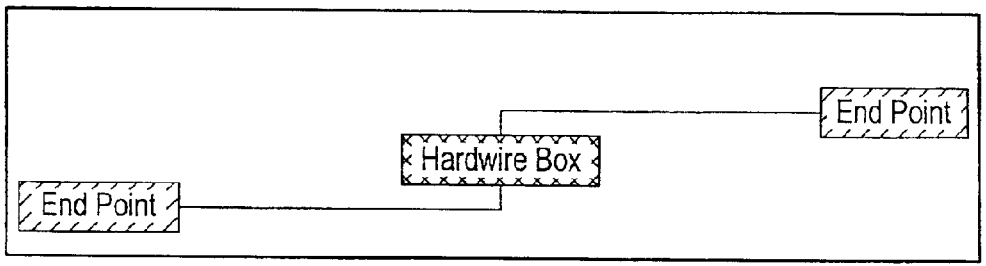
FIG. 11D is a diagram illustrating hardwired endpoints for visual design-time assisted routing, according to one embodiment of the invention.

FIGS. 11A through 11I illustrate exemplary steps involved in graphically configuring a route, according to one embodiment. In this embodiment, a visual representation of a switch device is displayed as a rectangular box comprising four values. As shown in FIG. 11A, from the top of the box, the first value may represent the switch device name. The second value may represent a left hand side endpoint (LHS) of the switch device. The fourth value may represent a right hand side endpoint (RHS) of the switch device.

Thus, there may be one left hand side endpoint and one right hand side endpoint for the entire route, as described above with reference to FIG. 10, and in addition, for each connection within the route from a first channel of a switch device to a second channel of the switch device, the connection may be described as having a left hand side endpoint (the first channel) and a right hand side endpoint (the second channel).

The third value in the rectangular box may represent an internal path in the switch device between the left hand side endpoint of the switch device and the right hand side endpoint of the switch device. In the visual representation of the switch device, the four values may have one or more states, comprising a "value known" or "not optional" state (represented as a filled-in rectangle), and a "value unknown" or "optional" state (represented as a blank rectangle). In the following description of FIGS. 11A–11I, an exemplary scenario of creating a first route in response to user input is discussed.

FIG. 11A

FIG. 11A is a diagram illustrating an empty state in the visual design-time assisted routing, according to one embodiment of the invention. FIG. 11A may represent the state of the graphical user interface of the visual route editor of FIG. 10. In FIG. 11A, the switch executive core 204 may be waiting on the user to visually select two endpoints for the first route. The endpoints may be selected by their alias name created in step 364, or by names of a first and second channel. No visual representation of a switch device may be displayed at this point, since the user has not yet selected an endpoint. The switch executive core 204 may prompt the user to enter two endpoints, a right hand side endpoint and a left hand side endpoint. Either of the endpoints can exist on any switch device in the virtual switch device 105. The next step is illustrated in FIGS. 11B–11C.

FIG. 11B

FIG. 11B illustrates one of the embodiment of the next user action, where the user first selects a left hand side (LHS) endpoint. As illustrated in FIG. 11B, once a first channel is selected as the LHS endpoint, the switch executive core 204 may know which switch device the first channel is on, so the visual representation of the first switch device may indicate the two known values, the first switch device name and the LHS endpoint (represented as the filled-in rectangles). The second endpoint, or the right hand side (RHS) endpoint, however, has not been yet configured. Thus the values for the RHS endpoint and the path to the RHS endpoint are shown in the "unknown" or "optional" state (represented as the blank rectangles). The switch executive core 204 may prompt the user to select the second endpoint, or the right hand side endpoint. The next step is illustrated in FIGS. 11D–11G.

FIG. 11C

FIG. 11C illustrates another embodiment of the next user action following FIG. 11A, where the user first selects a right hand side (RHS) endpoint. As illustrated in FIG. 11C, once a first channel is selected as the RHS endpoint, the switch executive core 204 may know which switch device the first channel is on, so the visual representation of the first switch device may indicate two known values, the first switch device name and the RHS endpoint (represented as the filled-in rectangles). The second endpoint, or the left hand side (LHS) endpoint, however, has not been yet configured. Thus the values for the LHS endpoint and the path from the LHS endpoint to the RHS endpoint are shown in the "unknown" or "optional" state (represented as the blank rectangles). The switch executive core 204 may prompt the user to select the second endpoint, or the left hand side endpoint. The next step is illustrated in FIGS. 11D–11G.

FIGS. 11D, 11E, 11F, and 11G illustrate possible embodiments of the next step that takes place after the steps illustrated in FIG. 11B or 11C, that depend on the user input of the second endpoint. In the steps illustrated in FIGS. 11D, 11E, 11F, and 11G the user may input a second endpoint, which corresponds to the right hand side end point if the user first selected a left hand side endpoint as illustrated in FIG. 11B, or the user may input a left hand side endpoint if the user first selected a right hand side endpoint as illustrated in FIG. 11C.

FIG. 11D

FIG. 11D illustrates one embodiment of the next step that takes place after the steps illustrated in FIG. 11B or 11C. The user may visually select a second endpoint on a second switch device. In the case of FIG. 11D, the switch executive core 204 may determine that a hardwire connection exists between the right hand side endpoint and the left hand side endpoint. Thus, the first route may be complete, and the switch executive core 204 may display a message to the user that there is a hardwire connection associated with the first route.

FIG. 11E

Figure 11E:
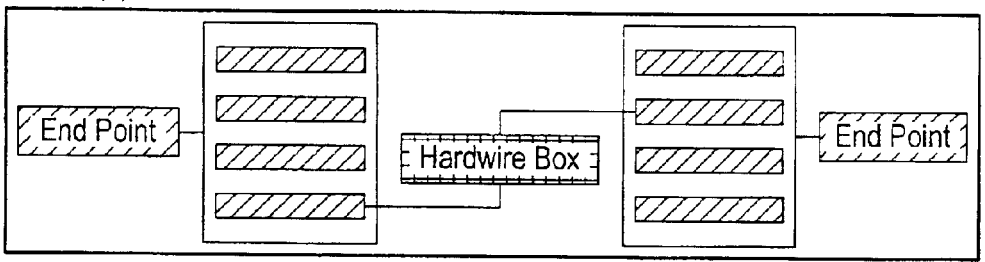
FIG. 11E is a diagram illustrating a created route using hardwire for visual design-time assisted routing, according to one embodiment of the invention.

FIG. 11E illustrates another embodiment of the next step that takes place after the steps illustrated in FIG. 11B or 11C. The user may visually select a second endpoint on a second switch device. In the case of FIG. 11E, the switch executive core 204 may determine that there is no hardwire connection between the endpoints, and the endpoints are not connectable on the same switch device. However, the switch executive core 204 may determine that there is a hardwire that can complete a route from the first endpoint to the second endpoint. For example there may be a hardwire connection that connects a first channel on the first switch device to a second channel on the second switch device, wherein the switch executive core 204 can route the LHS endpoint to the first channel and can route the RHS endpoint to the second channel. Thus, the switch executive core 204 may display a message to the user that the route is complete, and the switch executive core 204 may give the user a possible route path string which includes the hardwire connection.

FIG. 11F

Figure 11F:
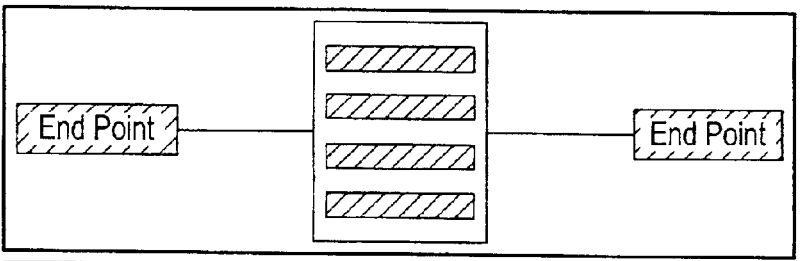
FIG. 11F is a diagram illustrating an internally created route for visual design-time assisted routing, according to one embodiment of the invention.

FIG. 11F illustrates another embodiment of the next step that takes place after the steps illustrated in FIG. 11B or 11C. The user may visually select a second endpoint on the same switch device as the first endpoint. Both endpoints, therefore, can be internally connected, as indicated by the visual representation of a single switch device. The switch executive core 204 may display a message to the user that the route is complete, and the switch executive core 204 may give the user a possible route path string.

FIG. 11G

Figure 11G:
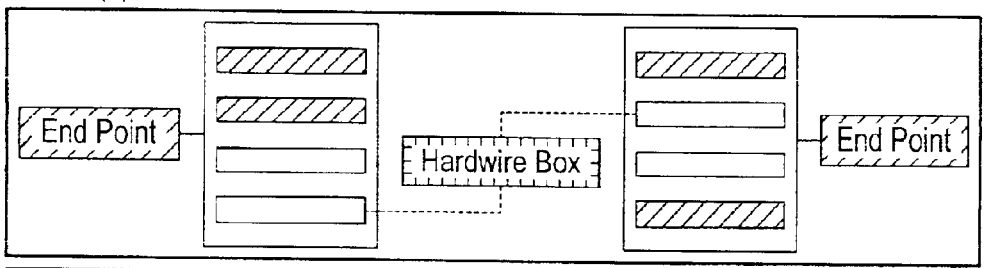
FIG. 11G is a diagram illustrating a broken wire which may require inserting a new device for route completion for visual design-time assisted routing, according to one embodiment of the invention.

FIG. 11G illustrates another embodiment of the next step that takes place after the steps illustrated in FIG. 11B or 11C. The user may visually select an endpoint on a second switch device. In the case of FIG. 11G, the switch executive core 204 may determine that there is no hardwire connection between the endpoints, and the endpoints are not connectable on the same switch device. The switch executive core 204 may also determine that there is no hardwire that can complete a connection between the first endpoint and the second endpoint, as illustrated by the visual representation of the switch device. Therefore no connection may be possible between the first endpoint and the second endpoint. The switch executive core 204 may display a message to the user that the route is not complete and may prompt the user to insert a new switch device in the route in order to provide a means for connecting the two endpoints.

Figure 11H:
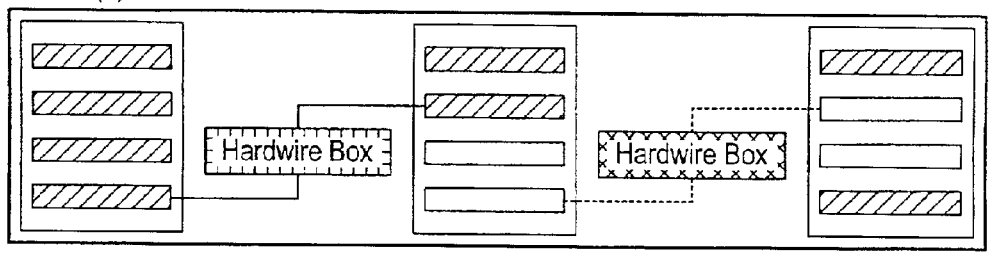
FIG. 11H is a diagram illustrating a broken wire which may require inserting a new device between devices 2 and 3 for route completion for visual design-time assisted routing, according to one embodiment of the invention.
Figure 11I:
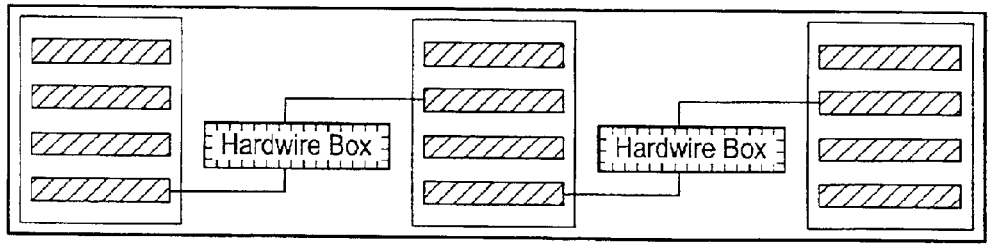
FIG. 11I is a diagram illustrating created route for visual design-time assisted routing, according to one embodiment of the invention.

FIGS. 11H, and 11I illustrate three possible embodiments of the next step of that takes place after the step illustrated in FIG. 11G. Each of FIGS. 11H and 11I involve the user selecting a third switch device to include in the route.

FIG. 11H

FIG. 11H illustrates another embodiment of the next step that takes place after the step illustrated in FIG. 11G. In this step the user may visually select a third switch device to insert in the route. However, the routing algorithm does not find a satisfactory solution for hardwire connections on one of the sides. The switch executive core 204 may prompt the user to insert a fourth switch device between the switch devices that are not making a connection.

FIG. 11I

FIG. 11I illustrates another embodiment of the next step that takes place after the step illustrated in FIG. 11G. In this step the user may have visually selected a third switch device to insert in the route. The routing algorithm was able to compute a possible routing path for a hardwire connection on both sides, between the first endpoint and the second endpoint. The visual route editor may show one or more values that connect the left and the right hand side visual representations of the switch devices using a hardwire. The switch executive core 204 may display a message to the user that the route is complete, and the switch executive core 204 may give the user a possible route path string.

Figure 12:
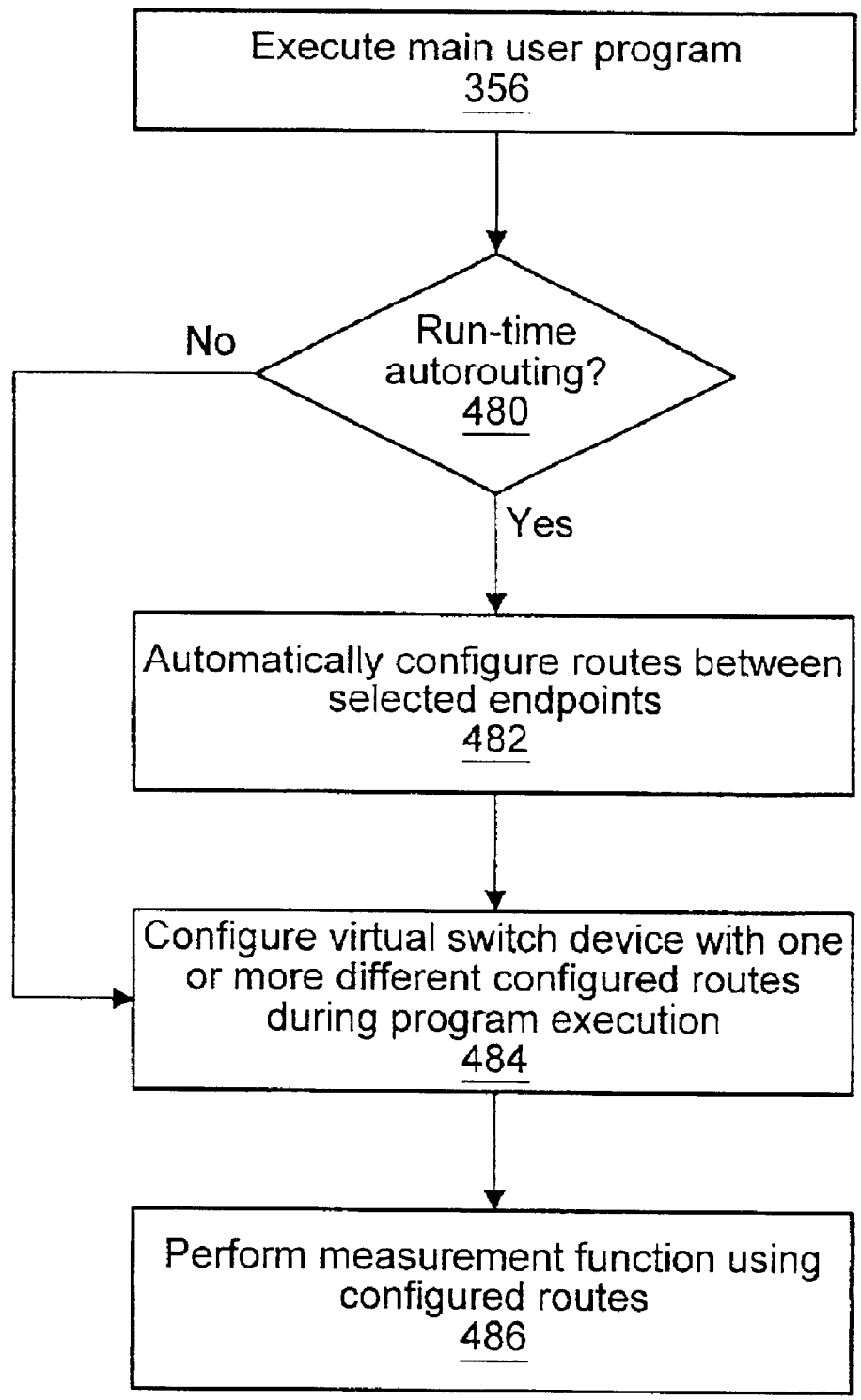
FIG. 12 is a flowchart illustrating an execution of a main user program that may use configured routes, according to one embodiment of the invention.

FIG. 12 Flowchart Diagram Illustrating an Execution of a Main User Program that May use Configured Routes FIG. 12 illustrates one embodiment of execution of an application program that uses configured routes. In step 356 the program may be executed (see step 356 of FIG. 7). As discussed above with respect to FIG. 9, the user may have a plurality of choices corresponding to the use of configured routes in the switch executive system 204, including design-time assisted routing, run-time auto-routing, and entering routing information manually. As shown in steps 480 and 482, if the program employs run-time autorouting, then the switch executive core 204 may dynamically determine a route between the two specified endpoints. Otherwise, the routes are already configured, e.g., were configured manually or by design-time assisted routing.

In step 484, switch devices included in the virtual switch device 105 may be configured with one or more routes during execution of the program.

In step 486, the main user program may utilize the routes to send and/or receive data via the switch devices. For example, the program may perform a measurement function using the routes. The measurement function may comprise connecting the instrument system 102 through the switching system 104 to a DUT or UUT 110, e.g., in order to control and/or acquire data from the DUT or UUT 110.

Figure 13:
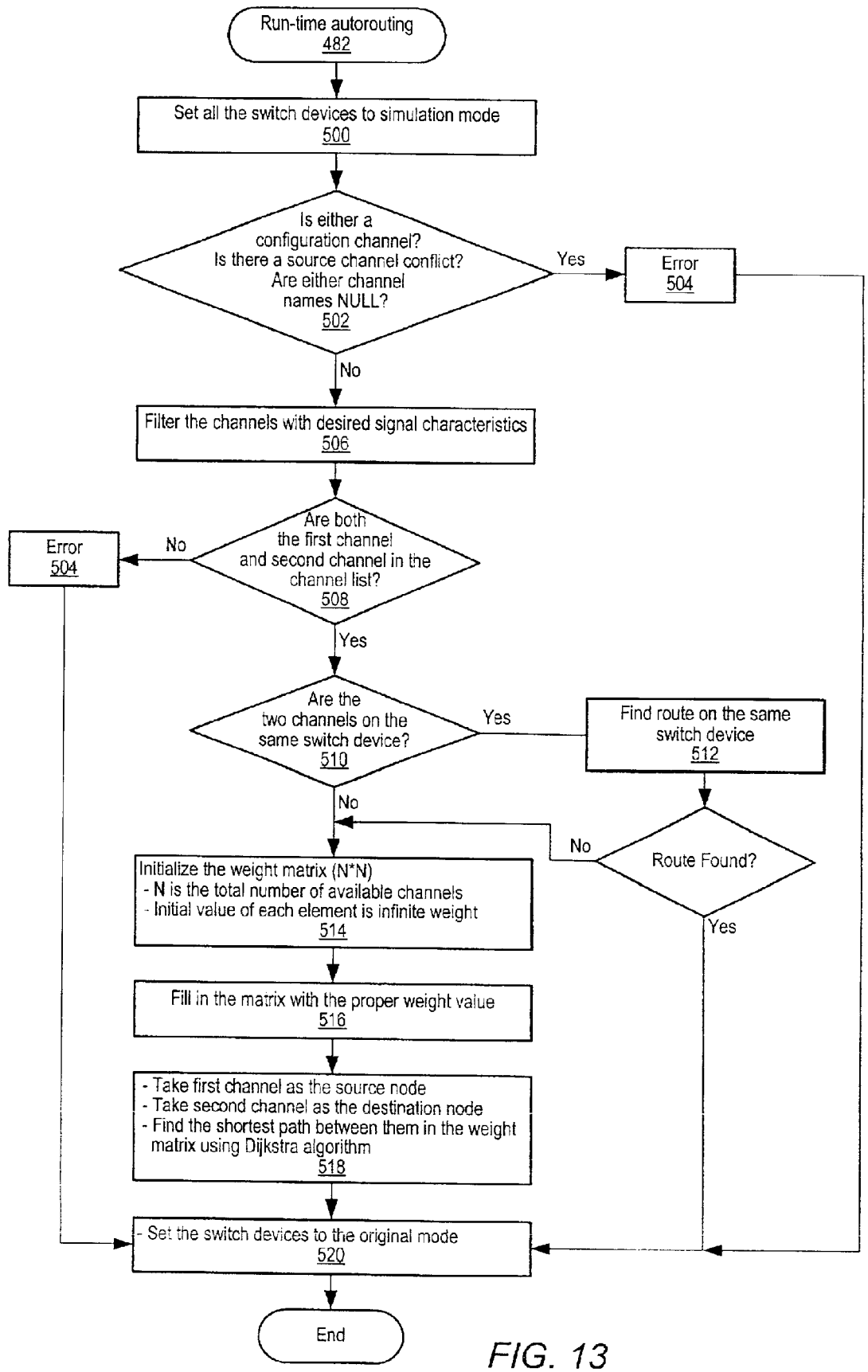
FIG. 13 is a flowchart of a method for National Instruments Switch Executive runtime auto-routing algorithm, according to one embodiment of the invention.

FIG. 13 Flowchart Diagram Illustrating the Method for a Runtime Auto-routing Algorithm FIG. 13 is a flowchart diagram illustrating one embodiment of a runtime auto-routing algorithm, e.g., which may be employed in step 482 of FIG. 12. The runtime auto-routing algorithm may be performed during execution of an application program as described above. The runtime auto-routing may use configuration channel settings, source channel settings, dependent routes and route groups, and desired signal characteristics.

In step 500, the runtime auto-routing algorithm first may set one or more of the switch devices in a simulation mode. The one or more switch devices may be set to simulation mode for the purpose of making the runtime auto-routing algorithm execute faster. In one embodiment, the one or more switch devices may be set to simulation mode such that the instrument driver may be executed without making actual hardware connections.

In Step 502, the runtime auto-routing algorithm may make several checks to make sure that the first endpoint and the second endpoint are valid. These checks may comprise making sure that none of the channels are configuration channels, since configuration channels may only be used for interconnections between channels. Next, the runtime auto-routing algorithm may check that there is no source channel conflict. Also, both of the channels may be checked for existence, such that none of the channels have NULL names (invalid names for the virtual switch device), which would indicate that the channel with the NULL name does not exist.

In Step 506, the runtime auto-routing algorithm may filter the channels with desired signal characteristics. The channels may be filtered by desired signal characteristics such as voltage capacity, current capacity, and resistance. After the channels are filtered, only the channels meeting the desired signal characteristics will be considered as available channels.

In Step 508, the runtime auto-routing algorithm may search for both of the channels in the channel list. If either one or both the first endpoint and the second endpoint cannot be found in the channel list, the runtime auto-routing algorithm may return an error.

In Step 510, the runtime auto-routing algorithm may have found both the first endpoint and the second endpoint in the channel list, and the runtime auto-routing algorithm may examine if both of the endpoints exist on the same switch device.

In Step 512, both of the endpoints exist on the same switch device. The runtime auto-routing algorithm now may find a route on the same switch device, and the runtime auto-routing algorithm may execute Step 520 next.

In one embodiment, in Step 514, the first endpoint and the second endpoint are not on the same switch device. The runtime auto-routing algorithm now may initialize a weight matrix, which may be used in conjunction with the Dijkstra algorithm to find the optimal and shortest path. The weights may be analogous to the "distance" between two channels. For example, if the path is between two channels, "r0->c0", the weight may be 2, since only r0 and c0 are involved. If the path is "r0->c0->r1", the weight may be 3, since 3 channels r0, c0 and r1 are involved. If there is no path available between two channels, the weight may be assigned an infinite value. The runtime auto-routing algorithm may try to find the shortest path between two endpoints. In this step, all the weights may be given infinite values since they are not yet initialized. Other embodiments of finding the optimal and shortest path between the first endpoint and the second endpoint are contemplated.

In one embodiment, in Step 516, all of the elements in the matrix may be filled with the appropriate weight values according to the rules mentioned above. In addition, the runtime auto-routing algorithm may assign a special value to hardwired devices. If the channel in the row and the channel in the column are on the same device, the runtime auto-routing algorithm may search for the path between them and may calculate the corresponding weight. If there is no path, the weight value may be left as infinite weight.

In one embodiment, in Step 518, the runtime auto-routing algorithm may use the first endpoint as the source node and the second endpoint as the destination node, and may compute the shortest path between the first node and the second node using the Dijkstra algorithm.

In one embodiment, in step 520, the runtime auto-routing algorithm may disconnect the dependent routes and route groups. In addition the switch devices may be taken out of the simulation mode into their original mode.

It is noted that the flowchart of FIG. 13 is exemplary only. Further, various steps in the flowchart of FIG. 13 may occur concurrently or in different order than that shown, or may not be performed, as desired. Also, various additional steps may be performed as desired.

FIG. 14

Figure 14:
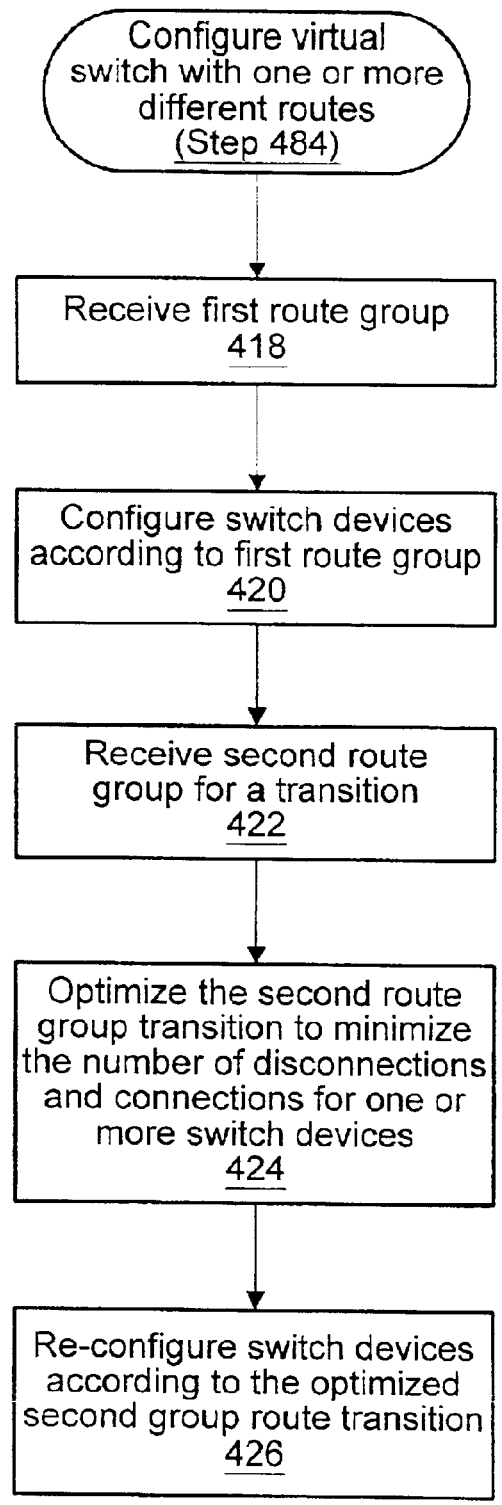
FIG. 14 is a flowchart of a method for a switch transition reduction algorithm, software intervention in hardware state changes to improve relay lifetime and reduction in execution time, according to one embodiment of the invention.

FIG. 14 is a flowchart diagram illustrating one embodiment of a method for software intervention in hardware state to improve relay lifetime and reduce execution time. The method of FIG. 14 may be used in any instance where one or more switch devices are currently configured with a first one or more routes and it is desired to reconfigure the one or more switch devices with a second one or more routes. This method may use a switch transition reduction algorithm to perform an optimized transition between a plurality of configured routes and/or a plurality of route groups that may reduce or minimize the number of physical switching actions of switch devices based on the plurality of configured routes.

The user may execute a program associated with any of various application development environments (ADE) 206 that may be used to interface with the switch executive core 204, such as TestStand, LabVIEW, Measurement Studio, Visual Basic, and Visual C++, among others. One embodiment of the switch reduction algorithm is explained in detail in FIGS. 15A–15D. As used herein, the term "group of routes" refers to one or more configured routes, and may be used interchangeably with the term "route group". The configured route may be created across one or more switch devices, as described above with reference to FIG. 10 and FIGS. 11A through 11I. The configured route may comprise a plurality of channels on one or more switch devices.

In Step 418, the switch executive core 204 may receive a first route group. The first route group may include one or more routes.

In Step 420, the switch executive core 204 may configure one or more switch devices of the virtual switch device 105 according to the routes in the first route group, i.e., may "connect" each route in the first route group. This may involve setting the switch devices into their proper state as described by routes in the first route group. In other words, for each route of the first route group, connections may be made within the switch devices to configure the switch devices to perform the route, e.g., so that data can travel via the channels in the route.

In step 422 the switch executive core 204 may receive a second route group including one or more routes. The second route group may be received for a transition of the state of the switch devices. In other words, the transition may involve disconnecting routes of the first route group and connecting routes of the second route group. In other words, for each route of the first route group, it is desired to disconnect the connections previously made in step 420, and for each route in the second route group, it is desired to make connections within the switch devices to connect these routes, similarly as for step 420.

The first route group and the second route group may share common routes and/or one or more routes of the first route group may share one or more common channel connections (i.e., a connection between two channels) with one or more routes of the second route group. In step 424, the switch executive core 204 may analyze the first route group and the second route group in order to find these common elements and may determine an optimized transition to the second route group based on the common elements. The optimized transition may be based on reducing or eliminating redundancies. For example, disconnecting a route in the first route group followed by re-connecting the same route in the second route group is redundant. Also, if a first route in the first route group and a second route in the second route group share a common connection between two channels, it is redundant to disconnect the connection when disconnecting the first route, followed by re-connecting the connection when connecting the second route. In various embodiments, the method may seek to optimize the transition based on one or both of these levels.

In step 426, the switch executive core 204 may re-configure the one or more switch devices according to the optimized transition to the second route group determined in step 424. As described above, the re-configuration may include performing disconnections in the one or more switch devices for routes of the first route group. However, disconnections may not be performed for the common elements, i.e., for common routes and/or common channel connections. The re-configuration may also include performing connections in the one or more switch devices for routes of the second route group. However, performing connections for the common elements, i.e., for common routes and/or common channel connections, may not be necessary since these elements are already connected.

It is noted that the flowchart of FIG. 14 is exemplary only. Further, various steps in the flowchart of FIG. 14 may occur concurrently or in different order than that shown, or may not be performed, as desired. Also, various additional steps may be performed as desired.

FIGS. 15A–15D

FIGS. 15A–15D illustrate one embodiment of a method for software intervention in hardware state to improve relay lifetime and reduce execution time. FIGS. 15A–15D are exemplary embodiments of a switch transition reduction algorithm for calculating an optimized transition between a plurality of configured routes and/or a plurality of route groups that may minimize the number of physical switching actions of switch devices.

The switch transition reduction algorithm may use one or more data structures comprising a list of existing routes, list of existing connections, and a list of existing disconnections. Each connection that is successfully completed is added to a list of existing connections. Each route that is successfully completed is added to the list of existing routes. The user may wish to connect a desired route list, which may comprise one or more routes, each route comprising one or more connections and one or more disconnections. There may be two types of route connections: non-reference counted and reference counted connections. The non-reference counted connections do not allow other routes to share resources. The reference counted connections, also referred to as route-sharing, or multiconnect, do allow other routes to share resources. The switch transition reduction algorithm may also use a plurality of procedures described below, such as Connect, Disconnect, and ConnectAndDisconnect functions.

Preparing for Connect Function for Non Reference Counted Connections

Before performing any connections, the Connect function may first examine endpoints for the connections in desired route list. If the endpoints for the connections in desired route list are the same as two endpoints of a route in the list of existing routes, or any other two endpoints in the list of existing connections, it may be an error condition, since multiple connections of the same route are not allowed. If this occurs the switch executive core 204 may produce an error.

The design-time routing assistance algorithm can also check for any connections that may collide, before trying to connect any connections by examining the list of existing connections for each connection in the desired route. If there are any connections that are duplicated, the switch executive core 204 may produce an error.

Preparing for Connect (Reference Counted Connections)

Before performing any connections, the Connect function may first examine endpoints for the connections in the desired route list. If the two endpoints of any route in the endpoints for the connections in desired route list are the same as two endpoints of a route in the list of existing routes or in the list of existing connections, the desired route list has a potential match. If the potential match is with a route that is marked as non-shareable, the switch executive core 204 may produce an error.

To discover if it is a true match, the switch executive core 204 may examine if the connection paths are the same for the two matching routes. If the two are a true match, the routes are merged with one another, or the duplication is removed. If the routes have the same endpoints but there is not a true match, the switch executive core 204 may produce an error.

Performing the Connection

Once the desired route list has been prepared and verified for either mode of operation, reference counted or non-reference counted mode, the switch executive core 204 may treat the desired route list as a reference counted connection mode. During the connection process the switch executive core 204 may connect each route in the desired route list by connecting its connection paths. If anything fails during a connect operation, the switch executive core 204 may return the system to state that it was in before the Connect function was called.

Disconnect Function

When disconnecting, the disconnect route list may be prepared in much the same manner as that of the connect route list. However, for the Disconnect function, it may not be important whether or not the connection is marked as non-shareable; thus, this check may not be performed. The Disconnect function may find a true match for every connection. If the Disconnect function tries to disconnect a route that is not found in list of existing disconnections, the switch executive core 204 may produce an error. Assuming that the connections were all made in the reference counting modes as described above, the Disconnect function can always behave as though disconnecting a reference counted route. Once the switch executive core 204 reaches the end of the list of existing disconnections, if there were any disconnection errors the switch executive core 204 may produce an error.

ConnectAndDisconnect Function

When the switch executive core 204 performs a Connect function and a Disconnect function in the same operation, the switch executive core 204 may compare the connects and the disconnects in the desired route list to minimize actual hardware operation. This involves initial special preparation depending on the arguments to the function, followed by one pass that holds for all cases (Steps 466–468). If an item exists in both the connects and the disconnects in the desired route list, it may be discarded from both.

If one or the other of the specifications is empty, the function should behave as though it is a standalone function call to either Connect or Disconnect functions. If the Connect and Disconnect specification is not empty, and the same, the function should essentially be a no operation from the hardware perspective. The ConnectAndDisconnect function may have different modes of operation depending on whether or not route sharing is enabled and depending on the order of operation: break before make or break after make, also referred to as disconnect-before-connect and connect-before-disconnect respectively.

FIG. 15A

Figure 15A:
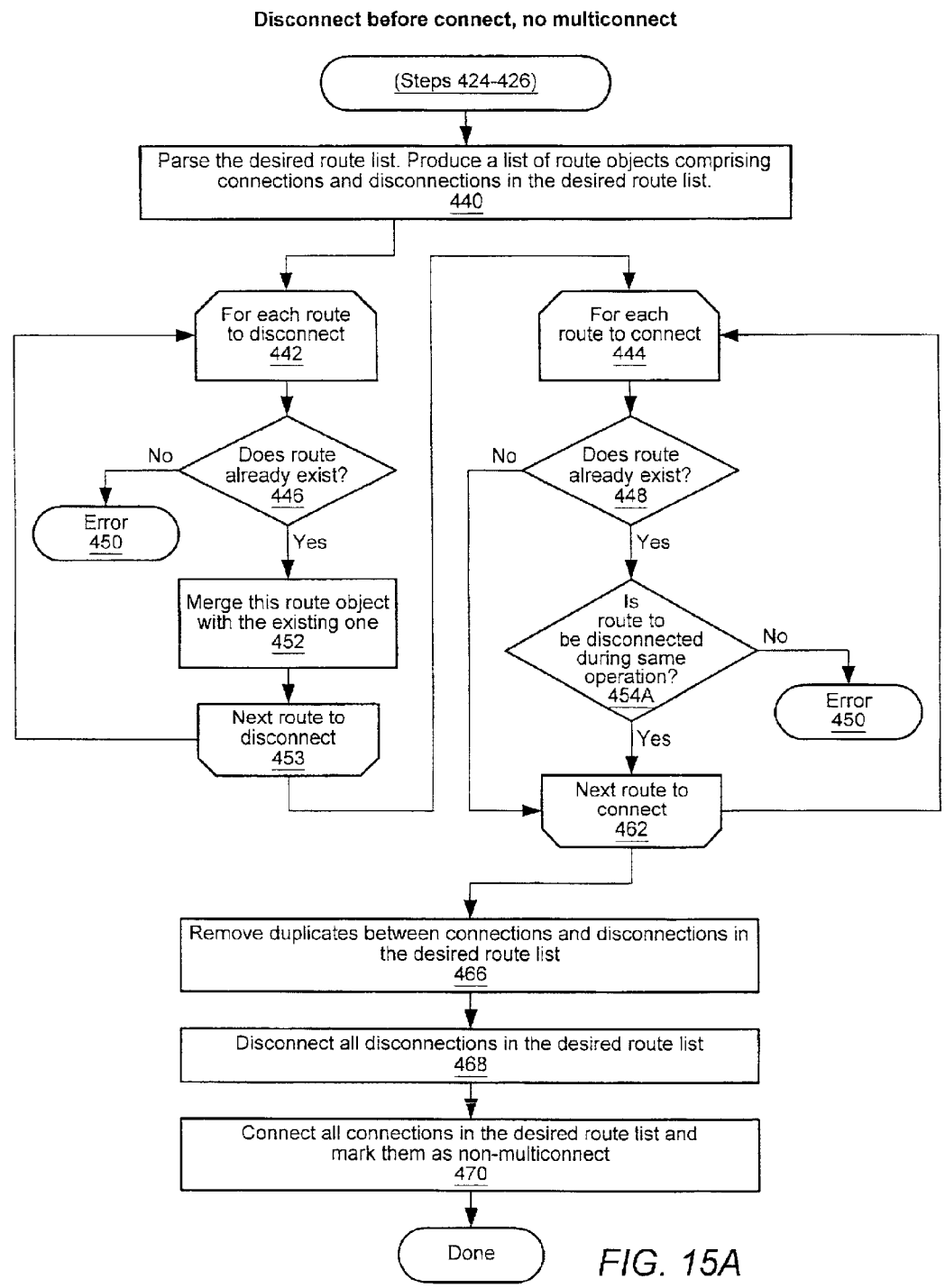
FIG. 15A is a flowchart of a disconnect before connect, no multiconnect route case for software intervention method in hardware state changes to improve relay lifetime and reduction in execution time, according to one embodiment of the invention.

FIG. 15A illustrates one embodiment of the switch transition reduction algorithm, where the configured routes cannot share channels between each other, and where the configured route will disconnect before connecting. Here are assumptions:

1. Because a disconnect will occur before a connect, the switch transition reduction algorithm may produce an error if a connection to be disconnected isn't in the list of existing routes.

2. Because both the connects in the desired route list and the disconnects in the desired route list are not shared, every connect in the desired route list should either match a disconnect in the desired route list or not match anything in the list of existing routes. It may be an error if a connect in the desired route list matches a connection in the list of existing routes that does not also exist in the disconnects in the desired route list.

3. If the previous two conditions are satisfied, the switch transition reduction algorithm may eliminate any common routes between the disconnections in the desired route list and the connections in the desired route list.

Procedure:

In one embodiment, the switch transition reduction algorithm may prepare the disconnections in the desired route list using the Disconnect function. The switch transition reduction algorithm may examine the connections in the desired route against the connections in the list of existing routes, and if a match occurs, it may be a potential error condition. If the match occurs, the switch transition reduction algorithm may examine the disconnections in the desired route list to count how many disconnections of this route may occur. If the number of disconnections does not equal the connection count on the item in the list of existing routes, the switch transition reduction algorithm may produce an error 450 since the route already exists. Otherwise, the switch transition reduction algorithm may store the location of the match in the list of existing routes to mark the first route as unshared.

The switch transition reduction algorithm may compare the connections in the desired route list with itself to ensure that there are no duplicates. If duplicates exist, the switch transition reduction algorithm may produce an error since the first route already exists. Next, the connections in the desired route list and the disconnections in the desired route list may be compared to each other and any duplicates are removed 466. The switch transition reduction algorithm may finish the Disconnect 468 and Connect 470 functions. If in Step 448 the switch transition reduction algorithm has uncovered any connections that were in the list of existing routes but had balancing disconnections, they may be marked as unshared 470.

FIG. 15B

Figure 15B:
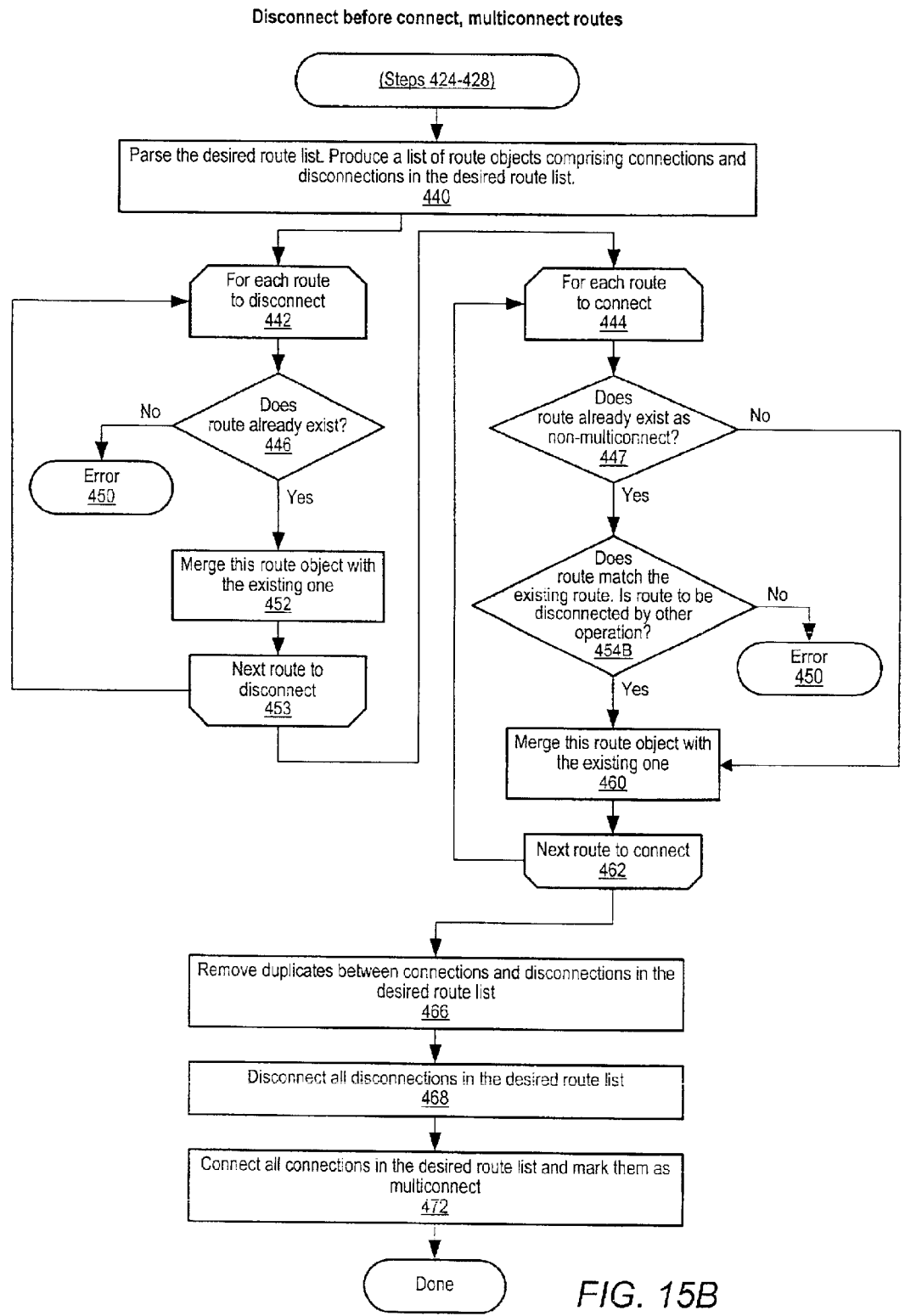
FIG. 15B is a flowchart of a disconnect before connect, multiconnect route case for software intervention method in hardware state changes to improve relay lifetime and reduction in execution time, according to one embodiment of the invention.

FIG. 15B illustrates one embodiment for a switch transition reduction algorithm, where the configured routes can share channels between each other, and where the configured route will disconnect after a connect. Here are assumptions:

1. Because a disconnect will occur before a connect, the switch transition reduction algorithm may produce an error if a connection to be disconnected is not in the list of existing routes.

2. Because the routes are being shared, the switch transition reduction algorithm may compare the connects in the desired route list with the list of existing routes, and merge them together appropriately. The switch transition reduction algorithm may not examine the disconnects in the desired route list.

3. If the previous two conditions are satisfied, the switch transition reduction algorithm may eliminate any common routes between the disconnections in the desired route list and the connections in the desired route list.

Procedure:

In one embodiment, the switch transition reduction algorithm may prepare the disconnections in the desired route list using the Disconnect function 442, 446, 450. The connections in the desired route list may be prepared using the shared Connection function with one exception. If a match is found in the list of existing routes with a route that is marked as unshared 447, the switch transition reduction algorithm may examine the disconnections in the desired route list to see if there is a match before producing an error. If there is a match with the disconnections in the desired route list, it may be valid since this connection will be removed before it is reconnected. In this situation, the switch executive core 204 may store the location of the match in the list of existing routes to mark the route as shared.

The switch transition reduction algorithm may compare the connections in the desired route list with itself to ensure that there are no duplicates 466. If there are any data duplicates they may be merged. Next, the connections in the desired route list and the disconnections in the desired route list may be compared to each other and any duplicates are removed 466. The switch transition reduction algorithm may finish the Disconnect 468 and Connect 470 functions. If in Step 447 the switch executive core 204 has uncovered any connections that were in the list of existing routes but had balancing disconnections, they may be marked as shared 472.

FIG. 15C

Figure 15C:
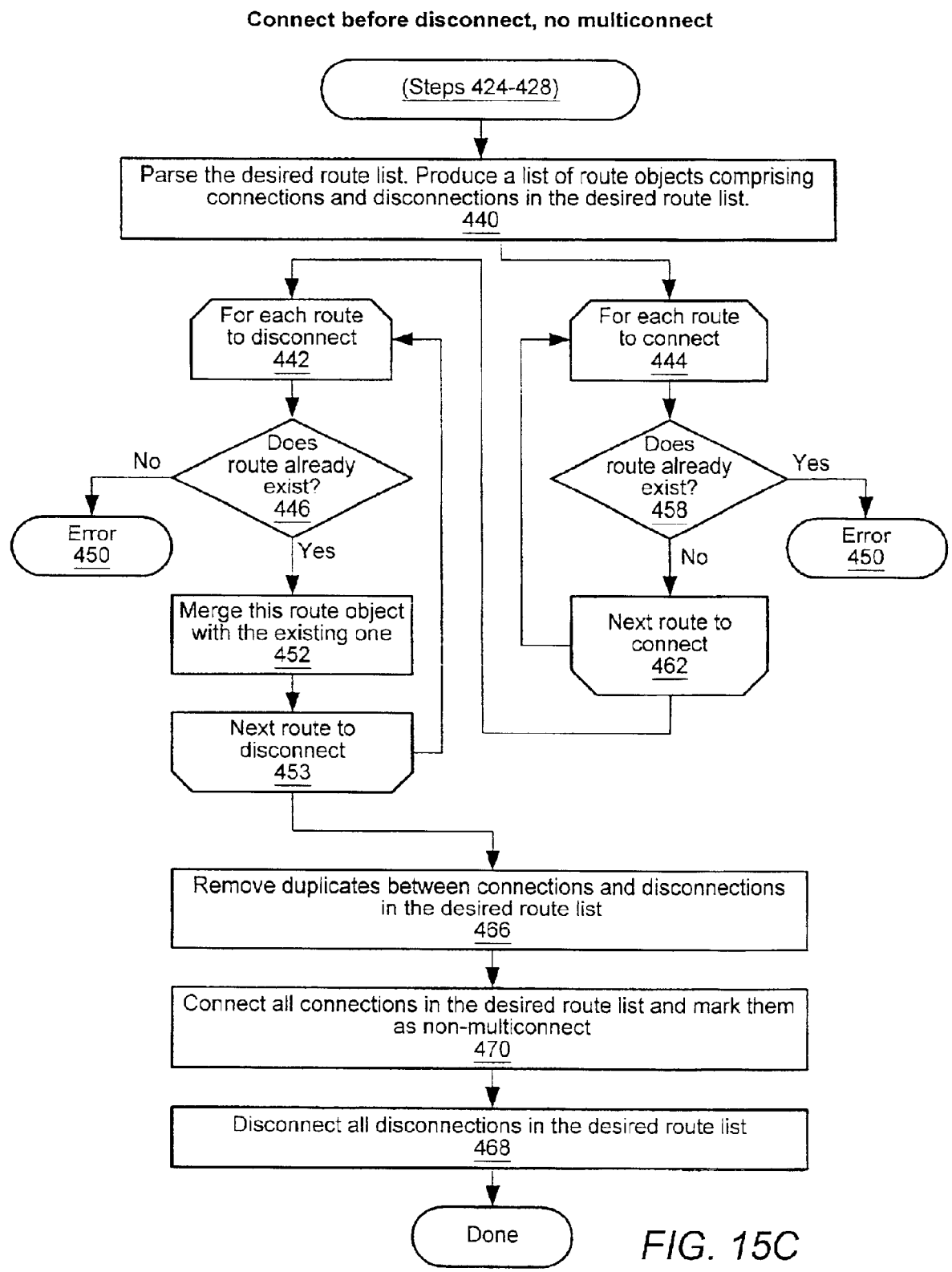
FIG. 15C is a flowchart of a connect before disconnect, no multiconnect route case for software intervention method in hardware state changes to improve relay lifetime and reduction in execution time, according to one embodiment of the invention.

FIG. 15C illustrates one embodiment for a switch transition reduction algorithm, where the configured routes cannot share channels between each other, and where the configured route will disconnect after a connect. Here are assumptions:

1. If a connect in the desired route list already exists in the list of existing routes, it may be an error condition since sharing is not allowed.
2. When disconnecting, the switch transition reduction algorithm may examine both the list of existing routes as well as a list of passed routes before determining that a route does not exist.
3. If the previous two conditions are satisfied, the switch transition reduction algorithm may eliminate any common routes between the disconnects in the desired route list and the connects in the desired route list.

Procedure:

In one embodiment, the switch transition reduction algorithm may prepare the connects in the desired route list using the Connect function 442, 446, 450. The switch transition reduction algorithm may also prepare the disconnects in the desired route list using the standard disconnect procedure with one exception. If the route is not located in the list of existing routes, it may not become an error condition unless it is not also found in the connects in the desired route list. In other words, the switch transition reduction algorithm may search both the list of existing routes and the connects in the desired route list to find matches.

The switch transition reduction algorithm then may compare the connects in the desired route list and the disconnects in the desired route list and remove any duplicates 466. The switch transition reduction algorithm then may finish the Connect 470 and Disconnect 468 functions.

FIG. 15D

FIG. 15D illustrates one embodiment for a switch transition reduction algorithm, where the configured routes can share channels between each other, and where the configured route will disconnect after a connect. Here are assumptions.

1. If a connect in the desired route list already exists in the list of existing routes, it should be merged if the original connection was shareable (or it may be an error condition if the original connection was non-shareable).
2. When disconnecting, the switch transition reduction algorithm may examine both the list of existing routes as well as the passed route list before determining if a route doesn't exist.
3. If the previous two conditions are satisfied, the switch transition reduction algorithm may eliminate any common routes between the disconnects in the desired route list and the connects in the desired route list.

Procedure:

In one embodiment, the switch transition reduction algorithm may prepare the connects in the desired route list using the Connect function. The switch transition reduction algorithm may also prepare the disconnects in the desired route list using the standard Disconnect function with one exception. If the route is not located in the list of existing routes, it may not become an error condition unless it isn't also found in the connects in the desired route list. In other words, the switch transition reduction algorithm may search both the list of existing routes and the connects in the desired route list to find matches.

The switch transition reduction algorithm then may compare the connects in the desired route list and the disconnects in the desired route list and remove any duplicates 466. The switch transition reduction algorithm then may finish the Connect 472 and Disconnect 468 functions.

FIG. 16

Figure 16:
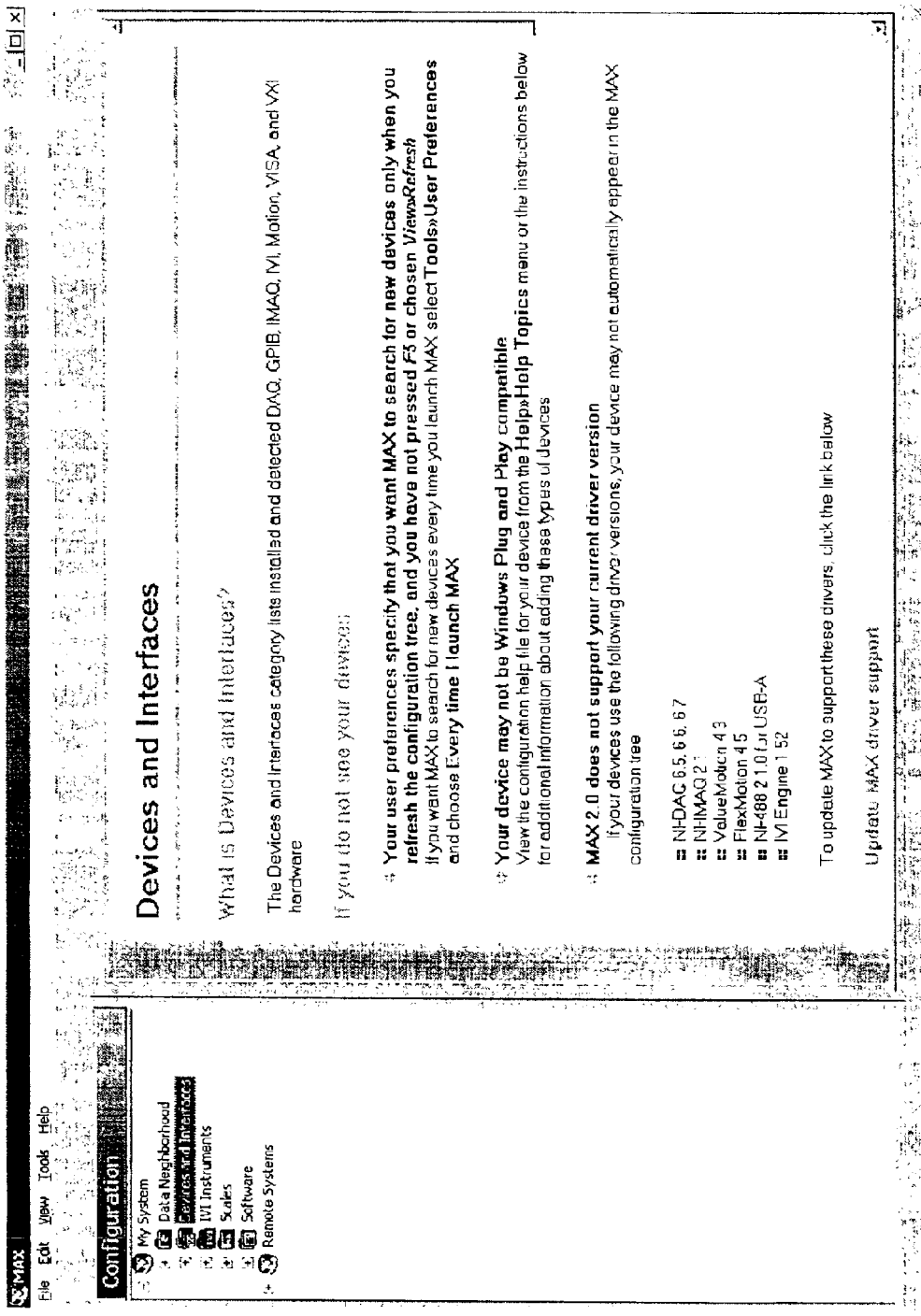
FIG. 16 illustrates a graphical user interface of a Measurement and Automation Explorer (MAX) environment, according to one embodiment of the invention.

FIG. 16 illustrates one embodiment of switch configuration software—National Instruments' Measurement and Automation Explorer (MAX) environment. The user may visually use a right mouse click in order to create a new virtual switch device 105.

FIG. 17

Figure 17:
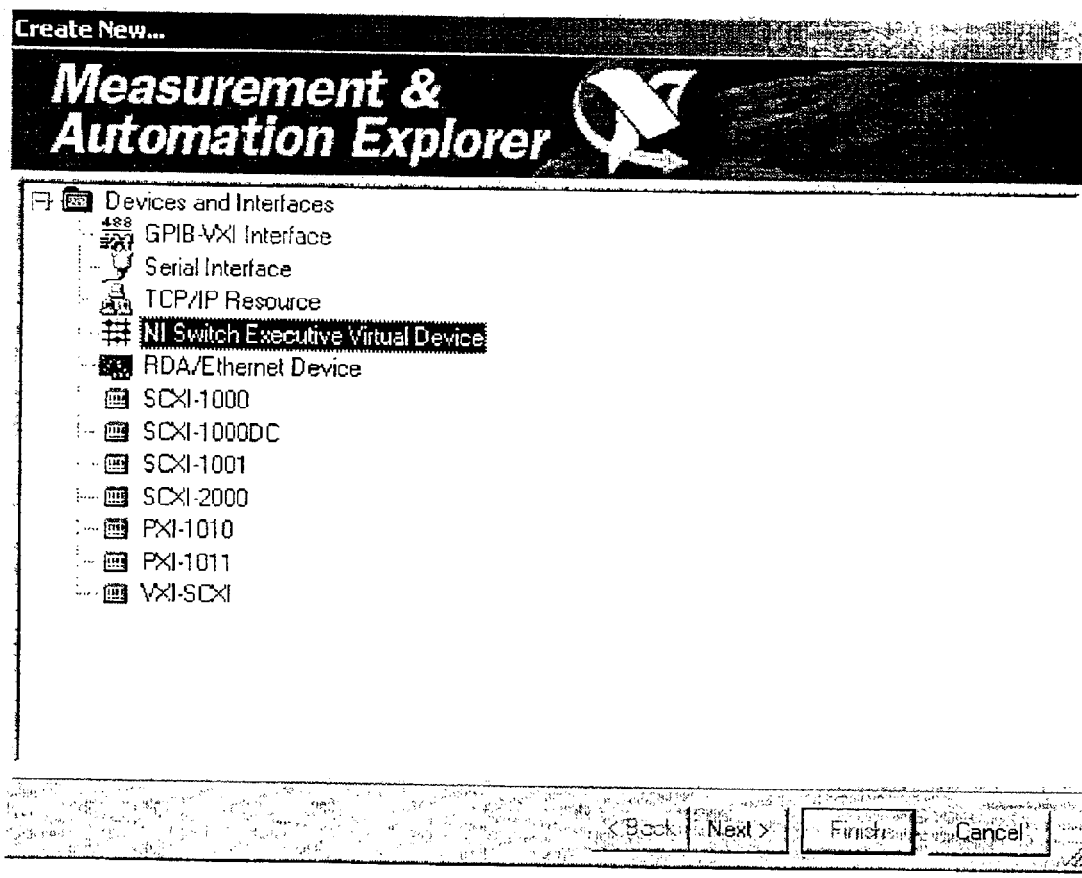
FIG. 17 illustrates a creation of a new unconfigured virtual switch device, according to one embodiment of the invention.

FIG. 17 illustrates one embodiment of a selection screen for a new virtual switch device 105. The user may add the new virtual switch device 105, or select a previously created virtual switch device 105.

FIG. 18

Figure 18:
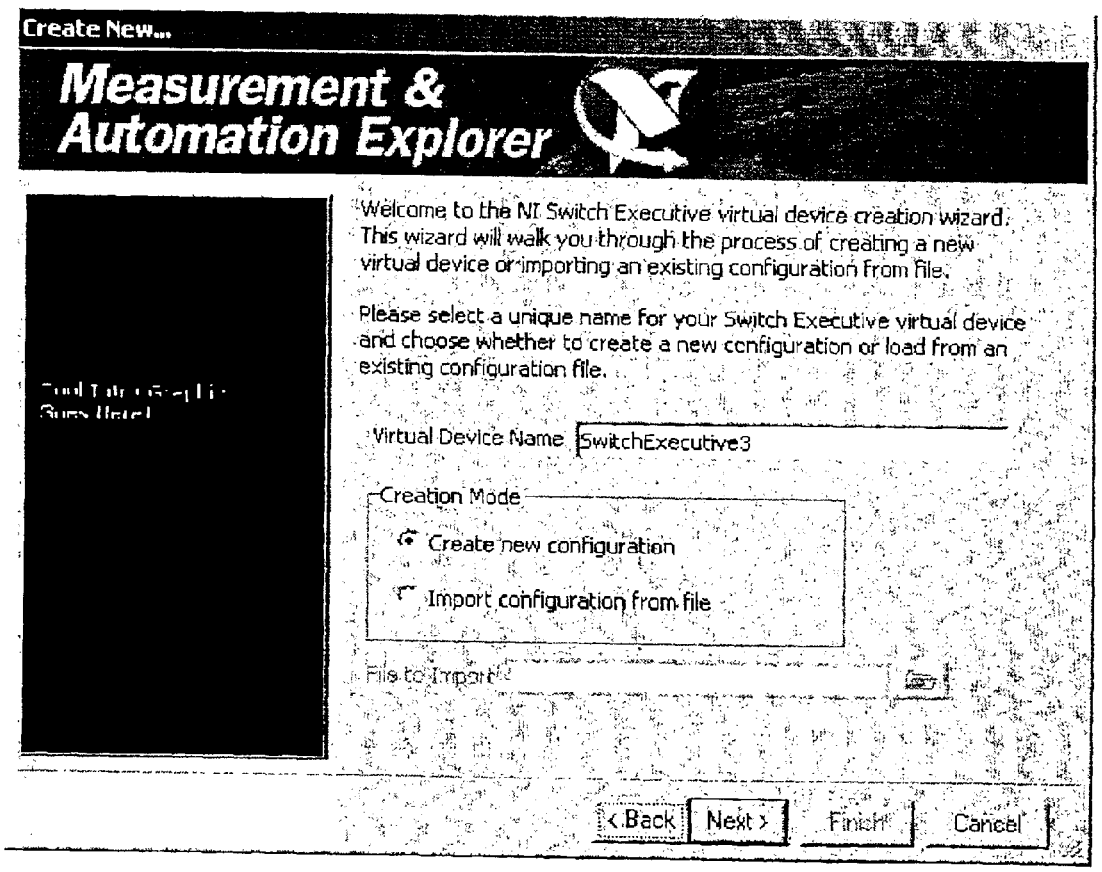
FIG. 18 illustrates a naming and creation mode selection of the new virtual switch device, according to one embodiment of the invention.

FIG. 18 illustrates one embodiment of naming and creation mode selection of the new virtual switch device 105. The switch configuration software may execute through a process of locating switches and hardware information on the system and then may prompt the user with a selection screen for a name for the virtual switch device 105. The switch executive core 204 may then prompt the user for a creation of a new configuration for the new virtual switch device 105 or for importing a configuration from a file.

FIG. 19

Figure 19:
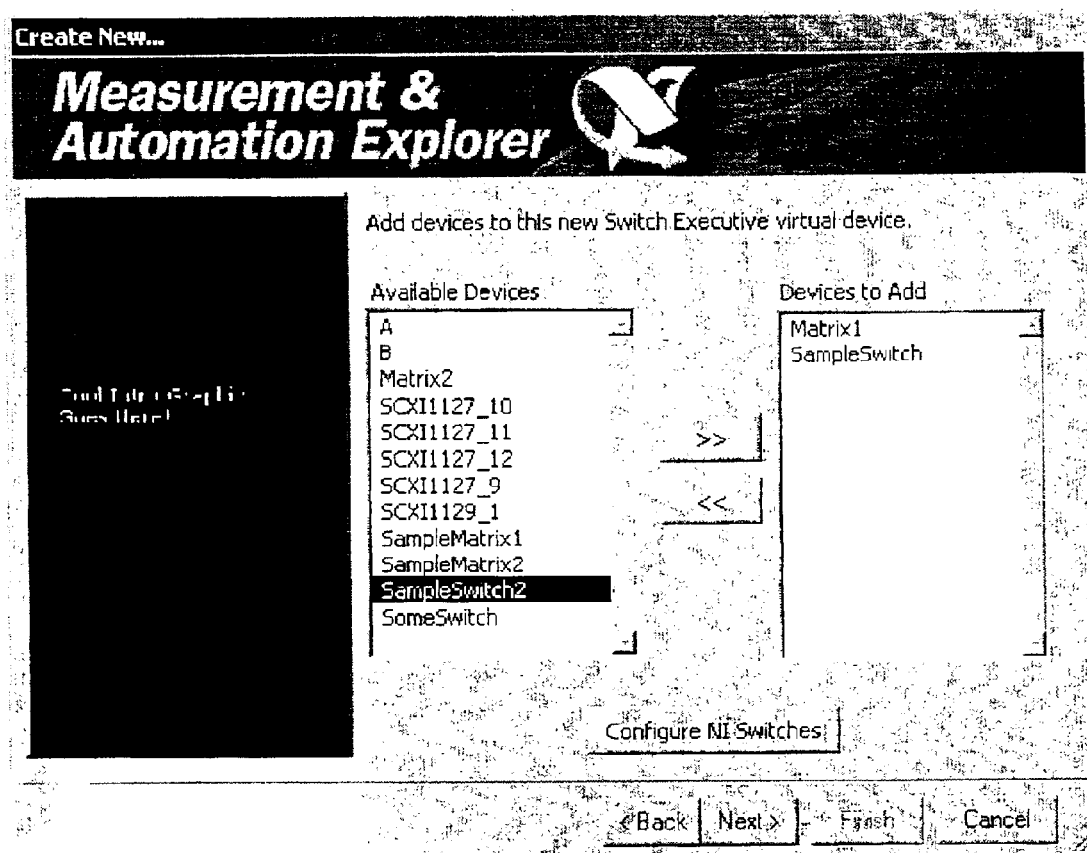
FIG. 19 illustrates a selection of switch devices to the new virtual switch device, according to one embodiment of the invention.

FIG. 19 illustrates one embodiment of a selection of switch devices for a new virtual switch device 105. The new virtual switch device 105 may be described as a management layer that may control multiple other switch devices. In this embodiment, the user has chosen selected switch devices named Matrix1 and SampleSwitch. The names presented in the list may come from the name configuration and/or from the respective switch device driver 210, 212, 214 for the selected switch device.

FIG. 20

Figure 20:
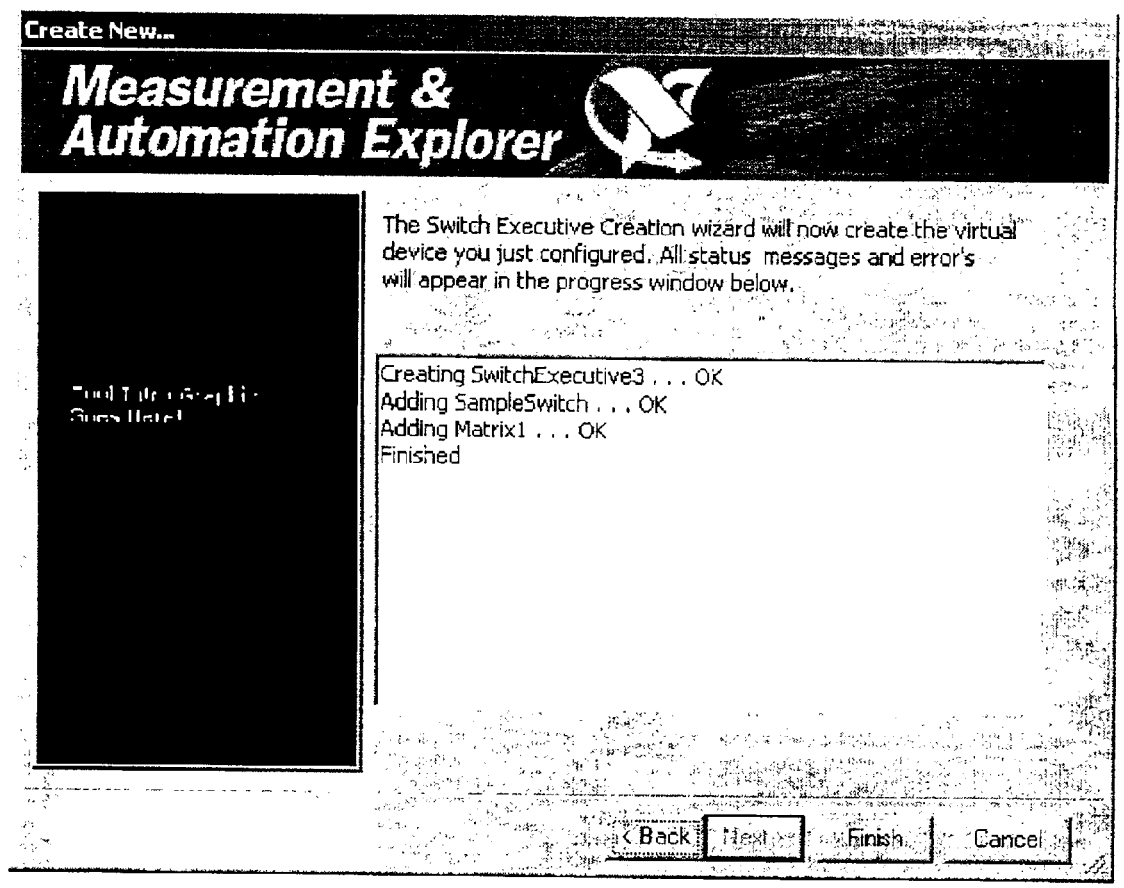
FIG. 20 illustrates creation of a configured virtual switch device, according to one embodiment of the invention.

FIG. 20 illustrates one embodiment of creation of the new virtual switch device 105. When the user clicks to advance to the next screen, the new virtual device 105 may be created. The switch executive core 204 may open sessions to all of the switch instrument drivers 210, 212, 214 associated with the virtual switch device and retrieve information such as a list of channels of each of the selected switch devices and their physical characteristics which it needs to complete the virtual switch configuration.

FIG. 21

Figure 21:
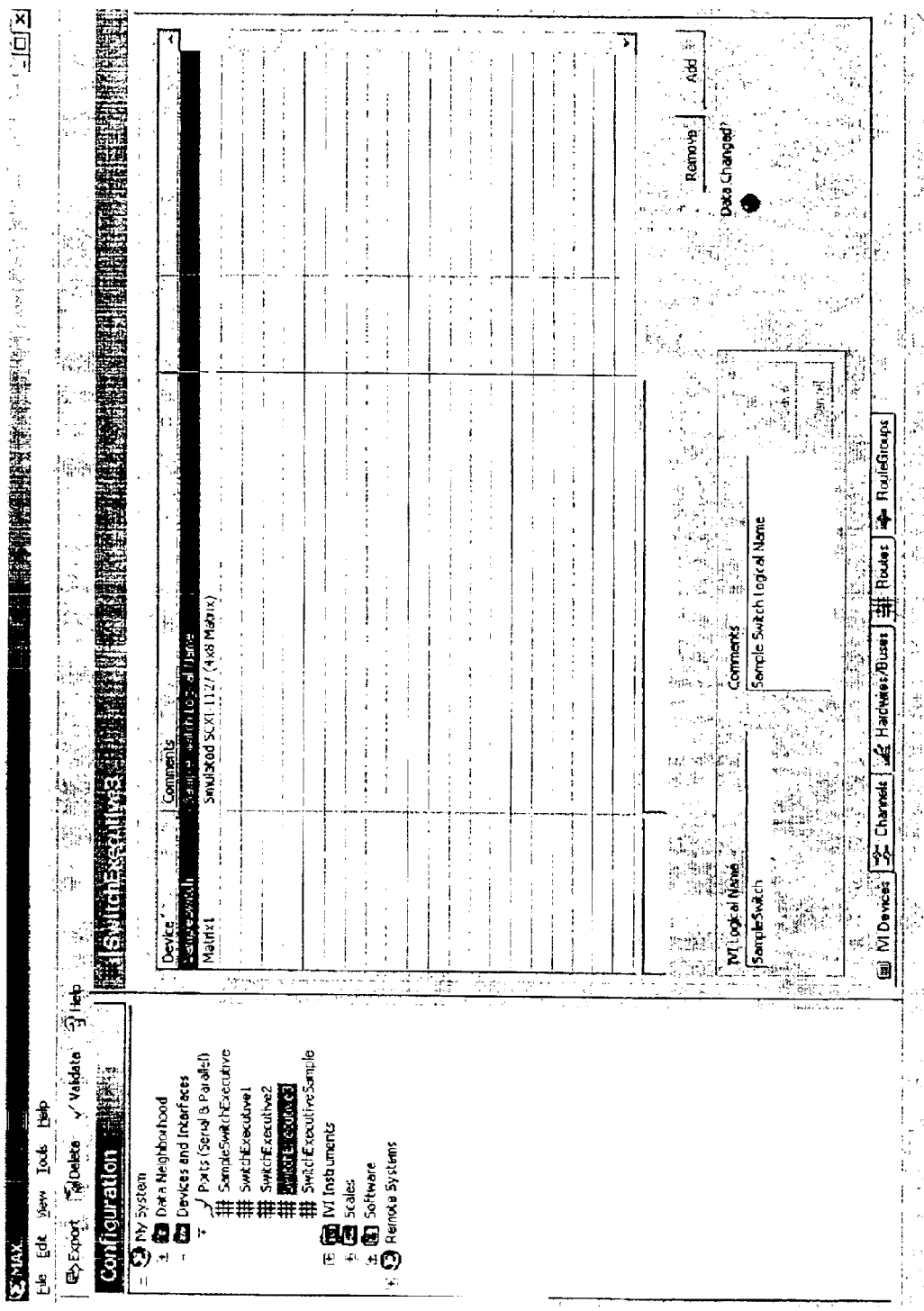
FIG. 21 illustrates a general configuration screen for the configured virtual switch device, comprising the physical switch device that constitute the configured virtual switch device, according to one embodiment of the invention.

FIG. 21 illustrates one embodiment of a general configuration for the new virtual switch device 105. In one embodiment, the general configuration may indicate the physical devices that constitute the virtual switch device. After creation is completed, the switch executive core 204 may query the selected switch instrument drivers 210, 212, 214 for information about the selected switch devices and channels present on the selected switch devices. However, the switch executive core 204 may not have any information about how the channels are interconnected, and how the channels should be used in configured routes.

FIG. 22

Figure 22:
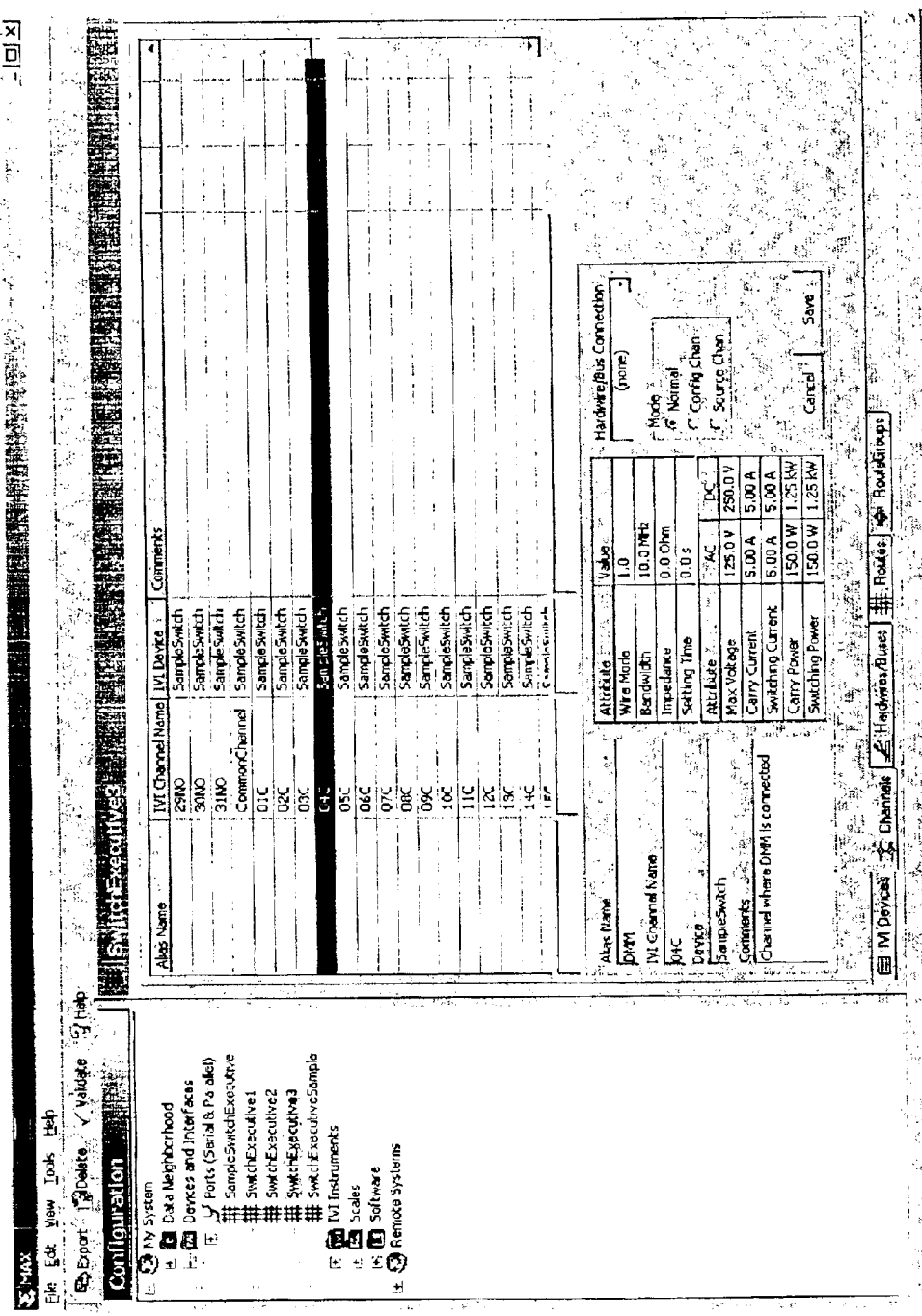
FIG. 22 illustrates a selection of new channel names, corresponding alias names, as well as attributes of the new channels, according to one embodiment of the invention.

FIG. 22 illustrates one embodiment of channel configuration. The first step may involve assigning names to channels. While this may be an optional step since all channels may have default channel names, it is an important step because it allows users to map from default channel names to names that may describe the user application better. For example, if an Oscilloscope is connected to a channel, a preferred name to reference that channel may be "Oscilloscope CH0" instead of "NC0" or some other name which may be assigned by default by the switch instrument driver.

FIG. 22 also illustrates physical characteristics of the selected channel. For example, a table displaying such physical characteristics of the channel as bandwidth, impedance, setting time, maximum voltage, carry current, switching current, carry power, and switching power is displayed. In one embodiment, the switch executive core may determine these values automatically, e.g., by querying the various switch instrument drivers for the values and may then populate the table according to the values. In one embodiment, the user may be able to manually enter the values or override the automatically determined values. As described below, the user may be able to specify required signal characteristics, and the switch executive core may be operable to determine a route based on these requirements when selecting channels for the route.

FIG. 22 also illustrates a portion of the graphical user interface for assigning a mode or type to the selected channel, e.g., a normal channel, configuration channel, or source channel.

FIG. 23

Figure 23:
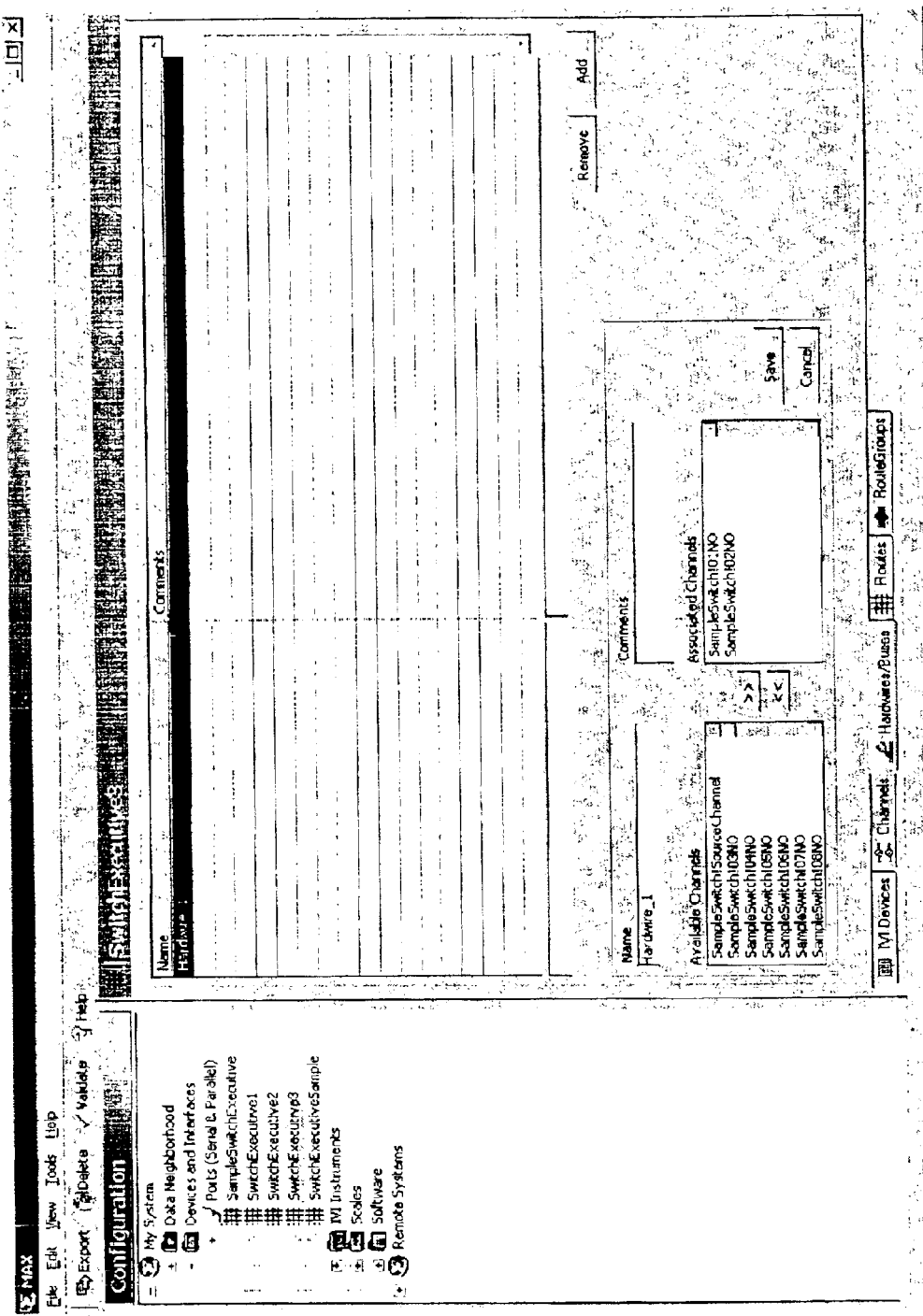
FIG. 23 illustrates creation and selection of hardwires for the new channels, according to one embodiment of the invention.

FIG. 23 illustrates one embodiment of selection of hardwire connections. Hardwire connections, also known as interconnects, could be anything from physical wires connecting pins on a switch's front panel to chassis backplane buses. The switch executive core 204 should know about hardwires so that it can use them to make routing decisions. Once a hardwire is created, multiple channels may be connected to it. A channel should be assigned to only one hardwire. This stems from the electrical limitation that if a single point is connected to 2 different wires, those 2 wires end up carrying the same signal.

FIG. 24A

Figure 24A:
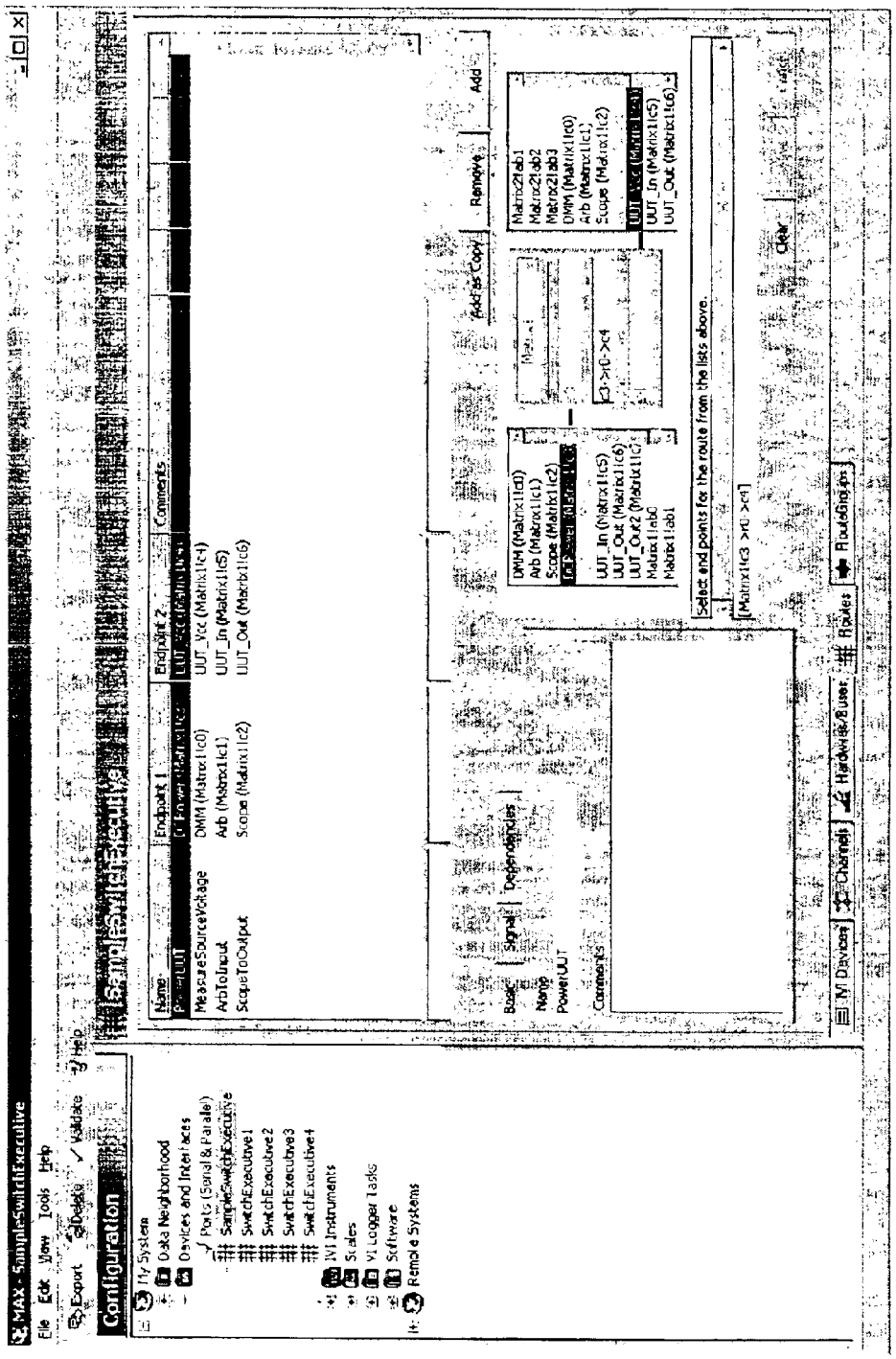
FIG. 24A illustrates a visual design-time assisted routing method, according to one embodiment of the invention.

FIG. 24A illustrates one embodiment of a visual design-time assisted routing editor graphical user interface (GUI). At this point, the switch executive core 204 may have enough information in order to effectively manage the switch devices and create configured routes across one or more switch devices. There are additional steps, however, that many users may perform. The switch executive core 204 may be able to assist in creating configured routes at design time, and these configured routes may be stored and quickly accessed later during execution of a user program. The GUI illustrated in FIG. 24A may enable the user to graphically create configured routes and may provide interactive feedback during the route configuration process, similarly as described above.

FIG. 24B

Figure 24B:
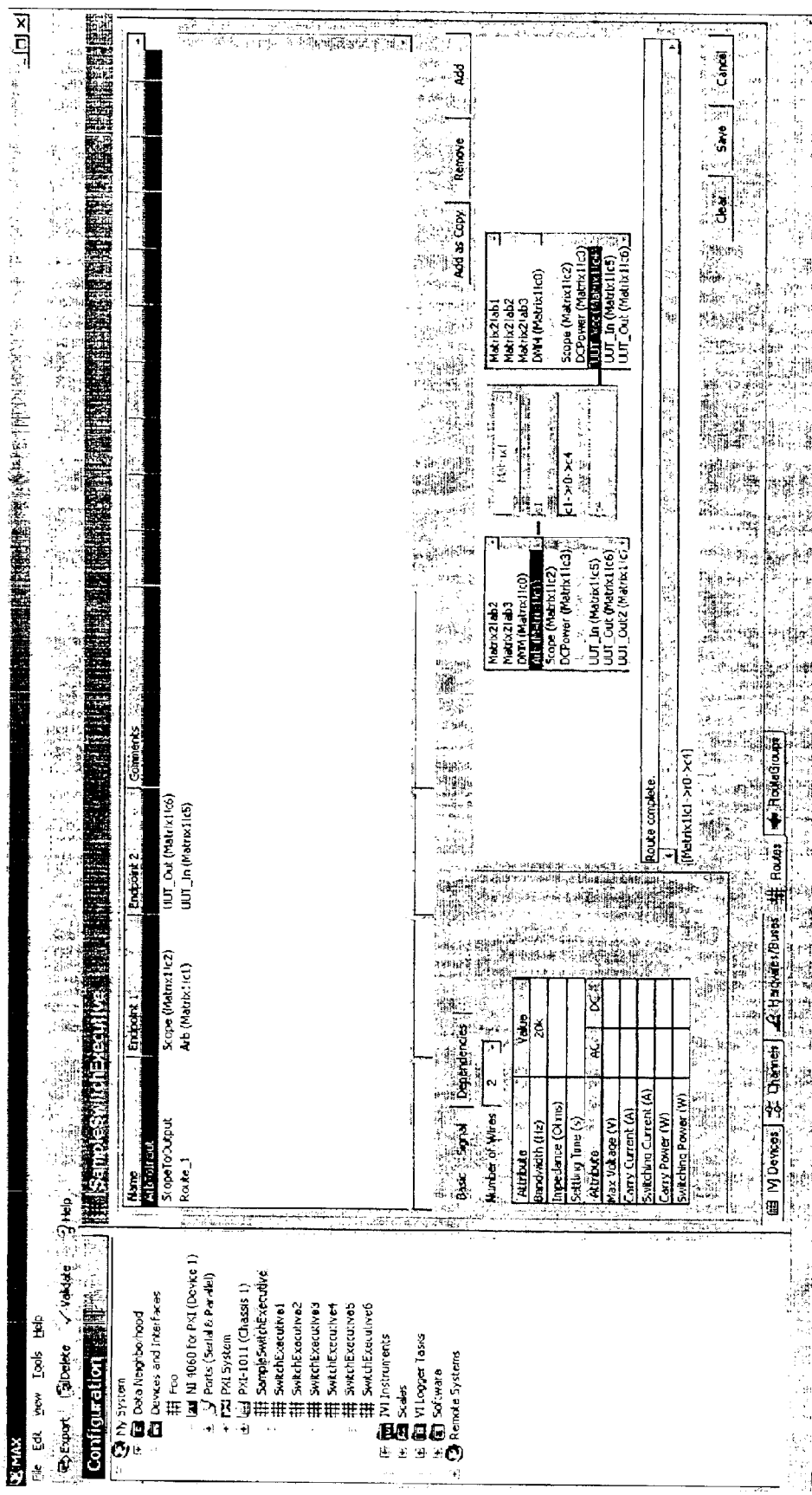
FIG. 24B illustrates a configuration of signal requirements for visual design-time assisted routing method, according to one embodiment of the invention.

FIG. 24B illustrates another view of the visual routing editor GUI. In this view, the "signal" tab is selected, displaying a portion of the graphical user interface enabling the user to specify required signal characteristics for channels used in the route. Channels that do not meet the specified signal requirements may be filtered out, so that only valid channels are accessible, i.e., only valid channels may be selected for inclusion in the route. As one example, if the user specifies a maximum voltage of 50V, only those channels able to carry 50 Volts may be made accessible.

The required signal characteristics may affect both automatically selected channels and user-selected channels. For example, if the user specifies a portion of a route and the switch executive core automatically completes the route for the user, the switch executive core may choose a route including only valid channels, according to the required signal characteristics. Also, the user may be able to manually select channels or may be able to override automatically selected channels. For example, the user may interact with the switch device icons to display a list of available channels and may choose a new channel from this list. Thus, the list may display only valid channels.

FIG. 24C

Figure 24C:
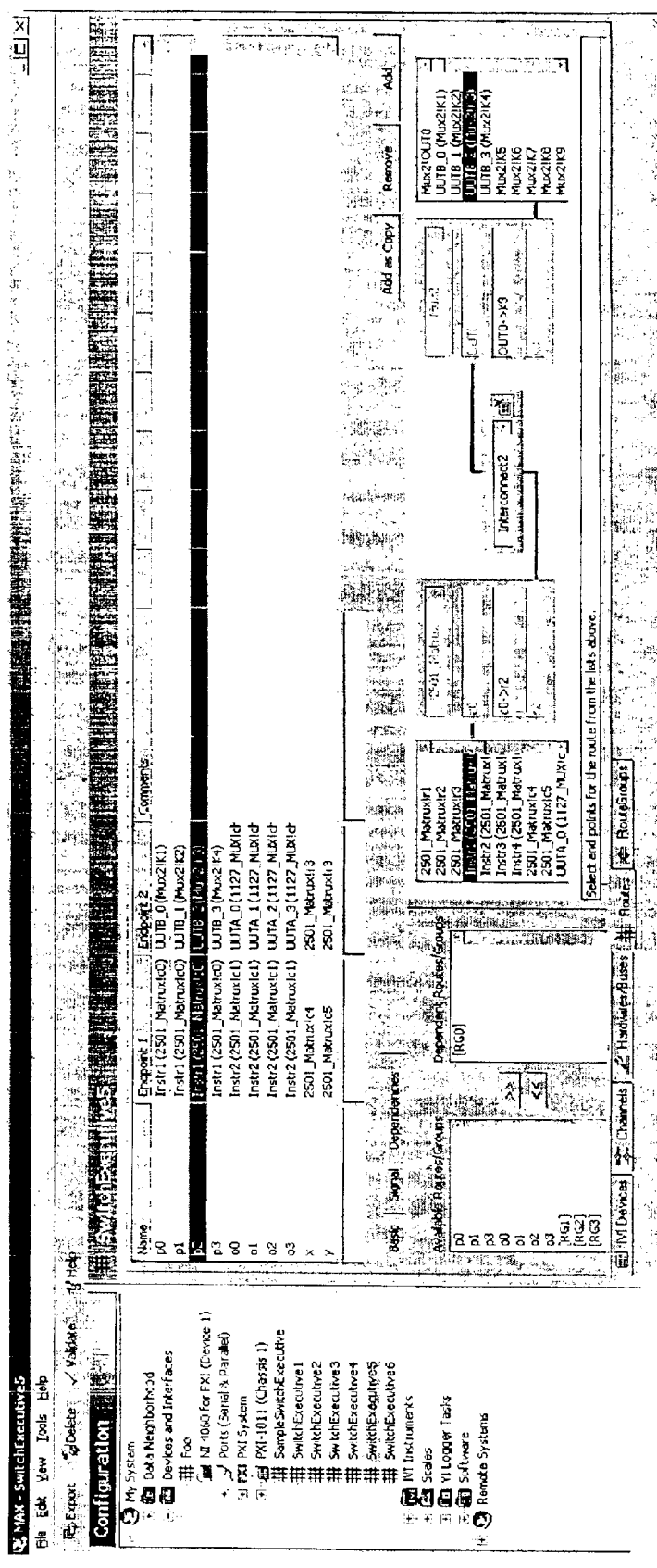
FIG. 24C illustrates a configuration of dependencies for visual design-time assisted routing method, according to one embodiment of the invention.

FIG. 24C illustrates another view of the visual routing editor GUI. In this view the user may set route and/or route group dependencies for specific routes. A detailed explanation of resource dependencies is included below.

FIG. 24D

Figure 24D:
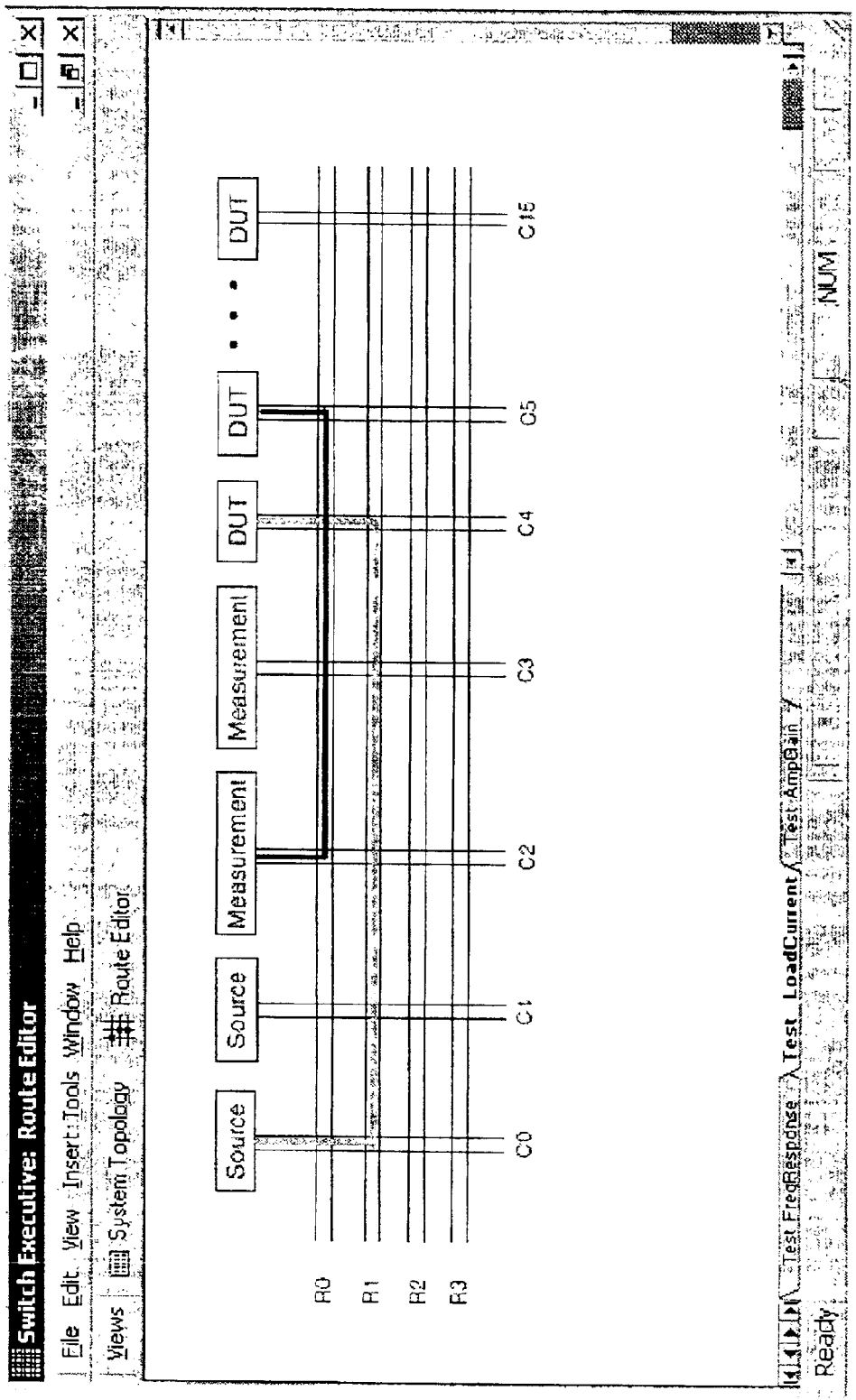
FIG. 24D illustrates a visual design-time assisted routing method, according to second embodiment of the invention.

FIG. 24D illustrates another view of the visual routing editor GUI, where the user may configure routes by connecting nodes with data flow wires.

FIG. 25

Figure 1A:
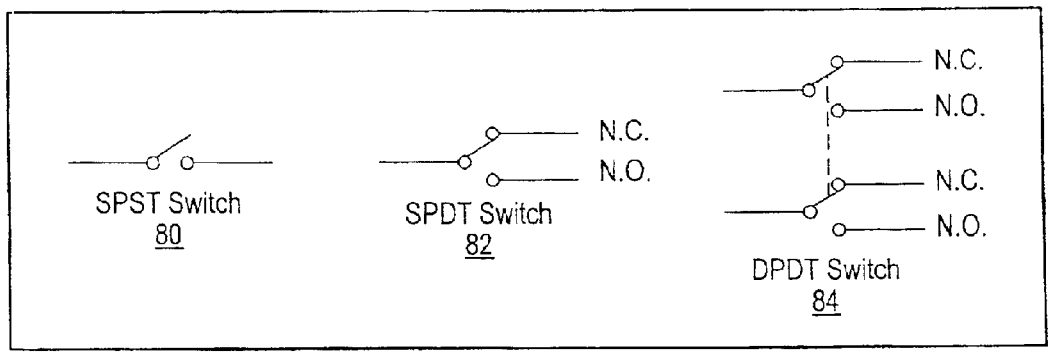
FIG. 1A illustrates general purpose switch configurations according to the prior art.
Figure 1B:
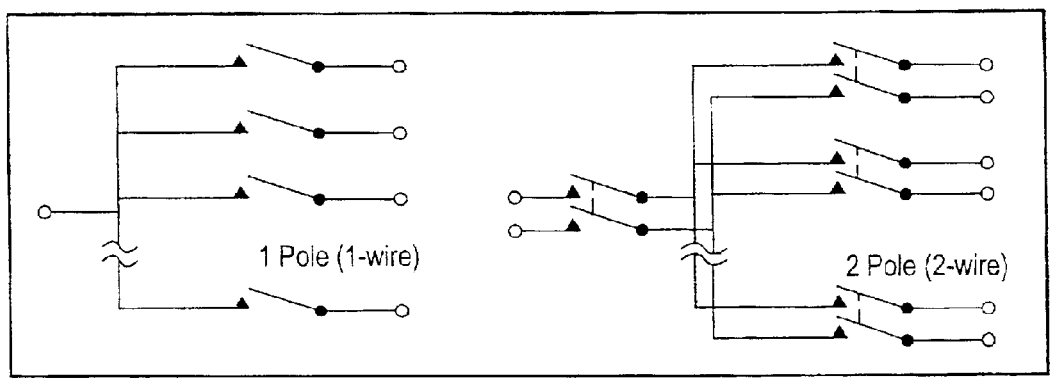
FIG. 1B illustrates multiplexer configurations according to the prior art.
Figure 1C:
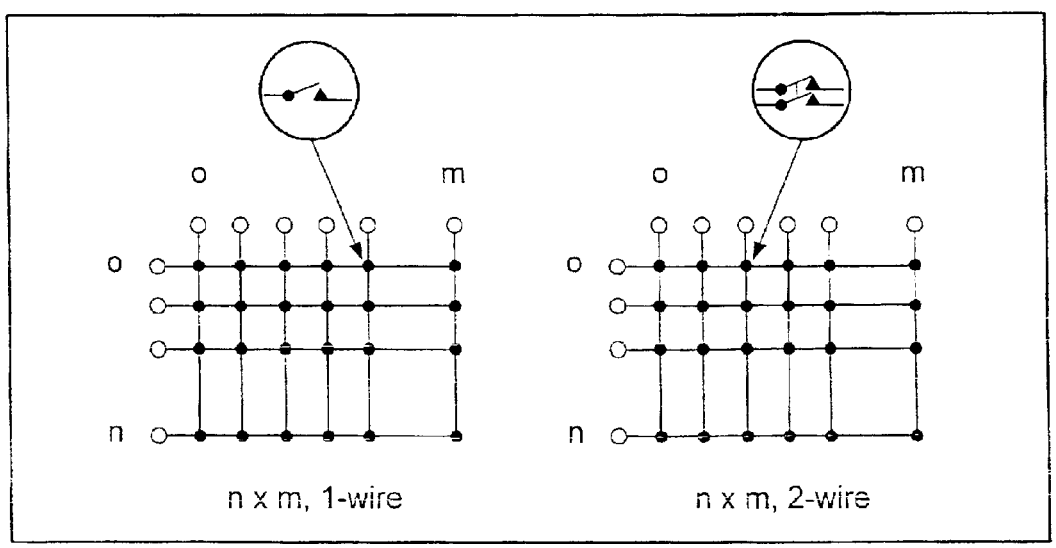
FIG. 1C illustrates matrix configurations according to the prior art.
Figure 25:
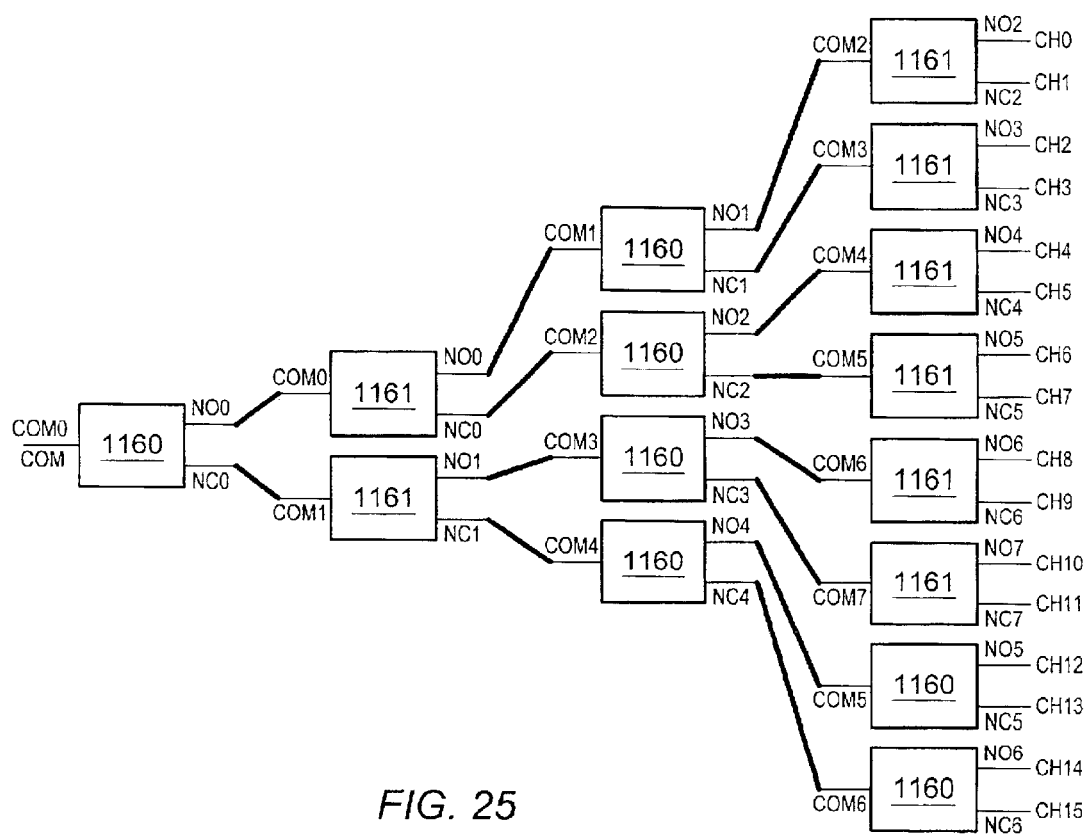
FIG. 25 illustrates an exemplary system that may be used to illustrate the design time assisted routing method for a plurality of switch devices, according to one embodiment of the invention.

FIG. 25 illustrates an exemplary hardware topology of a system. This topology is referred to below to illustrate an example of the visual design time assisted routing method for a plurality of switch devices. Each box in this topology may represent a single 2×1 Form C switch 82, such as described above with reference to FIG. 1. The number on the switch corresponds to the location of the Form C switch 82 on one of the two switch devices in the switching system 104. In this example, there are two switch devices, a first switch device referred to as 1160, and a second switch device referred to as 1161, and each switch device has a plurality of Form C switches 82. Each line between the two switches represents a hardwire connection that joins the two Form C switches 82. The plurality of hardwires may be installed by the user prior to using visual design-time assisted routing. FIG. 25 represents one embodiment of a switching system 104 that the user will configure, as illustrated in FIGS. 26A–26E.

One embodiment of the algorithm for visual design-time assisted routing method is described above with reference to FIG. 10, and FIGS. 11A–11I. A visual representation of the switch device is used in one embodiment as a rectangular box comprising four values, as described with reference to FIGS. 11A–11I.

FIG. 26A

Figure 26A:
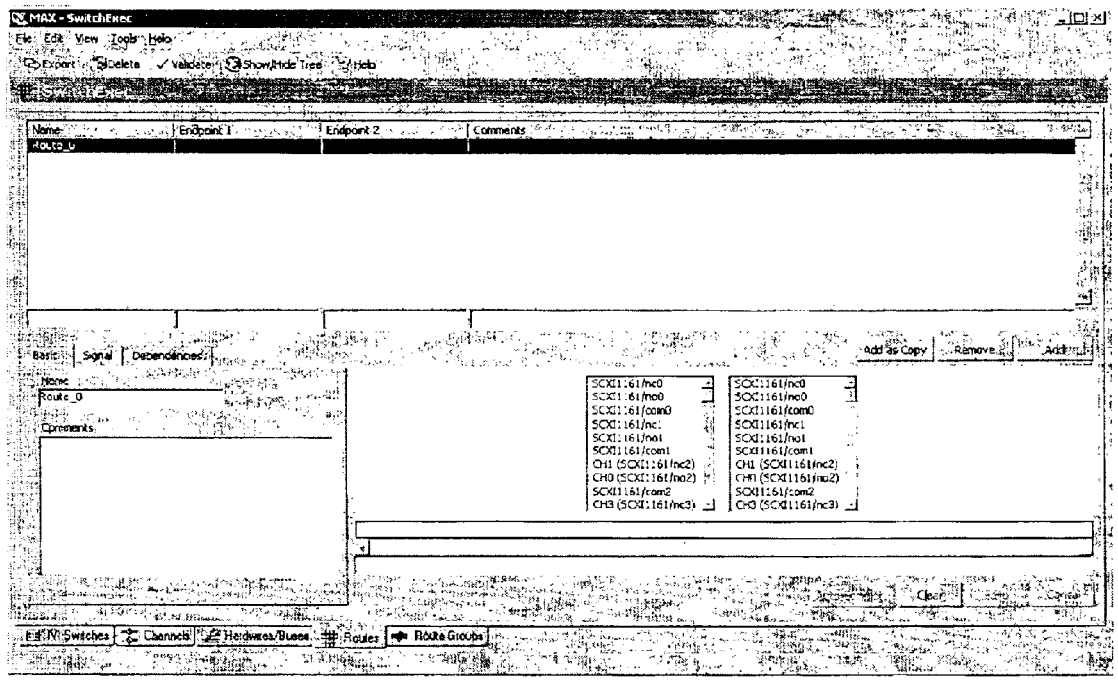
FIG. 26A illustrates one exemplary graphical user interface, also referred to as a Visual Route Editor, to create a route from the common channel, according to one embodiment of the invention.

FIG. 26A illustrates one embodiment for using a graphical user interface, also referred to as a visual route editor, to create a route from a source channel, marked COM, to a destination channel, marked CH0. In this step, the user may start creating a first route by moving the mouse pointer to an Add button and using the mouse click to initiate the action in the visual route editor. The visual route editor may allow the user to give the first route an alias name, such as Route_0. Note that each graphical representation of a switch device may have a channel representing a left hand side endpoint and a channel representing a right hand side endpoint, but there is only one source and destination channel per route which may involve a plurality of switch devices. The source channel and the destination channel may be selected out of a visual representation of a switch device that may contain all the available channels.

FIG. 26B

Figure 26B:
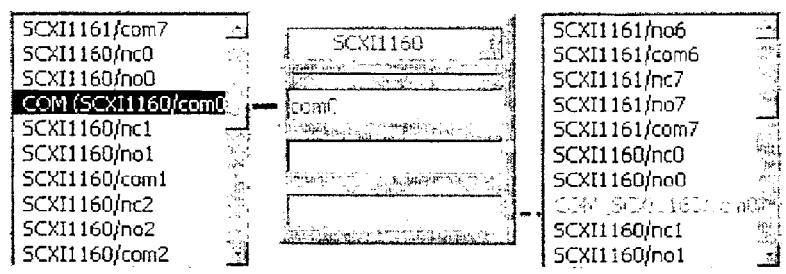
FIG. 26B illustrates one exemplary graphical user interface to select the source channel, or a first endpoint, according to one embodiment of the invention.

FIG. 26B illustrates one embodiment for selecting the source channel, or a first endpoint. The visual route editor may allow the user to select the source channel by graphically selecting a channel. The user may select the left hand side endpoint as the source channel out of the left hand side box containing one or more available channels. The switch executive core 205 may know that the source channel resides on the first switch device 1160, and a visual representation of the first switch device 1160 may be displayed in the visual route editor.

FIG. 26C

Figure 26C:
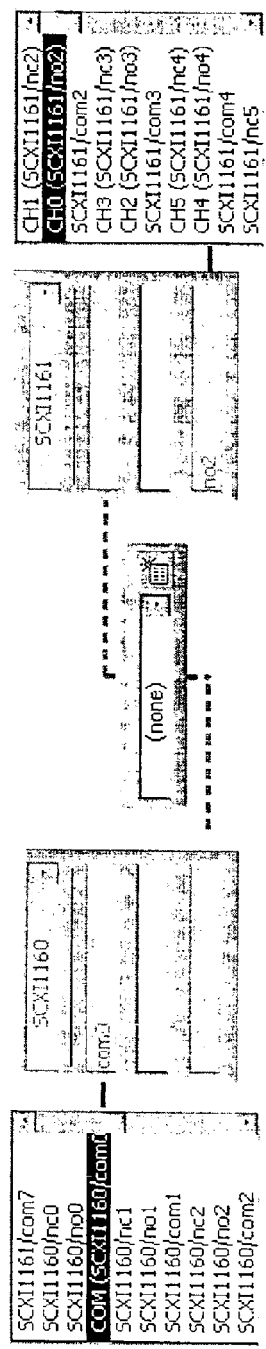
FIG. 26C illustrates one exemplary graphical user interface for selecting a destination channel, according to one embodiment of the invention.

FIG. 26C illustrates one embodiment for selecting a destination channel. The visual route editor may allow the user to select the destination channel, or a second endpoint, by graphically selecting a channel. The user may select the right hand side endpoint as the destination channel out of the right hand side box containing one or more available channels. The switch executive core 205 may know that destination channel resides on the second switch device 1161, and a visual representation of the second switch device 1161 may be displayed in the visual route editor. In this example, there are two visual representations of switch devices.

The switch devices represented graphically by the visual route editor may show a left hand side (LHS) endpoint in each switch device, a right hand side (RHS) endpoint in each switch device, and an internal path in each switch device between the LHS endpoint and the RHS endpoint, such as described above with reference to FIGS. 11A–11I. At this point the visual design-time assisted routing algorithm may be initiated in order to find a path between the LHS endpoint in the first switch device and the RHS endpoint in the second switch device. In this example, the visual design-time assisted routing algorithm does not find a direct connection between the two devices, as represented by the empty hardwire box between the visual representations of the switch devices.

FIG. 26D

Figure 26D:
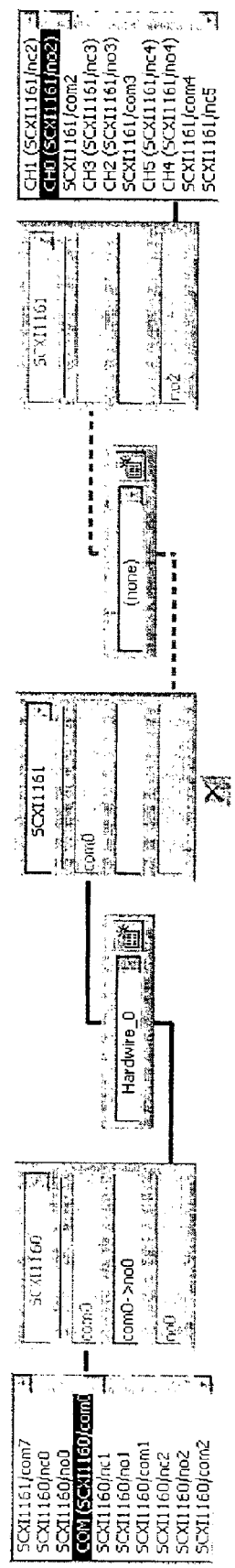
FIG. 26D illustrates one exemplary graphical user interface for adding another switch device into the routing path, according to one embodiment of the invention.

FIG. 26D illustrates one embodiment of adding a third switch device into the routing path. Since the design time assisted routing algorithm does not find a direct connection between the two devices (as represented by the empty hardwire box), in order to complete the routing path the user may add new switch devices into the routing path.

The user may insert a new switch device 1161 into the path by visually selecting the device insertion button on the hardwire selector with the broken wires. The visual route editor may render the new switch device on the display. The new switch device automatically routes its internal channels for proper connection with the switching device 1160 on the left of the screen. The visual design-time assisted routing algorithm may also present the user with other choices for internal channel routes, which the user may graphically select. The hardwire connecting the new switch device 1161 with the switch device 1160 on the left of the screen is drawn with a solid line to graphically indicate that the hardwire connection is valid. However, a connection between the new switch device 1161 and the switch device on the right hand side is not complete, as graphically indicated by a broken line on the right hand side of the screen.

FIG. 26E

Figure 26E:
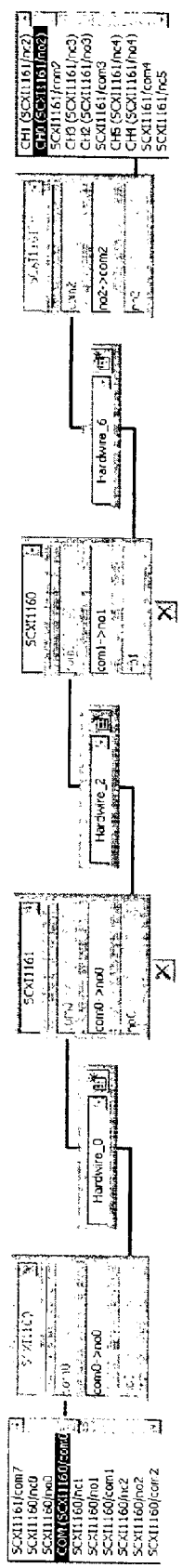
FIG. 26E illustrates one exemplary graphical user interface for adding another switch device into the routing path, according to one embodiment of the invention.

FIG. 26E is one embodiment of adding a fourth switch device into the routing path. The visual design-time assisted routing algorithm does not find a direct connection between the switch device on the right 1160 and the new switch device 1161, as indicated by the broken line in FIG. 26D, and by the empty hardwire box in the visual representation. In order to complete the routing path the user may add new switch devices into the routing path.

The user may insert a new switch device 1160 into the path by selecting the device insertion button on the hardwire selector with the broken wires. The visual route editor renders the new switching device on the display. The new switching device automatically routes its internal channels for proper connection with the switching device 1160 on the left of the screen. The design time assisted routing algorithm may also present the user with other choices for internal channel routes, which the user may graphically select. The hardwire connecting the new switching device 1160 with the switching device 1161 on the right of the screen may be drawn with a solid line to indicate that the hardwire connection is valid. The visual route editor now may detect that it has sufficient resources to complete the routing path. The visual route editor may render the routing path complete by drawing solid lines as shown. The visual design-time assisted routing algorithm has completed the routing path, as shown in the visual route editor. At any point along the creation of the routing path the user may decide to choose different switch devices, endpoints on a given switch device, and internal channels on a given switch device by graphically selecting different options on a graphical representation of the given switch device.

FIG. 27

Figure 27:
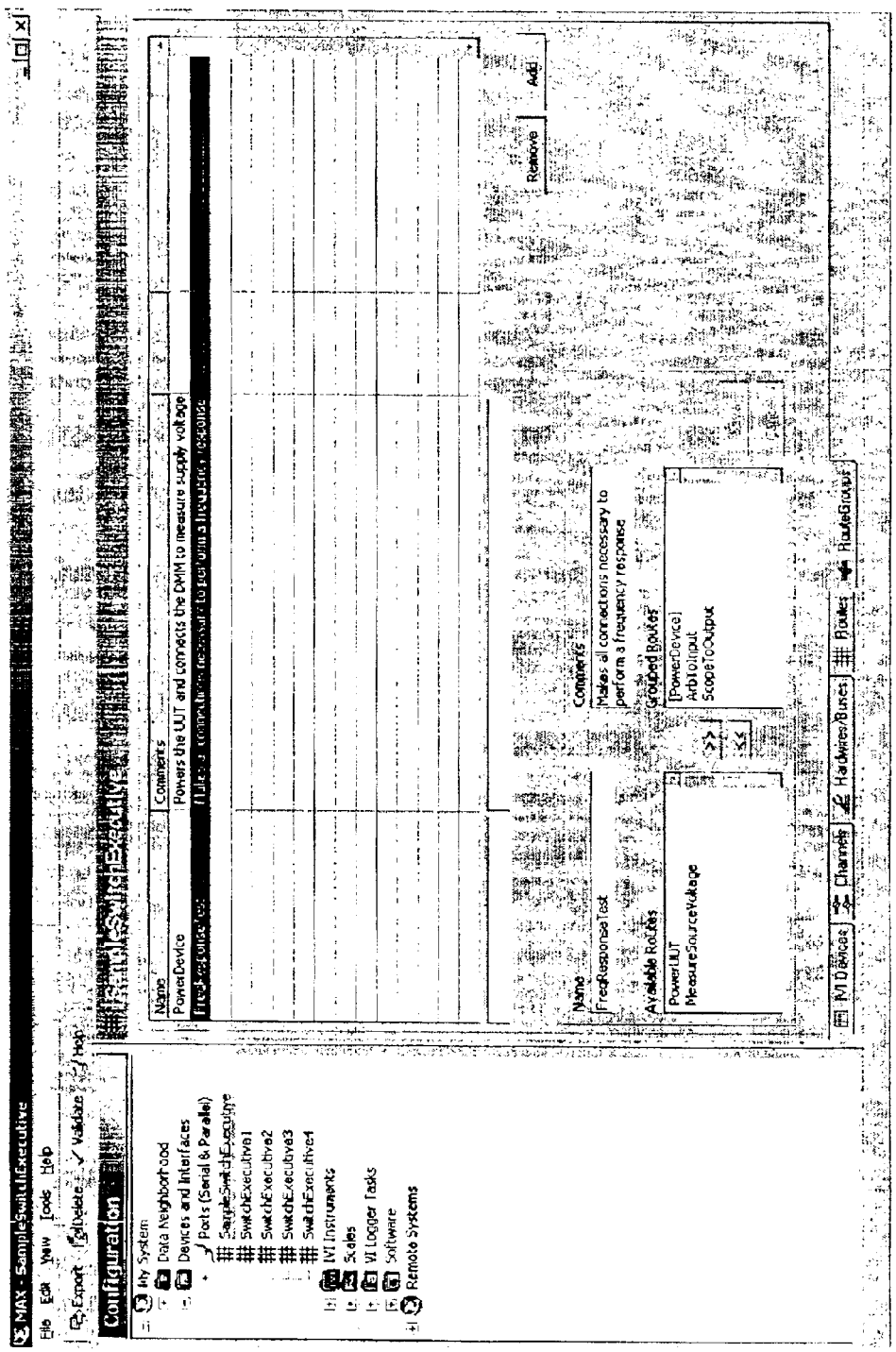
FIG. 27 illustrates a configuration of route groups, according to one embodiment.

FIG. 27 illustrates one embodiment of a GUI for visual configuration of route groups. Once users have created configured routes, some users may want to group the configured routes together so that a plurality of configured routes can be easily connected via a single name. In addition, configured routes that exist in the route group share the same resources, so the switch executive core 204 may reserve the shared resources such that configured routes can co-exist in the same route group.

Figure 28:
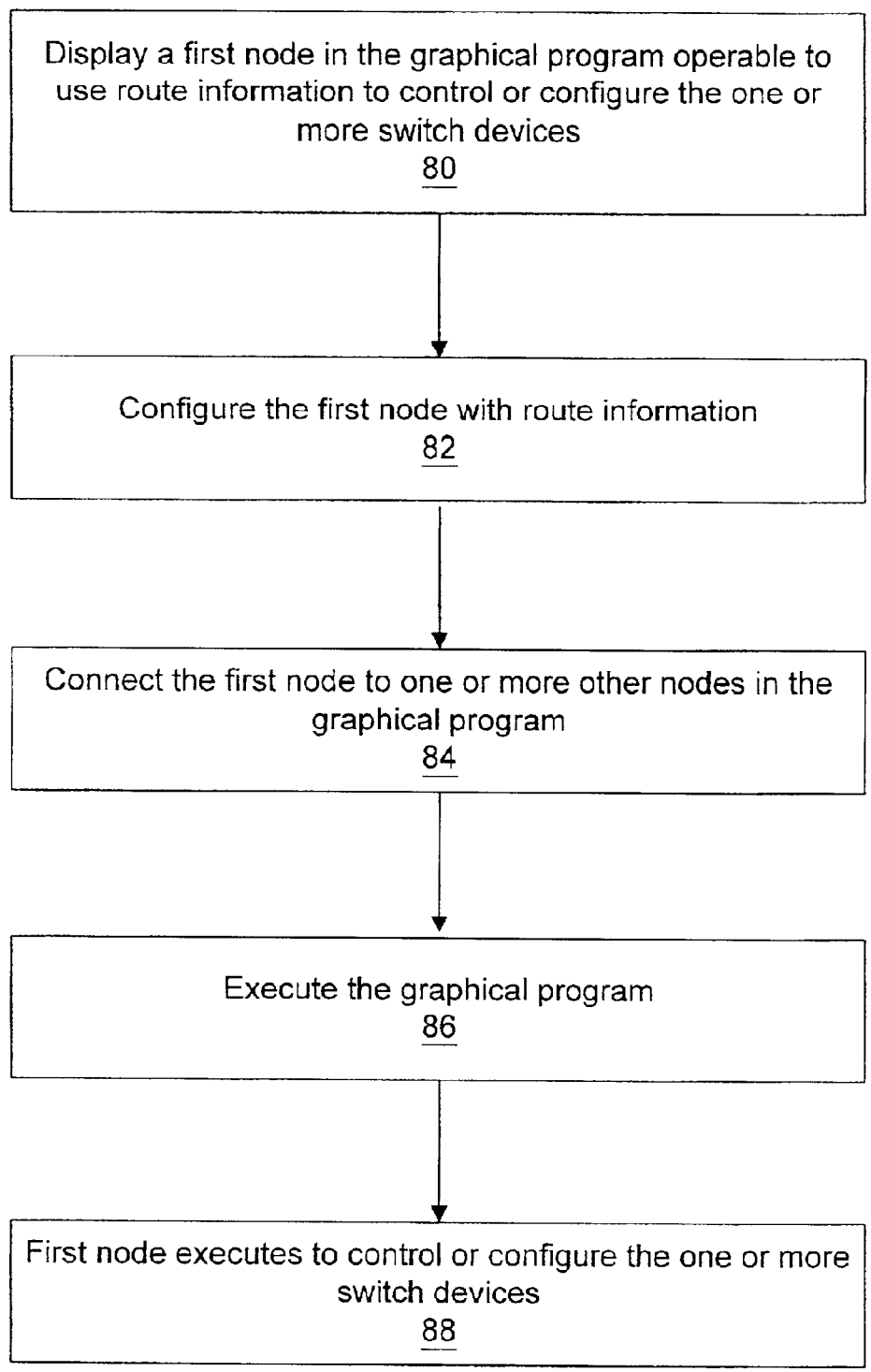
FIG. 28 is a flowchart illustrating a creation of a graphical program which uses configured routes, according to one embodiment of the invention.

FIG. 28—Flowchart Diagram Illustrating the Method of Using Configured Routes in a Graphical Program FIG. 28 is a flowchart diagram illustrating one embodiment of a method for creating a graphical program that uses route information to control or configure one or more switch devices.

In the present application, the term "graphical program" or "block diagram" is intended to include a program comprising graphical code, e.g., two or more interconnected nodes or icons, wherein the interconnected nodes or icons may visually indicate the functionality of the program. The nodes may be connected in one or more of a data flow, control flow, and/or execution flow format. The nodes may also be connected in a "signal flow" format, which is a subset of data flow. Thus the terms "graphical program" or "block diagram" are each intended to include a program comprising a plurality of interconnected nodes or icons which visually indicate the functionality of the program.

A graphical program may also comprise a user interface or front panel. The user interface portion may be contained in the block diagram or may be contained in one or more separate panels or windows. The user interface of a graphical program may include various graphical user interface elements or front panel objects, such as user interface controls and/or indicators, that represent or display the respective input and/or output that will be used by the graphical program or VI, and may include other icons which represent devices being controlled. The user interface or front panel may be comprised in a single window of user interface elements, or may comprise a plurality of individual windows each having one or more user interface elements, wherein the individual windows may optionally be tiled together. As another example, the user interface or front panel may comprise user interface or front panel objects, e.g., the GUI, embedded in the block diagram. The user interface of a graphical program may display only output, only input, or both input and output. Further, in some embodiments the user interface or front panel of a graphical program may enable the user to interactively control or manipulate the input being provided to the graphical program.

Examples of graphical programming development environments that may be used to create graphical programs include LabVIEW, DasyLab, and DiaDem from National Instruments, VEE from Agilent, WiT from Coreco, Vision Program Manager from PPT Vision, SoftWIRE from Measurement Computing, Simulink from the MathWorks, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others. In the preferred embodiment, the system uses the LabVIEW graphical programming system available from National Instruments.

In step 80, a first node may be displayed in the graphical program, wherein the first node is operable to use route information to control or configure one or more of the switch devices in the switch system 104. For example, the graphical programming development environment may provide various nodes for inclusion in the block diagram of a graphical program. Thus, a user may display the first node in the graphical program's block diagram, e.g., by selecting the first node from a palette or menu or otherwise providing user input requesting inclusion of the first node in the graphical program. An exemplary palette is described below with reference to FIG. 29 and FIGS. 30A–FIG. 30J.

In step 82, the first node may be configured with route information, e.g., in response to user input. For example, in one embodiment, step 82 may comprise connecting an input to an input terminal of the first node, wherein the input comprises the route information. In another embodiment, step 82 may comprise configuring one or more properties of the node, e.g., using a dialog box or property panel. In various embodiments, the route information may comprise any of various types of information. For example, the route information may comprise information specifying one or more routes previously configured and stored using the visual route editor, such as the names of one or more routes or route groups. Also, the route information may comprise information specifying two endpoints of a route, as in the case of run-time auto-routing, or may comprise information explicitly specifying a complete route, as in the case of manual routing.

The first node may be operable to perform any of various types of operations to control or configure the one or more switch devices. For example, the first node may be operable to perform a connect operation to connect specified routes, i.e., to cause the switch devices to make connections according to the routes. As another example, the first node may be operable to perform a disconnect operation to disconnect specified routes. As another example, the first node may be operable to perform a connect/disconnect operation to disconnect a first group of routes and connect a second group of routes, e.g., using the optimized connect/disconnect algorithm described above.

In step 84, the first node may be connected to one or more other nodes in the graphical program, e.g., in a data flow and/or control flow format.

In step 86, the graphical program may be executed.

In step 88, the first node may execute during execution of the graphical program to control or configure the one or more switch devices, such as described above with reference to step 82.

In another embodiment, instead of creating the graphical program in response to user input as described above, the graphical program may be programmatically generated using programmatic generation techniques as described in U.S. patent application Ser. No. 09/745,023 titled "System and Method for Programmatically Generating a Graphical Program in Response to Program Information," filed Dec. 20, 2000, which is hereby incorporated by reference as though fully and completely set forth herein.

It is noted that the flowchart of FIG. 28 is exemplary only. Further, various steps in the flowchart of FIG. 28 may occur concurrently or in different order than that shown, or may not be performed, as desired. Also, various additional steps may be performed as desired.

FIG. 29

Figure 29:
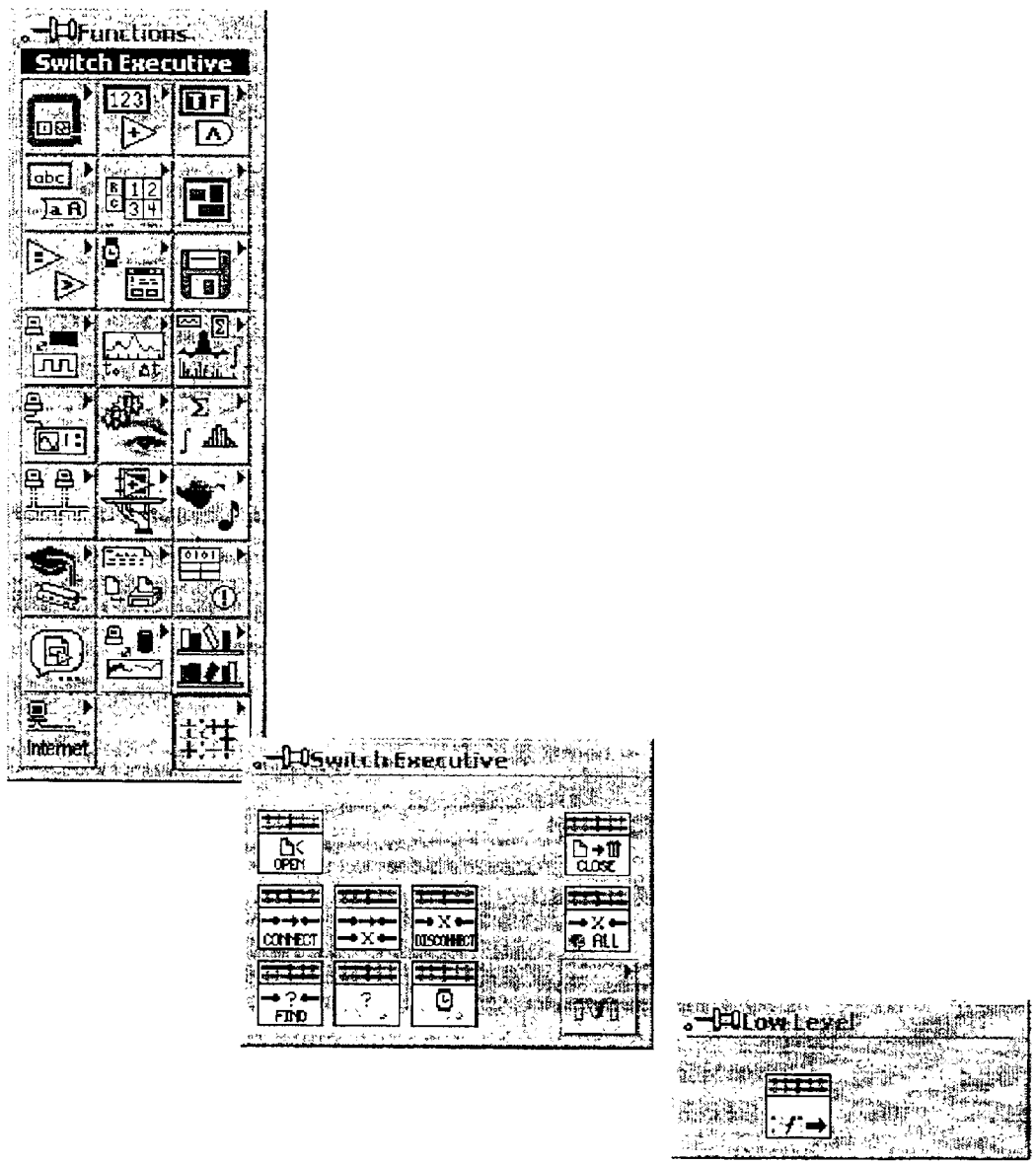
FIG. 29 illustrates a plurality of graphical program nodes used to configure switch devices and use configured routes, according to one embodiment of the invention.

FIG. 29 illustrates exemplary palettes of LabVIEW graphical program nodes for configuring and using a virtual switch device 105, according to one embodiment of the invention. The graphical program nodes may be utilized by the user in a graphical program in order to use configured routes. A plurality of graphical program nodes for configuring and using a virtual switch device are described below with reference to FIGS. 30A–30J.

FIG. 30A

FIG. 30A illustrates one embodiment of an exemplary LabVIEW graphical program node to close a session. This graphical program node may reduce the reference count of open sessions by one. If the reference count goes to 0, the graphical program node may deallocate any memory resources the switch device driver 210, 212, 214 uses and close any open sessions.

NISE Session (in) is the session referencing this Switch Executive virtual device session. Session handles are created through a call to niSE OpenSession.

error in describes error conditions that occur before this VI or function runs. The default is no error. If an error occurred before this VI or function runs, the VI or function passes the error in value to error out. This VI or function runs normally only if no error occurs before this VI or function runs. If an error occurs while this VI or function runs, it runs normally and sets its own error status in error out. Use the Simple Error Handler or General Error Handler VIs to display the description of the error code. Use error in and error out to check errors and to specify execution order by wiring error out from one node to error in of the next node.

status is TRUE (X) if an error occurred before this VI ran or FALSE (checkmark) to indicate a warning or that no error occurred before this VI ran. The default is FALSE.

code is the error or warning code. The default is 0. If status is TRUE, code is a non-zero error code. If status is FALSE, code is 0 or a warning code.

source describes the origin of the error or warning and is, in most cases, the name of the VI or function that produced the error or warning. The default is an empty string.

error out contains error information. If error in indicates that an error occurred before this VI or function ran, error out contains the same error information. Otherwise, it describes the error status that this VI or function produces. Right-click the error out indicator on the front panel and select Explain Error from the shortcut menu for more information about the error.

status is TRUE (X) if an error occurred or FALSE (checkmark) to indicate a warning or that no error occurred.

code is the error or warning code. If status is TRUE, code is a non-zero error code. If status is FALSE, code is 0 or a warning code.

source describes the origin of the error or warning and is, in most cases, the name of the VI or function that produced the error or warning.

Return Value

Returns the status of the VI.

CloseSession Details

After calling the niSE_CloseSession VI, you should not use the Switch Executive virtual device again until you call niSE OpenSession.

FIG. 30B

FIG. 30B illustrates one embodiment of an exemplary LabVIEW graphical program node to connect the routes specified by the connection specification. This graphical program node may allow for multiconnection based on the multiconnection mode.

NISE Session (in) is the session referencing this Switch Executive virtual device session. Session handles are created through a call to niSE OpenSession.

Connection Specification is the string describing the connections to be made. The route specification strings are best summarized as a series of routes delimited by ampersands. The specified routes may be route names, route group names, or fully specified route paths delimited by square brackets.

error in describes error conditions that occur before this VI or function runs. The default is no error. If an error occurred before this VI or function runs, the VI or function passes the error in value to error out. This VI or function runs normally only if no error occurs before this VI or function runs. If an error occurs while this VI or function runs, it runs normally and sets its own error status in error out. Use the Simple Error Handler or General Error Handler VIs to display the description of the error code. Use error in and error out to check errors and to specify execution order by wiring error out from one node to error in of the next node.

status is TRUE (X) if an error occurred before this VI ran or FALSE (checkmark) to indicate a warning or that no error occurred before this VI ran. The default is FALSE.

code is the error or warning code. The default is 0. If status is TRUE, code is a non-zero error code. If status is FALSE, code is 0 or a warning code.

source describes the origin of the error or warning and is, in most cases, the name of the VI or function that produced the error or warning. The default is an empty string.

NISE Session (out) is the session referencing this Switch Executive virtual device session. Session handles are created through a call to niSE OpenSession. This session handle is the copy of the session handle that was passed in and provides for easier wiring between Switch Executive VIs.

error out contains error information. If error in indicates that an error occurred before this VI or function ran, error out contains the same error information. Otherwise, it describes the error status that this VI or function produces. Right-click the error out indicator on the front panel and select Explain Error from the shortcut menu for more information about the error.

status is TRUE (X) if an error occurred or FALSE (checkmark) to indicate a warning or that no error occurred.

code is the error or warning code. If status is TRUE, code is a non-zero error code. If status is FALSE, code is 0 or a warning code.

source describes the origin of the error or warning and is, in most cases, the name of the VI or function that produced the error or warning.

Return Value

Returns the status of the VI.

Connect Details

In the event of an error, the call to niSE_Connect may attempt to undo any connections made so that the system will be left in the same state that it was in before the call was made. Some errors can be caught before manipulating hardware, although it is feasible that a hardware call could fail causing some connections to be momentarily closed and then reopened.

FIG. 30C

FIG. 30C illustrates one embodiment of an exemplary LabVIEW graphical program node to connect routes and disconnect routes. This graphical program node may connect routes and disconnect routes in a similar fashion to niSE_Connect and niSE_Disconnect, except that the operation may happen in the context of a single function call. This function may be useful for switching from one state to another state.

NISE Session (in) is the session referencing this Switch Executive virtual device session. Session handles are created through a call to niSE OpenSession.

Connection Specification is the string describing the connections to be made. The route specification strings are best summarized as a series of routes delimited by ampersands. The specified routes may be route names, route group names, or fully specified route paths delimited by square brackets.

Disconnection Specification is the string describing the disconnections to be made. The route specification strings are best summarized as a series of routes delimited by ampersands. The specified routes may be route names, route group names, or fully specified route paths delimited by square brackets. See route specification strings for more information.

Operation Order sets the order of the operation for the function. Defined values are Break Before Make and Break After Make.

Wait for Debounce Between Operations will wait (if true) for switches to debounce between its connect and disconnect operations. If false, it will immediately begin the second operation after completing the first. The order of connect and disconnect operation is set by the Operation Order input.

error in describes error conditions that occur before this VI or function runs. The default is no error. If an error occurred before this VI or function runs, the VI or function passes the error in value to error out. This VI or function runs normally only if no error occurs before this VI or function runs. If an error occurs while this VI or function runs, it runs normally and sets its own error status in error out. Use the Simple Error Handler or General Error Handler VIs to display the description of the error code. Use error in and error out to check errors and to specify execution order by wiring error out from one node to error in of the next node.

status is TRUE (X) if an error occurred before this VI ran or FALSE (checkmark) to indicate a warning or that no error occurred before this VI ran. The default is FALSE.

code is the error or warning code. The default is 0. If status is TRUE, code is a non-zero error code. If status is FALSE, code is 0 or a warning code.

source describes the origin of the error or warning and is, in most cases, the name of the VI or function that produced the error or warning. The default is an empty string.

NISE Session (out) is the session referencing this Switch Executive virtual device session. Session handles are created through a call to niSE OpenSession. This session handle is the copy of the session handle that was passed in and provides for easier wiring between Switch Executive VIs.

error out contains error information. If error in indicates that an error occurred before this VI or function ran, error out contains the same error information. Otherwise, it describes the error status that this VI or function produces. Right-click the error out indicator on the front panel and select Explain Error from the shortcut menu for more information about the error.

status is TRUE (X) if an error occurred or FALSE (checkmark) to indicate a warning or that no error occurred.

code is the error or warning code. If status is TRUE, code is a non-zero error code. If status is FALSE, code is 0 or a warning code.

source describes the origin of the error or warning and is, in most cases, the name of the VI or function that produced the error or warning.

Return Value

Returns the status of the VI.

ConnectAndDisconnect Details niSE_ConnectAndDisconnect may only touch the hardware to handle the connections and disconnections that are different between the connection specification and disconnection specification. If any routes are common between the two, they may be handled in software. This has the distinct advantage of increased throughput for shared connections since hardware does not has to be involved as well as an opportunity to increase relay lifetime by potentially decreasing the number of times that the relay has to be switched.

Break Before Make

The function may disconnect the routes specified in the disconnect specification before connecting the routes specified in the connect specification. This may be the typical mode of operation.

Break After Make

The function may connect the routes specified in the connection specification before connecting the routes specified in the disconnection specification. This mode of operation may be normally used when switching current and in order to ensure that a load is always connected to a source. The order of operation may be to connect first or disconnect first.

The order might be one of the following:

NISE_VAL_BREAK_BEFORE_MAKE=1

NISE_VAL_MAKE_BEFORE_BREAK=2

FIG. 30D

FIG. 30D illustrates one embodiment of an exemplary LabVIEW graphical program node to disconnect specified routes. This graphical program node may disconnect routes specified in the Disconnection Specification.

NISE Session (in) is the session referencing this Switch Executive virtual device session. Session handles are created through a call to niSE OpenSession.

Disconnection Specification is the string describing the disconnections to be made. The route specification strings are best summarized as a series of routes delimited by ampersands. The specified routes may be route names, route group names, or fully specified route paths delimited by square brackets.

error in describes error conditions that occur before this VI or function runs. The default is no error. If an error occurred before this VI or function runs, the VI or function passes the error in value to error out. This VI or function runs normally only if no error occurs before this VI or function runs. If an error occurs while this VI or function runs, it runs normally and sets its own error status in error out. Use the Simple Error Handler or General Error Handler VIs to display the description of the error code. Use error in and error out to check errors and to specify execution order by wiring error out from one node to error in of the next node.

status is TRUE (X) if an error occurred before this VI ran or FALSE (checkmark) to indicate a warning or that no error occurred before this VI ran. The default is FALSE.

code is the error or warning code. The default is 0. If status is TRUE, code is a non-zero error code. If status is FALSE, code is 0 or a warning code.

source describes the origin of the error or warning and is, in most cases, the name of the VI or function that produced the error or warning. The default is an empty string.

NISE Session (out) is the session referencing this Switch Executive virtual device session. Session handles are created through a call to niSE OpenSession. This session handle is the copy of the session handle that was passed in and provides for easier wiring between Switch Executive VIs.

error out contains error information. If error in indicates that an error occurred before this VI or function ran, error out contains the same error information. Otherwise, it describes the error status that this VI or function produces. Right-click the error out indicator on the front panel and select Explain Error from the shortcut menu for more information about the error.

status is TRUE (X) if an error occurred or FALSE (checkmark) to indicate a warning or that no error occurred.

code is the error or warning code. If status is TRUE, code is a non-zero error code. If status is FALSE, code is 0 or a warning code.

source describes the origin of the error or warning and is, in most cases, the name of the VI or function that produced the error or warning.

Return Value

Returns the status of the VI.

Disconnect Details

If any of the specified routes were originally connected in a multiconnected mode, the call to niSE_Disconnect may reduce the reference count on the route by 1. If the reference count reaches 0, it may be disconnected. If a specified route does not exist, it may be an error condition. In the event of an error, the call to niSE Disconnect may continue to try to disconnect everything specified by the route specification string but will report the error on completion.

FIG. 30E

FIG. 30E illustrates one embodiment of an exemplary LabVIEW graphical program node to disconnect all routes. This graphical program node may disconnect all connections on every switch device managed by the Switch Executive session reference passed to this function.

NISE Session (in) is the session referencing this Switch Executive virtual device session. Session handles are created through a call to niSE OpenSession.

Disconnection Specification is the string describing the disconnections to be made. The route specification strings are best summarized as a series of routes delimited by ampersands. The specified routes may be route names, route group names, or fully specified route paths delimited by square brackets.

error in describes error conditions that occur before this VI or function runs. The default is no error. If an error occurred before this VI or function runs, the VI or function passes the error in value to error out. This VI or function runs normally only if no error occurs before this VI or function runs. If an error occurs while this VI or function runs, it runs normally and sets its own error status in error out. Use the Simple Error Handler or General Error Handler VIs to display the description of the error code. Use error in and error out to check errors and to specify execution order by wiring error out from one node to error in of the next node.

status is TRUE (X) if an error occurred before this VI ran or FALSE (checkmark) to indicate a warning or that no error occurred before this VI ran. The default is FALSE.

code is the error or warning code. The default is 0. If status is TRUE, code is a non-zero error code. If status is FALSE, code is 0 or a warning code.

source describes the origin of the error or warning and is, in most cases, the name of the VI or function that produced the error or warning. The default is an empty string.

NISE Session (out) is the session referencing this Switch Executive virtual device session. Session handles are created through a call to niSE OpenSession. This session handle is the copy of the session handle that was passed in and provides for easier wiring between Switch Executive VIs.

error out contains error information. If error in indicates that an error occurred before this VI or function ran, error out contains the same error information. Otherwise, it describes the error status that this VI or function produces. Right-click the error out indicator on the front panel and select Explain Error from the shortcut menu for more information about the error.

status is TRUE (X) if an error occurred or FALSE (checkmark) to indicate a warning or that no error occurred.

code is the error or warning code. If status is TRUE, code is a non-zero error code. If status is FALSE, code is 0 or a warning code.

source describes the origin of the error or warning and is, in most cases, the name of the VI or function that produced the error or warning.

Return Value
Returns the status of the VI.

Disconnect Details
niSE_DisconnectAll may ignore all multiconnect modes. Calling niSE_DisconnectAll may reset all of the switch states for the system.

FIG. 30F

FIG. 30F illustrates one embodiment of an exemplary LabVIEW graphical program node to find a route between user specified channels. This graphical program node may find an existing or potential route between user specified channels 1 and 2.

NISE Session (in) is the session referencing this Switch Executive virtual device session. Session handles are created through a call to niSE OpenSession.

Channel 1 is the channel name of one of the endpoints of the route to find. The channel name must either be a channel alias name or a name in the device!ivichannel syntax.

Channel 2 is the channel name of one of the endpoints of the route to find. The channel name must either be a channel alias name or a name in the device!ivichannel syntax.

error in describes error conditions that occur before this VI or function runs. The default is no error. If an error occurred before this VI or function runs, the VI or function passes the error in value to error out. This VI or function runs normally only if no error occurs before this VI or function runs. If an error occurs while this VI or function runs, it runs normally and sets its own error status in error out. Use the Simple Error Handler or General Error Handler VIs to display the description of the error code. Use error in and error out to check errors and to specify execution order by wiring error out from one node to error in of the next node.

status is TRUE (X) if an error occurred before this VI ran or FALSE (checkmark) to indicate a warning or that no error occurred before this VI ran. The default is FALSE.

code is the error or warning code. The default is 0. If status is TRUE, code is a non-zero error code. If status is FALSE, code is 0 or a warning code.

source describes the origin of the error or warning and is, in most cases, the name of the VI or function that produced the error or warning. The default is an empty string.

NISE Session (out) is the session referencing this Switch Executive virtual device session. Session handles are created through a call to niSE OpenSession. This session handle is the copy of the session handle that was passed in and provides for easier wiring between Switch Executive VIs.

Route Specification contains the fully specified route path complete with delimiting square brackets—it the route exists or is possible.

Path Capability is the return value which expresses the capability of finding a valid route between Channel 1 and Channel 2. Refer to the table below for value descriptions.

error out contains error information. If error in indicates that an error occurred before this VI or function ran, error out contains the same error information. Otherwise, it describes the error status that this VI or function produces. Right-click the error out indicator on the front panel and select Explain Error from the shortcut menu for more information about the error.

status is TRUE (X) if an error occurred or FALSE (checkmark) to indicate a warning or that no error occurred.

code is the error or warning code. If status is TRUE, code is a non-zero error code. If status is FALSE, code is 0 or a warning code.

source describes the origin of the error or warning and is, in most cases, the name of the VI or function that produced the error or warning.

Return Value

Returns the status of the VI.

FindRoute Details

The returned route specification may contain the route specification and the route capability may determine whether or not the route existed, whether or not the route is possible. The route specification string returned from niSE_FindRoute can be passed to other Switch Executive API functions (such as niSE_Connect, niSE_Disconnect, and niSE_ConnectAndDisconnect) that use route specification strings.

Path Capability

Path capability might be any one of the following:

| Value | Name | Description |
|---|---|---|
| 1 | Path Available | A path between channel 1 and channel 2 is available. The route specification parameter will return a string describing the available path. |
| 2 | Path Exists | A path between channel 1 and channel 2 already exists. The route specification parameter will return a string describing the existing path. |
| 3 | Path Unsupported | There is no potential path between channel 1 and channel 2 given the current configuration. |
| 4 | Resource In Use | There is a potential path between channel 1 and channel 2, although a resource needed to complete the path is already in use. |
| 5 | Source Conflict | Channel 1 and channel 2 cannot be connected because they are both source channels. |
| 6 | Channel Not Available | One of the channels is not useable as an endpoint channel. Make sure that it is not marked as a configuration channel. |
| 7 | Channels Hardwired | A direct connection already exists between channel 1 and channel 2 via a hardwire. |

FIG. 30G

FIG. 30G illustrates one embodiment of an exemplary LabVIEW graphical program node to retrieve switch device session for a switch device. This graphical program node may retrieve a switch driver session for a switch device that is being managed by the Switch Executive. The retrieved session handle can be used to access instrument specific functionality through the switch device driver 210, 212, 214.

NISE Session (in) is the session referencing this Switch Executive virtual device session. Session handles are created through a call to niSE OpenSession.

IVI Logical Name is the IVI logical name of the IVI device to retrieve an IVI session for.

error in describes error conditions that occur before this VI or function runs. The default is no error. If an error occurred before this VI or function runs, the VI or function passes the error in value to error out. This VI or function runs normally only if no error occurs before this VI or function runs. If an error occurs while this VI or function runs, it runs normally and sets its own error status in error out. Use the Simple Error Handler or General Error Handler VIs to display the description of the error code. Use error in and error out to check errors and to specify execution order by wiring error out from one node to error in of the next node.

status is TRUE (X) if an error occurred before this VI ran or FALSE (checkmark) to indicate a warning or that no error occurred before this VI ran. The default is FALSE.

code is the error or warning code. The default is 0. If status is TRUE, code is a non-zero error code. If status is FALSE, code is 0 or a warning code.

source describes the origin of the error or warning and is, in most cases, the name of the VI or function that produced the error or warning. The default is an empty string.

NISE Session (out) is the session referencing this Switch Executive virtual device session. Session handles are created through a call to niSE OpenSession. This session handle is the copy of the session handle that was passed in and provides for easier wiring between Switch Executive VIs.

instrument handle out is the IVI instrument handle of the specified IVI device.

error out contains error information. If error in indicates that an error occurred before this VI or function ran, error out contains the same error information. Otherwise, it describes the error status that this VI or function produces. Right-click the error out indicator on the front panel and select Explain Error from the shortcut menu for more information about the error.

status is TRUE (X) if an error occurred or FALSE (checkmark) to indicate a warning or that no error occurred.

code is the error or warning code. If status is TRUE, code is a non-zero error code. If status is FALSE, code is 0 or a warning code.

source describes the origin of the error or warning and is, in most cases, the name of the VI or function that produced the error or warning.

Return Value

Returns the status of the VI.

GetIviDeviceSession Details

Note Use caution when using the session handle. Calling functions on an instrument driver can invalidate Switch Executive's configuration and cache. The retrieve session handle should not be used to make or break connections or change the configuration channels as this may likely cause undefined, and potentially unwanted, behavior.

FIG. 30H

FIG. 30H illustrates one embodiment of an exemplary LabVIEW graphical program node to check if a switching system 104 is debounced or not. This graphical program node may not wait for debouncing to occur. It may return true if the system is fully debounced.

NISE Session (in) is the session referencing this Switch Executive virtual device session. Session handles are created through a call to niSE OpenSession.

error in describes error conditions that occur before this VI or function runs. The default is no error. If an error occurred before this VI or function runs, the VI or function passes the error in value to error out. This VI or function runs normally only if no error occurs before this VI or function runs. If an error occurs while this VI or function runs, it runs normally and sets its own error status in error out. Use the Simple Error Handler or General Error Handler VIs to display the description of the error code. Use error in and error out to check errors and to specify execution order by wiring error out from one node to error in of the next node.

status is TRUE (X) if an error occurred before this VI ran or FALSE (checkmark) to indicate a warning or that no error occurred before this VI ran. The default is FALSE.

code is the error or warning code. The default is 0. If status is TRUE, code is a non-zero error code. If status is FALSE, code is 0 or a warning code.

source describes the origin of the error or warning and is, in most cases, the name of the VI or function that produced the error or warning. The default is an empty string.

NISE Session (out) is the session referencing this Switch Executive virtual device session. Session handles are created through a call to niSE OpenSession. This session handle is the copy of the session handle that was passed in and provides for easier wiring between Switch Executive VIs.

Is Debounced? returns TRUE if the system is fully debounced or FALSE if it is still settling.

error out contains error information. If error in indicates that an error occurred before this VI or function ran, error out contains the same error information. Otherwise, it describes the error status that this VI or function produces. Right-click the error out indicator on the front panel and select Explain Error from the shortcut menu for more information about the error.

status is TRUE (X) if an error occurred or FALSE (checkmark) to indicate a warning or that no error occurred.

code is the error or warning code. If status is TRUE, code is a non-zero error code. If status is FALSE, code is 0 or a warning code.

source describes the origin of the error or warning and is, in most cases, the name of the VI or function that produced the error or warning.

Return Value
    Returns the status of the VI.

IsDebounced Details
    This VI is similar to the IviSwtch specific function.

FIG. 30I

FIG. 30I illustrates one embodiment of an exemplary LabVIEW graphical program node to open a session to a specified switch virtual device 105. This graphical program node may open communication with all of the switch devices associated with the specified switch virtual device 105. This graphical program node may set configuration and source channels on each switch device as specified by the switch configuration. This graphical program node may return a session handle that may be used to identify the virtual switch device 105 in all subsequent graphical program calls.

Virtual Device Name is the session referencing this Switch Executive virtual device session. Session handles are created through a call to niSE OpenSession. This session handle is the copy of the session handle that was passed in and provides for easier wiring between Switch Executive VIs.

error in describes error conditions that occur before this VI or function runs. The default is no error. If an error occurred before this VI or function runs, the VI or function passes the error in value to error out. This VI or function runs normally only if no error occurs before this VI or function runs. If an error occurs while this VI or function runs, it runs normally and sets its own error status in error out. Use the Simple Error Handler or General Error Handler VIs to display the description of the error code. Use error in and error out to check errors and to specify execution order by wiring error out from one node to error in of the next node.

status is TRUE (X) if an error occurred before this VI ran or FALSE (checkmark) to indicate a warning or that no error occurred before this VI ran. The default is FALSE.

code is the error or warning code. The default is 0. If status is TRUE, code is a non-zero error code. If status is FALSE, code is 0 or a warning code.

source describes the origin of the error or warning and is, in most cases, the name of the VI or function that produced the error or warning. The default is an empty string.

NISE Session (out) is the session referencing this switch virtual device 105 session. Session handles are created through a call to niSE OpenSession. This session handle is the copy of the session handle that was passed in and provides for easier wiring between Switch Executive VIs.

error out contains error information. If error in indicates that an error occurred before this VI or function ran, error out contains the same error information. Otherwise, it describes the error status that this VI or function produces. Right-click the error out indicator on the front panel and select Explain Error from the shortcut menu for more information about the error.

status is TRUE (X) if an error occurred or FALSE (checkmark) to indicate a warning or that no error occurred.

code is the error or warning code. If status is TRUE, code is a non-zero error code. If status is FALSE, code is 0 or a warning code.

source describes the origin of the error or warning and is, in most cases, the name of the VI or function that produced the error or warning.

Return Value
    Returns the status of the VI.

OpenSession Details
    Switch Executive may use a reference counting scheme to manage open session handles to a switch virtual device 105. Each call to niSE_OpenSession may be matched with a subsequent call to niSE_CloseSession. Successive calls to niSE_OpenSession with the same virtual device name may return the same session handle. Only after all session handles are closed to a given virtual device, the Switch Executive may disconnect its communication with the IVI switches. The session handles may be used safely in multiple threads of an application.

FIG. 30J

FIG. 30J illustrates one embodiment of an exemplary LabVIEW graphical program node to wait for all of the switch devices in the switch virtual device 105 to debounce.

NISE Session (in) is the session referencing this Switch Executive virtual device session. Session handles are created through a call to niSE OpenSession.

Maximum Time (−1=infinite) is the amount of time to wait (in milliseconds) for the debounce to complete. A value of 0 will check for debouncing once and will return an error if the system is not debounced at that time. A value of −1 means to block for an infinite period of time until the system is debounced.

error in describes error conditions that occur before this VI or function runs. The default is no error. If an error occurred before this VI or function runs, the VI or function passes the error in value to error out. This VI or function runs normally only if no error occurs before this VI or function runs. If an error occurs while this VI or function runs, it runs normally and sets its own error status in error out. Use the Simple Error Handler or General Error Handler VIs to display the description of the error code. Use error in and error out to check errors and to specify execution order by wiring error out from one node to error in of the next node.

status is TRUE (X) if an error occurred before this VI ran or FALSE (checkmark) to indicate a warning or that no error occurred before this VI ran. The default is FALSE.

code is the error or warning code. The default is 0. If status is TRUE, code is a non-zero error code. If status is FALSE, code is 0 or a warning code.

source describes the origin of the error or warning and is, in most cases, the name of the VI or function that produced the error or warning. The default is an empty string.

NISE Session (out) is the session referencing this switch virtual device 105 session. Session handles are created through a call to niSE OpenSession. This session handle is the copy of the session handle that was passed in and provides for easier wiring between Switch Executive VIs.

error out contains error information. If error in indicates that an error occurred before this VI or function ran, error out contains the same error information. Otherwise, it describes the error status that this VI or function produces. Right-click the error out indicator on the front panel and select Explain Error from the shortcut menu for more information about the error.

status is TRUE (X) if an error occurred or FALSE (checkmark) to indicate a warning or that no error occurred.

code is the error or warning code. If status is TRUE, code is a non-zero error code. If status is FALSE, code is 0 or a warning code.

source describes the origin of the error or warning and is, in most cases, the name of the VI or function that produced the error or warning.

Return Value

Returns the status of the VI.

WaitForDebounce Details

This VI may not return until either the switching system 104 is completely debounced and settled or the maximum time has elapsed and the system is not yet debounced. In the event that the maximum time elapses, the function may return an error indicating that a timeout has occurred. It is recommended that niSE_WaitForDebounce be called after a series of connection or disconnection operations before taking any measurements of the signals connected to the switching system 104. This is to ensure that all of the switching has settled.

Figure 31:
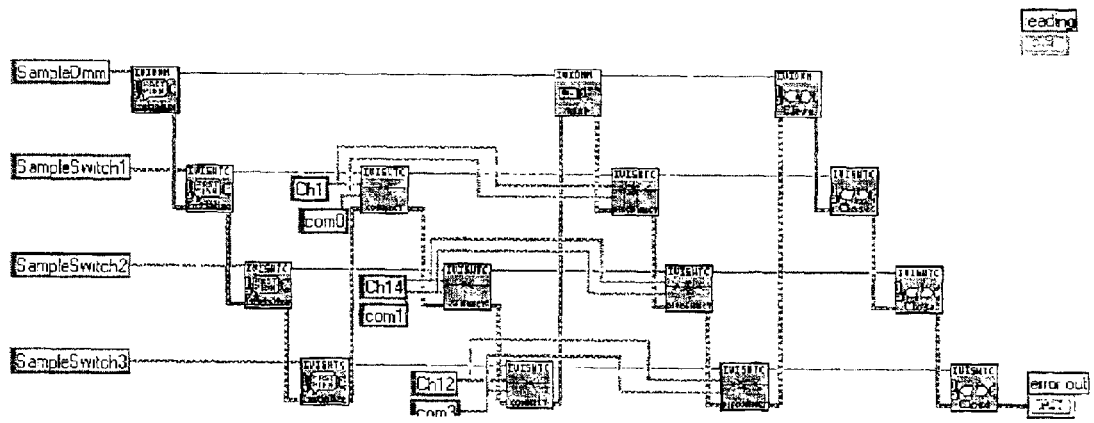
FIG. 31 illustrates a prior art graphical program for controlling a plurality of switch devices, according to one embodiment of the invention.

FIG. 31 (Prior Art) Graphical Program Using a Configured Route

FIG. 31 illustrates one example of a prior art graphical program for controlling a plurality of switch devices. In this example of a prior art graphical program, there is a switching system 104 comprising a plurality of switch devices, which are not organized into a virtual switch device 105. Thus, the user has to keep track of all the switch devices that are a part of the route, including all internal connections and hardwires.

FIGS. 32–35—Examples of Graphical Program which Use Configured Routes

Figure 32:
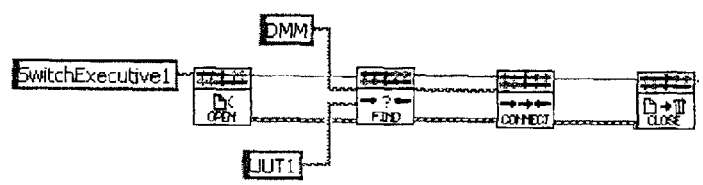
FIG. 32 illustrates a graphical program for controlling a plurality of switch devices using pre-configured routes, according to one embodiment of the invention.

FIG. 32 illustrates a graphical program for controlling a plurality of switch devices using configured routes, according to one embodiment of the invention. Note the improvement over the prior art graphical program. In this figure, the switching system 104 comprising the plurality of switch devices may be represented by a virtual switch device 105. The graphic program of FIG. 32 includes four nodes, these being an Open node, Find Node, Connect Node, and Close node. The Open node operates to open the virtual switch device 105. The Find node operates to find a path between two endpoints, which are "DMM" and "UUT1" in this example. The Connect node operates to connect the path between the two endpoints as specified by the Find node. The Close node operates to close the connection with the virtual switch device 105.

In one embodiment, the function of the Open and Close nodes may be combined with the function of the Find and Connect nodes respectively, resulting in a graphical program with only two nodes. In another embodiment, the function of the Open node may be combined with the function of the Find and Connect Nodes, resulting in a graphical program with only two nodes.

Figure 33:
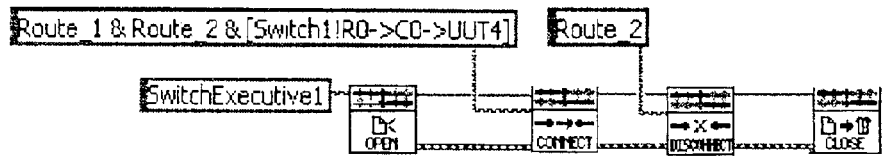
FIG. 33 illustrates a graphical program for controlling a plurality of switch devices using user entered route configurations, according to one embodiment of the invention.

FIG. 33 illustrates an exemplary LabVIEW graphical program that uses one embodiment of a graphical program node for controlling a plurality of switch devices. The graphical program uses graphical program nodes for controlling the plurality of switch devices with manually entered configured routes.

Figure 34:
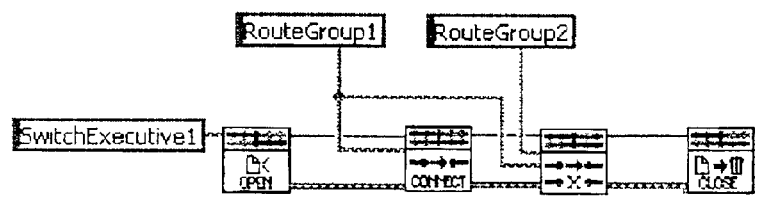
FIG. 34 illustrates a graphical program that uses software intervention in hardware state changes to improve relay lifetime and reduction in execution time, according to one embodiment of the invention.

FIG. 34 illustrates a graphical program that uses software intervention in hardware state changes to improve relay lifetime and reduction in execution time, according to one embodiment of the invention.

Figure 35:
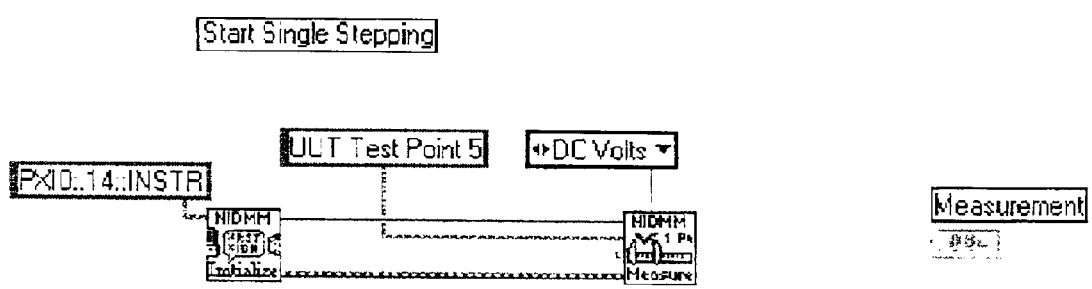
FIG. 35 illustrates a graphical program for controlling a plurality of switch devices using pre-configured routes, according to a second embodiment of the invention.

FIG. 35 illustrates another graphical program for controlling a plurality of switch devices using configured routes, according to another embodiment of the invention. This graphical program comprises the use of a virtual switch device 105 and the use of measurement and automation functions for controlling and/or acquiring data from a UUT110.

Figure 36:
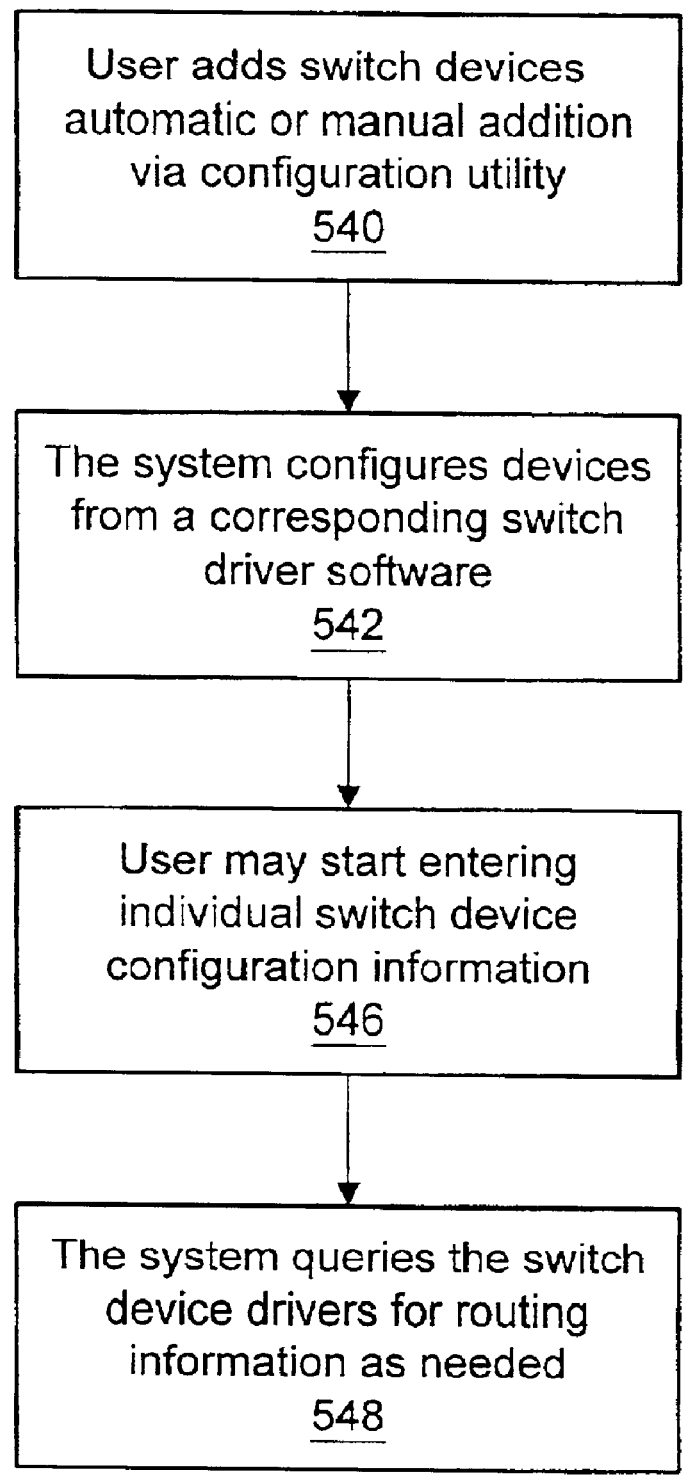
FIG. 36 is a flowchart of a method for a configuration of a virtual switch management system, according to one embodiment of the invention.

FIG. 36—Flowchart of a Method for a Configuration of a Virtual Switch Device

FIG. 36 is a flowchart of a method for a configuration of a virtual switch device 105. This flowchart illustrates an embodiment of a high-level approach to user and computer system 101 interaction.

In step 540, switch devices may be added by the user, as described with reference to FIG. 7. The method which the user chooses to enter the devices, automatic from a configuration file or manually addition via a configuration utility has the same effect.

In step 542, the switch executive core 204 may configure switch devices from corresponding switch driver software 210, 212, 214 that may be queried for switch device specific information.

In step 546, the user may start entering individual switch configuration information, including route dependencies, hardwires, and desired signal characteristics.

In step 548, the switch executive core 204 may create an internal mapping of the topology depending on the driver software. Note that an explicit topology may not be created. The switch executive core 204 may create a dynamic mapping of the connections based on querying the switch instrument drivers 210, 212, 214 and by the distribution of configured routes. This way the addition and/or modification of the switch device and/or configured routes may be optimized for performance.

Signal Requirements and Resource Dependencies

In one embodiment, the switch executive core 204 may enable a user to specify required signal characteristics for a route, and may aid the user in creating a route having elements, e.g., channels, with physical characteristics that match the required signal characteristics.

The switch executive core 204 or visual route editor may display a graphical user interface for receiving the one or more required signal characteristics for the route. The user may interact with the graphical user interface to specify the required signal characteristics. For example, in one embodiment, the graphical user interface may display a table for entering values for the required signal characteristics, and the user may enter one or more values in the table. For example, FIG. 24B illustrates a table for entering values such as signal bandwidth, impedance, setting time, maximum voltage, carry current, switching current, carry power, and switching power. In another embodiment the graphical user interface may enable the user to select various desired signal characteristics, e.g., by checking one or more checkboxes for required characteristics. In another embodiment, the one or more required signal characteristics may be provided from a configuration file or other sources. The signal characteristics may additionally include wire mode, carry current, switching voltage (AC, DC). besides others.

The required signal characteristics may then be used when selecting or determining channels to include the route. The required signal characteristics may affect both automatically selected or determined channels and user-selected channels. For example, if the user specifies a portion of a route and the switch executive core automatically completes the route for the user, the switch executive core may choose a route including only valid channels, according to the required signal characteristics. Also, the user may be able to manually select channels or may be able to override automatically selected channels. For example, the user may interact with the switch device icons to display a list of available channels and may choose a new channel from this list. Thus, the list may display only valid channels.

In one embodiment of the visual route editor, when creating a route the user may first specify a first endpoint of the route. For example, the user may first specify a left hand side endpoint of the route, such as by interacting with the listbox input element shown in FIG. 24C that includes channel names such as "2501_Matrux!r1", "2501_Matrux!r2", "2501_Matrux!r3", etc. The input element may display a selectable list of channels to select for the first endpoint. The list of switch devices may be filtered so that only valid switch devices are displayed, e.g., those switch devices having channels with physical characteristics that match the required signal characteristics. As one example, if the user specified that a bandwidth of 20 kHz is a required signal characteristic, then only those switch devices having channels with a bandwidth of 20 kHz or more may be displayed in the list. In response to the user selecting a first channel, residing in the first switch device, from the list of channels, the first endpoint of the route may be configured to be located on the first switch device.

Continuing with the example of FIG. 24C, the user may interact with the listbox input element on the right side of the screen to specify a right hand side endpoint of the route. Similarly as described above, this listbox input element may only display valid switch devices having channels with physical characteristics that match the required signal characteristics.

Configuring each endpoint may further comprise configuring the endpoint to be located on a particular channel of the respective switch device. In one embodiment, this channel may be automatically determined by the switch executive core. Thus, in determining the channel the switch executive core may determine channels of the respective switch device that have physical characteristics that match the required signal characteristics and may automatically configure the endpoint to be located on one of the determined channels.

For example, as described above, an icon representing the respective switch device may be displayed, wherein the icon displays the determined channel. For example, for the left hand side endpoint of the route, this channel may be the left hand side endpoint within the switch device. The user may change the automatically determined channel if desired, or in another embodiment the channel may not be automatically determined, and the user may need to initially set it. In these cases, the user may interact with the icon representing the switch device to change or set the channel. The icon may limit the user's choices to valid channels only. For example, the icon may include a selectable list of channels for specifying the channel, wherein the list of channels comprises channels having physical characteristics that match the required signal characteristics.

As described above, after the user has specified at least a portion of the route, the switch executive core may aid the user in automatically completing the route. The route may be automatically completed based on the required signal characteristics. For example, automatically completing the route may comprise automatically determining one or more channels on one or more switch devices that complete the route, wherein the automatically determined one or more channels on the one or more switch devices have physical characteristics matching the required signal characteristics.

To determine physical characteristics of the switch devices and/or channels within the switch devices, the switch executive core 204 may query the switch instrument drivers 210, 212, 214 for information concerning physical characteristics of the switch devices or of channels on the switch devices. In various embodiments, the drivers may be operable to provide information regarding any of various types of physical characteristics, e.g., those corresponding to the exemplary list of signal requirements given above (signal bandwidth, impedance, setting time, maximum voltage, carry current, switching current, carry power, switching power, etc.). Switch device manufacturers may create the switch instrument drivers 210, 212, 214 with information present describing how channels function, e.g., physical and electrical properties of each channel on the switch device.

In another embodiment, the switch executive core 204 may allow associating a first route with a first route group, wherein a route group comprises a plurality of routes. Switch executive core 204 may ensure that the first route can coexist with all of the other routes in the first route group. If a route is a member of a first route group, its dependencies are the other members of the first route group. A route can be a member of multiple groups, in which case it is dependent on all of routes in all of the route groups that it is a member. By stating that a route needs to coexist with another route, there may be resource exclusions for the resources implied by said another route.

In other embodiments, a plurality of other desired resource dependencies may be used to define configured routes, comprising specifying that a first channel should never be connected to a second channel, and specifying particular resources, hardwires, channels, individual switch relays, and paths to definitely exclude or definitely include in the configured route. In other embodiments, routing may be based not only on resource and desired signal characteristics, but also by a consideration of physical path proximities to minimize cross-talk and other high frequency effects.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for creating and executing a graphical program that configures one or more switch devices, wherein the method operates in a computer system including a display device and a user input device, the method comprising:

creating the graphical program, wherein said creating the graphical program comprises:

displaying on the display device one or more graphical program nodes in the graphical program in response to user input; and configuring the one or more graphical program nodes to dynamically find a determined route between two endpoints in the one or more switch devices in response to user input; and configuring the one or more graphical program nodes to configure the one or more switch devices in response to user input;

executing the graphical program, wherein said executing the graphical program comprises executing the one or more graphical program nodes, wherein during execution of the graphical program the one or more graphical program nodes are operable to dynamically find a determined route between two endpoints in the one or more switch devices and configure the one or more switch devices using the determined route.

2. The method of claim 1,
wherein the graphical program comprises a plurality of interconnected graphical program nodes that visually indicate functionality of the graphical program.

3. The method of claim 1,
wherein the graphical program comprises one of a graphical data flow program or a graphical control flow program.

4. The method of claim 1,
wherein the one or more switch devices each comprises a plurality of switch device channels;
wherein the determined route comprises a plurality of connections between the plurality of the switch device channels, wherein the plurality of connections connect a first endpoint of a first switch device to a second endpoint of a second switch device;
wherein said determining the determined route comprises determining the plurality of connections between the plurality of the switch device channels.

5. The method of claim 1,
wherein a first switch device of the one or more switch devices and a second switch device of the one or more switch devices are coupled using one or more hardwires, wherein the first switch device and the second switch device each comprise a plurality of switch device channels, wherein each of the one or more hardwires is operable to couple a channel of the first switch device to a channel of the second switch device;
wherein said determining the determined route comprises determining one or more switch device channels and one or more hardwires to use in the determined route.

6. The method of claim 1,
wherein the determined route specifies a plurality of connections within the one or more switch devices;
wherein, during execution of the graphical program, the one or more graphical program nodes are operable to cause the one or more switch devices to activate the plurality of connections specified by the determined route.

7. The method of claim 1,
wherein said configuring the one or more graphical program nodes to configure the one or more switch devices comprises connecting a first parameter to the one or more graphical program nodes, wherein the first parameter specifies two route endpoints;
wherein, during execution of the graphical program, the one or more graphical program nodes are operable to cause:

dynamic determination of a route connecting the two route endpoints; and
configuration of the one or more switch devices to perform the route connecting the two route endpoints.

8. The method of claim 1, further comprising:
connecting the one or more graphical program nodes to one or more other graphical program nodes in the graphical program.

9. The method of claim 1,
wherein the graphical program comprises a block diagram portion and a user interface portion.

10. A computer-implemented method for creating and executing a graphical program to configure a route between one or more switch devices, the method comprising:

creating the graphical program, wherein said creating the graphical program comprises:
displaying a first node in the graphical program, wherein the first node is operable to dynamically find a route between two endpoints in the one or more switch devices to determine a determined route; and
configuring a second node with route information specifying the determined route, wherein he second node is operable to use the determined route to configure the one or more switch devices, wherein the determined route comprises route information;

executing the graphical program, wherein said executing the graphical program comprises executing the first node and the second node, wherein the first node executes to said dynamically find the determined route between two endpoints in the one or more switch devices and the second node executes to said configure the one or more switch devices according to the determined route.

11. The method of claim 10,
wherein the graphical program comprises a plurality of interconnected nodes that visually indicate functionality of the graphical program.

12. The method of claim 10, further comprising:
connecting the first node to the second node in the graphical program.

13. The method of claim 10,
wherein the graphical program comprises a block diagram portion and a user interface portion.

14. The method of claim 10,
wherein the graphical program comprises a graphical data flow program.

15. The method of claim 10, further comprising:
receiving user input requesting to include the first node in the graphical program;
wherein said displaying the first node in the graphical program is performed in response to the user input.

16. The method of claim 10,
wherein the first node and the second node are the same node in the graphical program.

17. The method of claim 10,
wherein the one or more switch devices each comprises a plurality of switch device channels;
wherein the determined route comprises a plurality of connections between the plurality of the switch device channels, wherein the plurality of connections connect a first endpoint of a first switch device to a second endpoint of a second switch device;
wherein said finding the route comprises determining the plurality of connections between the plurality of the switch device channels.

18. The method of claim 10,
wherein a first switch device of the one or more switch devices and a second switch device of the one or more switch devices are coupled using one or more hardwires, wherein the first switch device and the second switch device each comprise a plurality of switch device channels, wherein each one of the one or more hardwires is operable to couple a channel of the first switch device to a channel of the second switch device;
wherein said finding the determnined route comprises determining one or more switch device channels and one or more hardwires to use in the determined route.

19. The method of claim 10,
wherein said second node executing to configure the one or more switch devices according to the determined route comprises the second node executing to cause the one or more switch devices to connect the determnined route.

20. The method of claim 10,
wherein said configuring the second node with route information specifying the determined route comprises connecting one or more inputs to one or more input terminals of the second node;
wherein the one or more inputs specify the determined route.

21. The method of claim 10,
wherein each route comprises a plurality of connections, wherein each connection connects two switch device channels.

22. The method of claim 10,
wherein said determining the determined route comprises determining a plurality of connections between the plurality of switch device channels, wherein said determining the determined route further comprises determining the hardwire connection between the first switch device and the second switch device.

23. The method of claim 10,
wherein said configuring the second node with route information specifying one or more routes comprises receiving user input to a graphical user interface panel or window associated with the first node.

24. The method of claim 10, further comprising:
using the first node two or more times in the graphical program to dynamically find a plurality of determined routes between a plurality of endpoints;
wherein one or more of the plurality of the determined routes comprises a plurality of connections, wherein each connection connects two switch device channels.

25. The method of claim 24,
wherein the plurality of connections comprises at least one hardwire connection;
wherein the hardwire connection connects a channel of a first switch device to a channel of a second switch device.

26. The method of claim 10, further comprising:
displaying a third node in the graphical program, wherein the third node is operable to cause the one or more switch devices to disconnect one or more routes; and
configuring the third node with route information specifying the determined route;
wherein said executing the graphical program further comprises executing the third node after said executing one or more of the first node and the second node, wherein the third node executes to cause the one or more switch devices to disconnect the determined route.

27. A memory medium for creating and executing a graphical program to configure one or more switch devices, the memory medium comprising program instructions executable to:
create the graphical program, wherein said creating the graphical program comprises program instructions being executable to:
receive user input requesting inclusion of a first node in the graphical program; and
display the first node in the graphical program in response to the request, wherein the first node is operable to find one or more determined route and use route information to configure the one or more switch devices; and
configure the first node with route information specifying the one or more determined route;
execute the graphical program, wherein during said execution of the graphical program the first node executes to dynamically find one or more determined routes and configure the one or more switch devices according to the one or more determined routes.

28. The memory medium of claim 27,
wherein the graphical program comprises a plurality of interconnected nodes that visually indicate functionality of the graphical program.

29. The memory medium of claim 28, further comprising program instructions executable to connect the first node to one or more other nodes in the graphical program.

30. The memory medium of claim 27,
wherein the graphical program comprises a graphical data flow program.

31. The memory medium of claim 27,
wherein said first node executing to configure the one or more switch devices according to the one or more determined routes comprises the first node executing to cause the one or more switch devices to connect the one or more determined routes.

32. The memory medium of claim 27,
wherein each of the one or more switch devices each comprises a plurality of switch device channels;
wherein the one or more determined routes comprise a plurality of connections between the plurality of the switch device channels, wherein the plurality of connections connect a first endpoint of a first switch device to a second endpoint of a second switch device;
wherein said finding the one or more determined routes comprises determining the plurality of connections between the plurality of the switch device channels.

33. The memory medium of claim 27,
wherein a first switch device of the one or more switch devices and a second switch device of the one or more switch devices are coupled using one or more hardwires, wherein the first switch device and the second switch device each comprise a plurality of switch device channels, wherein each one of the one or more hardwires is operable to couple a channel of the first switch device to a channel of the second switch device;
wherein said finding the one or more determined routes comprises determining one or more switch device channels and one or more hardwires to use in the one or more determined routes.

34. A memory medium for creating and executing a graphical program that configures one or more switch devices, the memory medium comprising program instructions executable to:

create a graphical program, wherein said creating a graphical program comprises program instructions executable to:

receive user input requesting inclusion of a graphical program node in the graphical program;

display on the display device the graphical program node in the graphical program in response to the user input; and configure the graphical program node to configure the one or more switch devices in response to user input;

execute the graphical program, wherein said executing the graphical program comprises executing the graphical program node, wherein during execution of the graphical program the graphical program node is operable to dynamically find a determined route between two endpoints between the one or more switch devices and configure the one or more switch devices using the determined route.

35. The memory medium of claim 34, wherein the graphical program comprises a plurality of interconnected graphical program nodes that visually indicate functionality of the graphical program.

36. The memory medium of claim 35, wherein the graphical program comprises one of a graphical data flow program or a graphical control flow program.

37. The memory medium of claim 34, wherein each of the one or more switch devices each comprises a plurality of switch device channels;

wherein the determined route comprises a plurality of connections between the plurality of the switch device channels, wherein the plurality of connections connect a first endpoint of a first switch device to a second endpoint of a second switch device;

wherein said finding the determined route comprises determining the plurality of connections between the plurality of the switch device channels.

38. The memory medium of claim 34, wherein a first switch device of the one or more switch devices and a second switch device of the one or more switch devices are coupled using one or more hardwires, wherein the first switch device and the second switch device each comprise a plurality of switch device channels, wherein each one of the one or more hardwires is operable to couple a channel of the first switch device to a channel of the second switch device;

wherein said finding the determined route comprises determining one or more switch device channels and one or more hardwires to use in the determined route.

\* \* \* \* \*

UNITED STATES PATENT AND TRADEMARK OFFICE
CERTIFICATE OF CORRECTION

PATENT NO.    : 6,954,904 B2   Page 1 of 1
DATED         : October 11, 2005
INVENTOR(S)   : Jason White It is certified that error appears in the above-identified patent and that said Letters Patent is hereby corrected as shown below:

Column 55,
Line 11, delete "finding the determnined route" and substitute -- finding the determined route --.
Lines 18-19, delete "connect the determnined route" and substitute -- connect the determined route --.

Signed and Sealed this

Twenty-fourth Day of January, 2006

JON W. DUDAS
*Director of the United States Patent and Trademark Office*